US009915439B2

(12) United States Patent
Quam et al.

(10) Patent No.: US 9,915,439 B2
(45) Date of Patent: *Mar. 13, 2018

(54) REMOTE CONTRACTOR SYSTEM WITH DATA ANALYTICS FOR IDENTIFYING NEEDED PRODUCTS OR SERVICES

(71) Applicant: Honeywell International Inc., Morristown, NJ (US)

(72) Inventors: David Quam, Maple Grove, MN (US); Amy Ragland, Brooklyn Center, MN (US); Steve R. Peterson, Plymouth, MN (US); Brad Paine, Hopkins, MN (US)

(73) Assignee: Honeywell International Inc., Morris Plains, NJ (US)

( * ) Notice: Subject to any disclaimer, the term of this patent is extended or adjusted under 35 U.S.C. 154(b) by 598 days.

This patent is subject to a terminal disclaimer.

(21) Appl. No.: 14/531,467

(22) Filed: Nov. 3, 2014

(65) Prior Publication Data

US 2015/0127171 A1 May 7, 2015

Related U.S. Application Data

(60) Provisional application No. 61/899,427, filed on Nov. 4, 2013.

(51) Int. Cl.
*G01M 1/38* (2006.01)
*F24F 11/00* (2018.01)
(Continued)

(52) U.S. Cl.
CPC ........ *F24F 11/0086* (2013.01); *F24F 11/006* (2013.01); *F24F 11/0009* (2013.01);
(Continued)

(58) Field of Classification Search
CPC .................................................. F24F 11/0086
(Continued)

(56) References Cited

U.S. PATENT DOCUMENTS 6,496,575 B1 12/2002 Vasell et al.
7,054,822 B2 5/2006 McCall
(Continued)

FOREIGN PATENT DOCUMENTS

AU 2010333708 6/2011
WO WO 2013/112574 8/2013

OTHER PUBLICATIONS

Kastner, Wolfgang, et al. "Communication systems for building automation and control." Proceedings of the IEEE 93.6 (2005): pp. 1178-1203.*

(Continued)

*Primary Examiner* — Satish Rampuria
(74) *Attorney, Agent, or Firm* — Seager, Tufte & Wickhem, LLP

(57) ABSTRACT

A system that allows a contractor to remotely monitor and/or interact with its customers' building control systems, such as heating, ventilating and air conditioning (HVAC) systems, and analyze information obtained from the building control systems over time. Such a system may help the contractor monitor and diagnosis customer building control systems, setup service calls, achieve better customer relations, create more effective marketing opportunities, as well as other functions. In some cases, the disclosed system may include a controller that analyzes data from HVAC systems, determines if one or more of the HVAC systems may benefit from a particular product or service, and outputs the HVAC systems that are determined to benefit from a particular product or service.

16 Claims, 42 Drawing Sheets

(51) Int. Cl.
 *G05B 15/02* (2006.01)
 *G06Q 10/06* (2012.01)
 *G06Q 10/00* (2012.01)
 *H04L 29/08* (2006.01)
 *H04L 12/28* (2006.01)

(52) U.S. Cl.
 CPC ......... *G05B 15/02* (2013.01); *G06Q 10/0639* (2013.01); *G06Q 10/20* (2013.01); *H04L 12/2825* (2013.01); *H04L 67/10* (2013.01); *H04L 67/12* (2013.01); *H04L 67/125* (2013.01); *F24F 2011/0061* (2013.01); *F24F 2011/0071* (2013.01); *G05B 2219/24033* (2013.01); *G05B 2219/2614* (2013.01); *G05B 2219/2642* (2013.01); *G05B 2219/34477* (2013.01); *H04L 2012/285* (2013.01); *Y02P 90/82* (2015.11)

(58) Field of Classification Search
 USPC .................................................. 700/275–306
 See application file for complete search history.

(56) References Cited

U.S. PATENT DOCUMENTS

| | | | |
|---|---|---|---|
| 7,092,794 B1* | 8/2006 | Hill | G08C 17/02 700/108 |
| 7,337,191 B2 | 2/2008 | Haeberle et al. | |
| 7,571,865 B2 | 8/2009 | Nicodem et al. | |
| 7,653,443 B2 | 1/2010 | Flohr | |
| 7,703,694 B2 | 4/2010 | Mueller et al. | |
| 7,784,291 B2 | 8/2010 | Butler et al. | |
| 7,877,305 B2 | 1/2011 | Gross et al. | |
| 8,001,219 B2 | 8/2011 | Moorer et al. | |
| 8,090,675 B2 | 1/2012 | Chambers et al. | |
| 8,200,527 B1* | 6/2012 | Thompson | G06Q 10/0639 705/7.38 |
| 8,204,758 B2 | 6/2012 | McCall, Jr. | |
| 8,239,066 B2 | 8/2012 | Jennings et al. | |
| 8,239,922 B2 | 8/2012 | Sullivan et al. | |
| 8,321,188 B2 | 11/2012 | Johnson et al. | |
| 8,332,178 B2 | 12/2012 | Simons | |
| 8,554,376 B1 | 10/2013 | Matsuoka et al. | |
| 8,620,632 B2 | 12/2013 | An et al. | |
| 8,756,024 B2 | 6/2014 | Hedley et al. | |
| 8,826,165 B2 | 9/2014 | Harrod et al. | |
| 8,862,415 B1 | 10/2014 | Adams | |
| 9,002,526 B2 | 4/2015 | Matsuoka et al. | |
| 9,069,338 B2 | 6/2015 | Drees et al. | |
| 2002/0087332 A1 | 7/2002 | Como | |
| 2002/0152298 A1 | 10/2002 | Kikta et al. | |
| 2003/0110001 A1* | 6/2003 | Chassin | F24F 11/001 702/104 |
| 2005/0159847 A1* | 7/2005 | Shah | G05B 15/02 700/276 |
| 2005/0228607 A1* | 10/2005 | Simons | F24F 11/0086 702/122 |
| 2007/0232288 A1 | 10/2007 | McFarland et al. | |
| 2011/0190910 A1 | 8/2011 | Lombard et al. | |
| 2012/0005590 A1 | 1/2012 | Lombard et al. | |
| 2012/0016779 A1 | 1/2012 | Landry et al. | |
| 2012/0176252 A1 | 7/2012 | Drew et al. | |
| 2012/0203586 A1 | 8/2012 | Blakely | |
| 2012/0221150 A1 | 8/2012 | Arensmeier | |
| 2013/0138475 A1 | 5/2013 | Allison et al. | |
| 2013/0332306 A1 | 12/2013 | Fahmy et al. | |
| 2014/0074730 A1 | 3/2014 | Arensmeier et al. | |
| 2014/0172479 A1 | 6/2014 | Gallagher et al. | |
| 2014/0266755 A1 | 9/2014 | Arensmeier et al. | |
| 2014/0277795 A1 | 9/2014 | Matsuoka et al. | |
| 2014/0278681 A1 | 9/2014 | Cox et al. | |
| 2014/0279571 A1 | 9/2014 | Cox et al. | |
| 2014/0297238 A1 | 10/2014 | Parathasarathy et al. | |
| 2014/0312128 A1 | 10/2014 | Matsuoka et al. | |
| 2014/0337082 A1 | 11/2014 | Nofal | |
| 2014/0379298 A1 | 12/2014 | Gilbert | |
| 2015/0006129 A1 | 1/2015 | An et al. | |
| 2015/0006463 A1 | 1/2015 | Fadell et al. | |
| 2015/0127165 A1 | 5/2015 | Quam et al. | |
| 2015/0127167 A1 | 5/2015 | Quam et al. | |
| 2015/0127168 A1 | 5/2015 | Quam et al. | |
| 2015/0127169 A1 | 5/2015 | Quam et al. | |
| 2015/0127172 A1 | 5/2015 | Quam et al. | |
| 2015/0127174 A1 | 5/2015 | Quam et al. | |

OTHER PUBLICATIONS

Escrivá-Escrivá, Guillermo, Isidoro Segura-Heras, and Manuel Alcázar-Ortega. "Application of an energy management and control system to assess the potential of different control strategies in HVAC systems." Energy and Buildings 42.11 (2010): pp. 2258-2267.*
Doukas, Haris, et al. "Intelligent building energy management system using rule sets." Building and environment 42.10 (2007): pp. 3562-3569.*
U.S. Appl. No. 15/045,093, filed Feb. 16, 2016.
U.S. Appl. No. 15/045,120, filed Feb. 16, 2016.
U.S. Appl. No. 15/045,149, filed Feb. 16, 2016.
Aprilaire, "Model 8800 Communicating Thermostat System Installation Manual," 20 pages, 2011.
Emme Core, "User Guide," 100.0065 VER1.1, 47 pages, Jan. 2011.
Honeywell, "WebStat Controller—Intricate Control Made Simple," 4 pages, May 2007.
Honeywell, "WebStat Controller—Intricate Control Made Simple," 4 pages, Oct. 2010.
http://www.proliphix.com/products-remote-management.htm, "Univista Energy Manager (UEM) Software," 2 pages, printed Jul. 23, 2015.
Niagara "AX-3$_x$ User Guide," Technical Document, 436 pages, May 1, 2007. (This reference will uploaded in 4 parts).
Proliphix, "Proliphix Remote Management Setup and User's Guide," Release 1.0, Part No. 600-08000-000, Rev. 1B, 36 pages, May 2008.
Proliphix, "UniVista User's Guide," Release 1.0, Part No. 600-09000-001, Rev. 2, 148 pages, Jun. 2008.
Tridium, "Niagara Appliance," 4 pages, downloaded Jul. 23, 2015.

* cited by examiner

FIG. 13

Samantha's Year Over Year
HVAC Performance Report - May 15, 2014

Company Logo

So far this year you're spending $7 less than you did this time last year

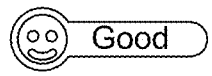 Good

▷ Your home is more efficient than 83% of similar homes. You can improve the efficiency of your home by having an energy audit.

▷ Lowering your heat set point by 2 degrees while you are away from home can save significant energy use and dollars.

Performance assessment

Air Conditioner

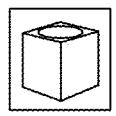 Running like a Champ!

 Excellent

Efficiency over Past 15 Years

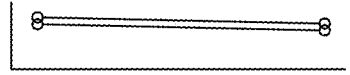

○ Your AC     ○ A "Healthy" AC

Furnace

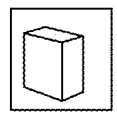 20% increase in use over the past 2 Years

 Needs Help

Efficiency over Past 15 Years

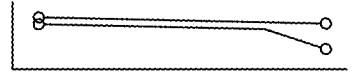

○ Your Furnace     ○ A "Healthy" Furnace

Please contact us for a check-up.

Over the past 15 years

Compared to days like today   Sunny 68° F

Cooling Hours
You have used 1 hour today

↑ 1 hours / 8 %

More than your trneds in th epast 15 years

 Good

Heating Hours
You have used 10 hours today

↓ 2 hours / 15 %

More than your trneds in th epast 15 years

 Excellent

REMOTE CONTRACTOR SYSTEM WITH DATA ANALYTICS FOR IDENTIFYING NEEDED PRODUCTS OR SERVICES

This application claims the benefit of U.S. Provisional Application Ser. No. 61/899,427, filed Nov. 4, 2013, entitled "Methods and Systems for Providing Improved Service for Building Control Systems", which is incorporated herein by reference.

TECHNICAL FIELD

The present disclosure relates generally to methods, systems and tools for providing improved service for building control systems such as heating, ventilating and air conditioning (HVAC) systems, security systems, lighting systems, fire control systems, and other building systems.

BACKGROUND

Most buildings include building control systems that monitor and regulate various functions of the building for the comfort and well being of the occupants. These building control systems can include, for example, HVAC systems, security systems, lighting systems, fire control systems, and/or other building control systems.

Building control systems commonly require some preventative and/or corrective maintenance on an on-going basis. In practice, such preventive and/or corrective maintenance is often neglected, leading to less efficient operation of the building. In many cases, the building control systems are operated until failure, and then a contractor is called to make repairs. Such a reactive approach to maintenance is all too common, and typically increases the costs associated with operating the building control systems, leads to discomfort and/or apprehension once a failure occurs, and leads in some cases to significant damage to the building (e.g. water damage caused by frozen pipes, etc.). Moreover, once a failure has occurred, the contractor service call is typically a high priority call, which can reduce operational inefficiencies for the contractor and can result in additional expense for the building owner. What would be desirable are methods, systems and tools for providing improved service to building control systems, which can in some cases, improve the experience of both the building owner and contractor.

SUMMARY

Generally, the present disclosure relates to methods, systems and tools for providing improved service for building control systems such as heating, ventilating and air conditioning (HVAC) systems, security systems, lighting systems, fire control systems, and other building control systems. In some instances, a disclosed system may include a remote contractor system configured to communicate with a plurality of client HVAC controllers over a network, where each of the client HVAC controllers may be a part of a corresponding client HVAC system that services a corresponding client building. The remote contractor system may include a communications port, a memory, and a controller operatively coupled to the communications port and the memory. The communications port may be configured to operatively communicate with a plurality of client HVAC controllers, and to receive data related to the operation of the plurality of client HVAC systems. The memory may store the received data related to the operation of the plurality of client HVAC systems. The controller may be configured to analyze the data related to the operation of the plurality of client HVAC systems and, based at least in part on the analysis of the data, determine if one or more of the plurality of client HVAC systems would benefit from a particular product or service. In some cases, the controller may be further configured to output via the communications port one or more indications that may identify which, if any, of the plurality of client HVAC systems would benefit from the particular product or service.

In another illustrative system, a remote contractor system may be configured to communicate with a plurality of client building automation controllers over a network, where each of the client building automation controllers may be a part of a corresponding client building automation system that services a corresponding client building. The remote contractor system may include a communications port, a memory, and a controller operatively coupled to the communications port and the memory. The communications port may be configured to operatively communicate with a plurality of client building automation controllers, and to receive data related to the operation of the plurality of client building automation systems. The memory may store the received data related to the operation of the plurality of client building automation systems. The controller may be configured to analyze the data related to the operation of the plurality of client building automation systems and, based at least in part on the analysis of the data, determine if one or more of the plurality of client building automation systems would benefit from a particular product or service. In some cases, the controller may be further configured to output via the communications port one or more notifications that each encourage a contractor to contact a consumer associated with a client building automation system that would benefit from the particular product or service.

An illustrative method may be utilized for identifying clients with building automation needs for contractors that service one or more building automation systems. The method may include receiving, storing, and analyzing data related to the operation of a plurality of client building automation systems. The analyzing may be performed using a processor. Then, based at least in part on the analysis of the received data, determining if one or more of the plurality of client building automation systems would benefit from a particular product or service. The method may further include generating one or more indications that identify which, if any, of the plurality of client building automation systems would benefit from the particular product or service and outputting the generated indications to a display for viewing by the contractor.

The above summary of the present disclosure is not intended to describe each disclosed embodiment or every implementation of the present disclosure. The Figures, Detailed Description and Examples which follow more particularly exemplify these embodiments.

BRIEF DESCRIPTION OF THE FIGURES

The disclosure may be more completely understood in consideration of the following detailed description of various embodiments of the disclosure in connection with the accompanying drawings, in which:

FIG. 13 are schematic screen shots showing different views of an illustrative contractor page formatted for different computing devices;

FIGS. 16A-16D are schematic screen shots showing illustrative contractor pages related to the generation of customer report cards;

FIG. 19 is a schematic screen shot of an illustrative case log page of a contractor portal;

FIG. 28 is a schematic screen shot of an illustrative customer connections page of a contractor portal;

FIG. 33 is a schematic screen shot of an illustrative suggestive selling tip of a contractor portal;

Figure 1:
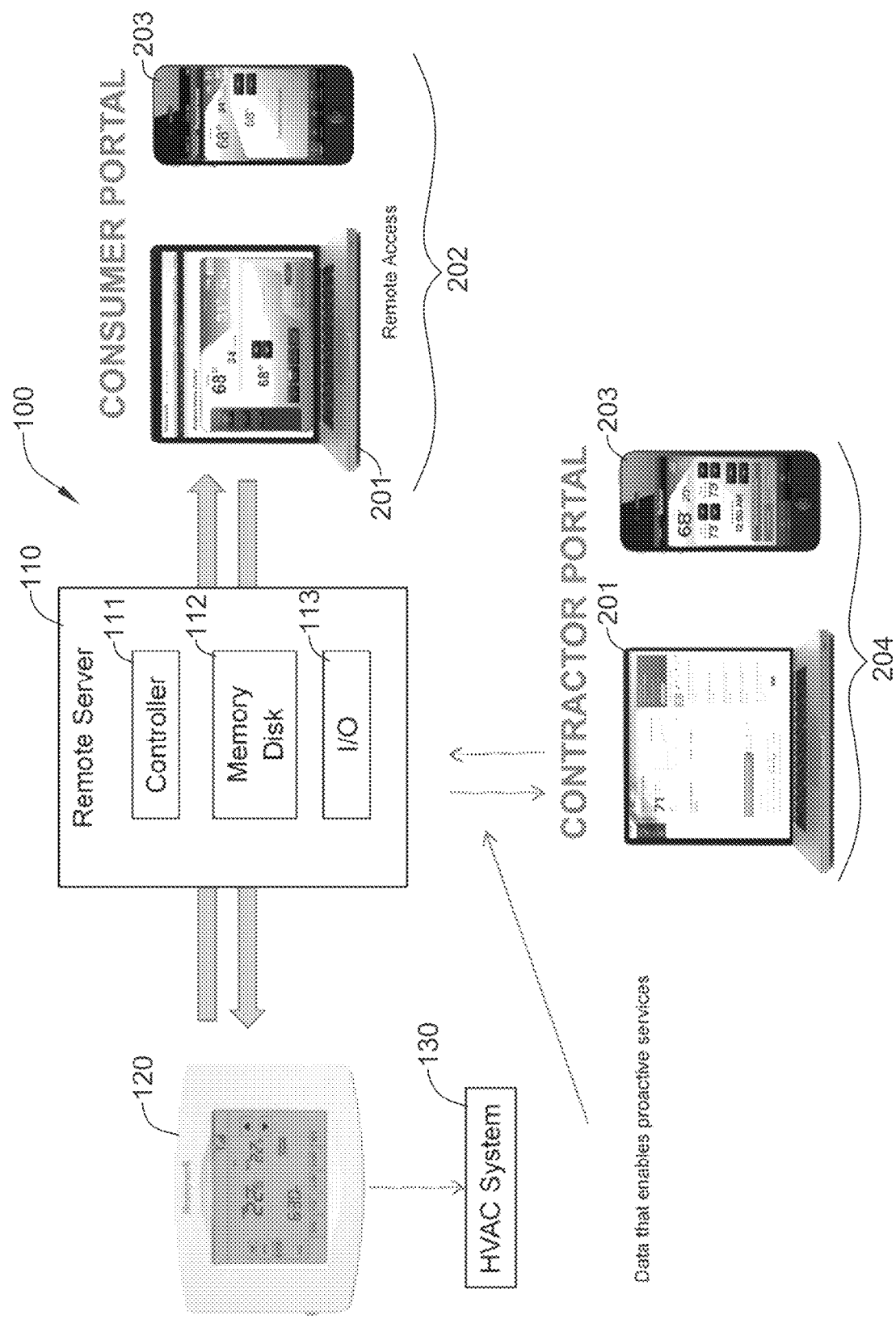
FIG. 1 is a schematic flow diagram of an illustrative system.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict selected embodiments and are not intended to limit the scope of the disclosure. Although examples of construction, dimensions, and materials are illustrated for the various elements, those skilled in the art will recognize that many of the examples provided have suitable alternatives that may be utilized.

Generally, the present disclosure relates to methods, systems and tools for providing improved service for building control systems such as heating, ventilating and air conditioning (HVAC) systems, security systems, lighting systems, fire control systems, and other building control systems. While an HVAC system is used as an example in this disclosure, it is contemplated that the present disclosure can be applied to any sort of building control system.

FIG. 1 discloses a flow diagram of a system 100 (e.g., a remote system comprising a remote contractor system and/or a remote client or customer system) for providing improved service for building control systems. The system 100 may include a remote computing device 110 (e.g. server) communicating with one or more HVAC systems 130 via one or more controllers 120 (e.g., a thermostat or other HVAC controller) associated with each of the one or more HVAC systems 130. The system 100 may also include an internet gateway or modem (not shown), a customer portal 202 (e.g., a web page, an application, a program, and/or other software interface on a hardware interface configured by, on, or through the controller 111 of the remote computing device 110), and/or a contractor portal 204 (e.g., a web page, an application, a program, and/or other software interface on a hardware interface configured by, on, or through the controller 111). The HVAC system 130 and the controller 120 may be generally referred to as a building automation system. The HVAC system 130 and/or the controller 120 may be located at least partially within a building structure (e.g., a client or customer building structure or other building structure), and the remote computing device 110 may be located outside of the building structure at a remote location or within the building structure at a location remote from the HVAC system 130 and/or the controller 120. In some cases, the remote computing device 110 may communicate with a plurality of HVAC systems 130 (e.g., a client or customer HVAC system or other HVAC system) through one or more controllers 120 (e.g., over a wired or wireless network). The remote computing device 110 and/or the contractor portal 204 may be a part of a remote contractor system of system 100. The remote contractor system may be configured to communicate with controller(s) 120 servicing corresponding buildings.

In some instances, the controller 120 may provide test information, maintenance information, and/or other information related to the HVAC system 130 back to the remote computing device 110 via an internet gateway or modem or other communications device. An internet gateway or modem may be used particularly when there is a substantial or insubstantial physical distance between the remote computing device(s) 110 and the controller(s) 120.

The remote computing device(s) 110 may include the controller 111, a memory 112, and/or a communications port 113 (e.g., an input/output port and/or other ports), where the controller 111 is in communication with the memory 112 and the communications port 113. The memory 112 may be configured to store data related to operation of one or more of the controllers 120 (e.g., a plurality of client HVAC controllers associated with a plurality of HVAC systems linked to a contractor), business performance data associated with one or more contractors, customer performance data associated with the one or more contractors, and/or other data, information, and/or instructions. The controller 111 of the remote computing device(s) 110 may be or may include a processor (e.g., a microprocessor) capable of operating software. In some instances, the controller 111 may be configured to output via the communications port 113 one or more alerts related to an operation of an HVAC system associated with a controller 120 (e.g., a client or customer HVAC controller) for viewing by a contractor on a display displaying the contractor portal 204, as further described below.

In some cases, the remote computing device 110 may include a personal computer having a central processing unit, a display monitor, and communication and connectivity means, such as a modem or internet connection. Alternatively, or in addition, the remote computing device 110 may be a server or server farm. Alternatively, or in addition, the remote computing device 110 may include a telephone, a smart phone, a tablet computer, a personal digital assistant (PDA), an ebook reader, etc. The remote computing device 110 may include any number of additional or other components such as data storage (e.g., volatile and/or non-volatile memory) and data routing components, as desired. In some cases, the remote computing device 110 may be or may include a web server that may provide access to and/or control of the controller 120 and/or HVAC system 130 via the Internet and/or other network.

The remote computing device 110 may be configured to operatively communicate with one or more controllers 120 via the communications port 113 over a network. For example, the remote computing device 110 may be capable of transmitting one or more signals to one or more controllers 120 through the communications port 113. Additionally, or alternatively, the remote computing device 110 may be capable of receiving data from the controller(s) 120 regarding the building control system (e.g., the one or more HVAC systems 130). In some cases, the controller 120 and/or the remote computing device 110 may be capable of analyzing (e.g., via trend analysis and/or other statistical analyses) the building control system (e.g. HVAC system 130) related data, and generating one or more output reports based on the received data, which may be requested, received, and/or analyzed by or at the customer portal 202 and/or the contractor portal 204.

In some instances, customers (e.g., an owner or operator of an HVAC system 130) and/or contractors may have computing devices (e.g., a personal computer 201, a mobile computing device 203, etc.) that may communicate with the remote computing device 110, the controller 120, and/or with each other. The customer computing devices and the contractor computing devices may include personal computers having a central processing unit, a display monitor, and communication and connectivity means, such as a modem or internet connection. Alternatively or in addition, the customer computing devices and the contractor computing devices may be telephones, smart phones, tablet computers, personal digital assistants (PDAs), ebook readers, etc. The customer computing devices and/or the contractor computing devices may include any number of additional or other components such as data storage (e.g., volatile and/or non-volatile memory) and data routing components, as desired. The customer computing devices and/or the contractor computing devices may communicate with the remote computing device 110 and/or the controller 120 through any suitable communication technology including, but not limited to, wired communications such as fiber optics, cables, twisted pairs, and the like, and/or wireless communications such as WiFi, radio, BLUETOOTH®, ZIGBEE®, near field, cellular, satellite, and the like. In some cases, the communication between customer computing devices, the contractor computing devices, the remote computing device 110, the controller 120, and/or the HVAC system(s) 130 may be capable of bi-directional (e.g., two-way) communication.

The HVAC system 130 and controller 120 may be one of a number of HVAC systems that are in communication with the remote computing device 110. In one example, there may be 2, 10, 20, 30, 50, 100, 1000, 10,000 or other number of HVAC systems in communication with the remote computing device 110. It is contemplated that the HVAC system 130 may be a residential and/or a commercial HVAC system. In an illustrative instance, the remote computing device 110 may maintain a customer database on memory disk 112 that identifies the particular controller 120 and/or HVAC system 130 that corresponds to each customer. In some cases, the remote computing device 110 may be used to search the customer database according to one or more search criteria, such as a geographic region, type of HVAC system equipment, service level, active alerts, maintenance requirements, and/or in any other suitable manner. An illustrative embodiment of one of the HVAC systems 130 is described below.

Figure 2:
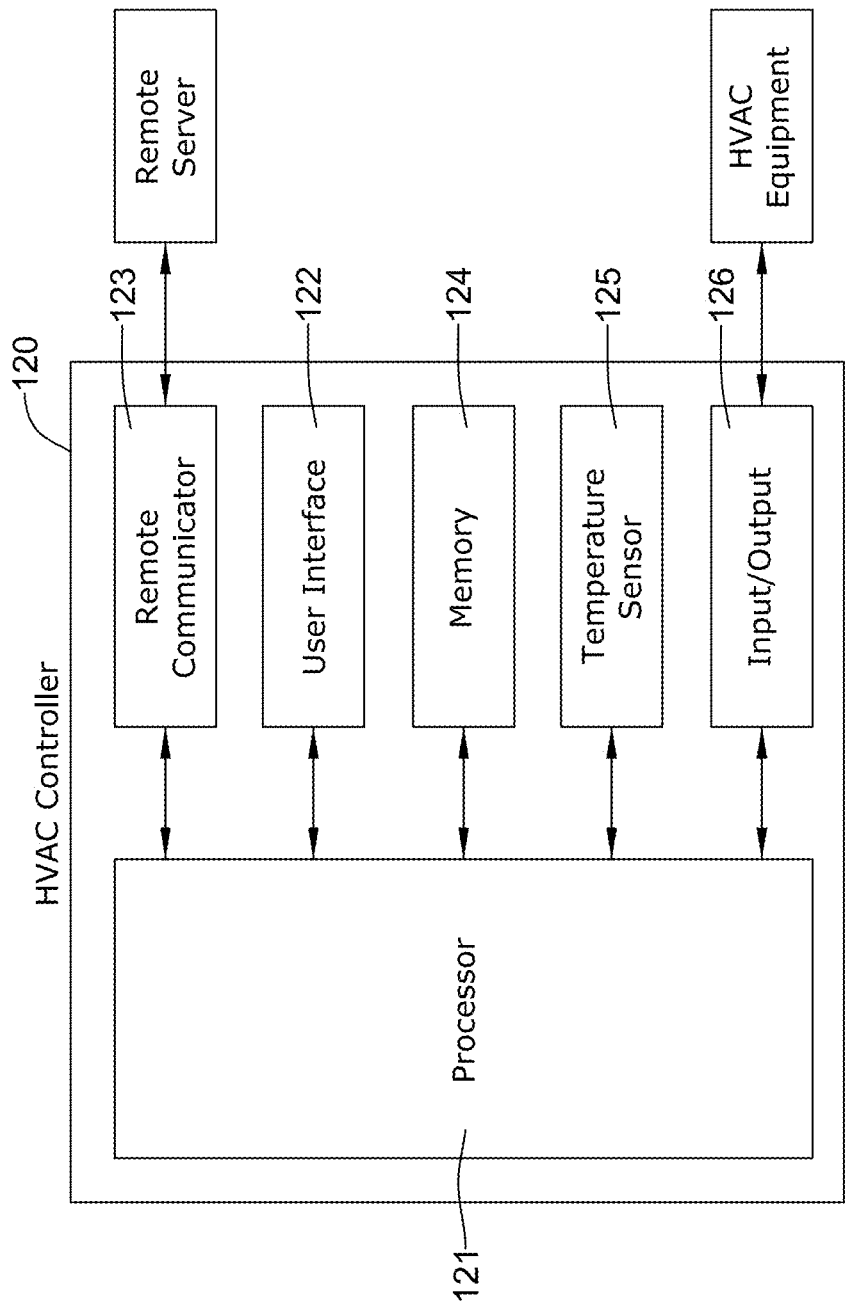
FIG. 2 is a schematic block diagram of an illustrative HVAC controller.

FIG. 2 is a block diagram of an illustrative controller 120. The controller 120 may be any suitable controller, and in an illustrative instance, may include a processor 121 (e.g., a microprocessor or other processor), a user interface 122 (e.g., a display and/or keypad), a remote communicator 123 (e.g., a modem, gateway, etc.), a memory 124, a temperature sensor 125, and/or an input/output port 126. In some embodiments, the controller 120 may be coupled to the remote computing device 110 and/or the customer portal 202 and/or the contractor portal 204 via the remote communicator 123 and to the HVAC system(s) 130 (e.g., HVAC units or components thereof) via the input/output port 126. In some instances, the controller 120 and the HVAC system 130 may communicate over a common wired or wireless connection. In some cases, a common wire or bus may be configured to be compatible with the ENVIRACOM® protocol, provided by the assignee of the present disclosure, but this is not required. The ENVIRACOM® protocol may facilitate HVAC appliances, thermostats, gateways and other components communicating with each other over a common bus.

The processor 121 may be capable of being programmed such that the controller 120 changes one or more control signals sent to the HVAC system 130 based on the time of day, temperature, humidity, ventilation, or any other desired parameter. The user interface 122 may provide parameter readings and/or set point information to the user. The memory 124 may be embodied in a variety of forms, for example, read only memory may be used to retain operating and/or maintenance programs and predetermined values and random access memory may provide working memory space, as desired. The memory 124 may be volatile and/or non-volatile memory. The foregoing elements may be implemented by any suitable devices.

The temperature sensor 125 of the controller 120 may be located within or at the controller and/or the temperature sensor 125 may be located remote from the controller 120. The controller 120 may include or be in communication with a single temperature sensor 125 or more than one temperature sensor. Remotely located temperatures sensor(s) 125 may communicate with the controller 120 through the input/output port 126 or in any other manner.

In addition to the temperature sensor 125, the controller 120 may communicate with the one or more other sensors (e.g., humidity sensor, motion sensor, infra-red sensor, etc.). The one or more sensors other than the temperature sensor 125 may be located within or at the controller 120 and/or remote from the controller 120. Remotely located sensors other than the temperature sensors 125 may communicate with the controller 120 through the input/output port 126 or in any other manner.

In some cases, the controller 120 may be configured to track and/or store data and/or information related to the HVAC system 130 and/or operation of the HVAC system 130, where the controller may store the data and/or information in the memory 124 at the controller 120 and/or in memory 112 at one or more remote computing devices 110. The data and/or information related to the HVAC system 130 that the controller 120 may track and/or store can include performance data such as alerts, user interactions with the controller and/or the HVAC system (e.g., an interaction log), control settings, control settings of a controlled area relative to environment conditions exterior the controlled area, and/or any other suitable data and/or information. The controller 120 may track and/or store particular data and/or information on its own initiative in response to a previously programmed algorithm and/or upon a request from the remote computing device (e.g., via a customer using a customer portal 202 or a contractor using a contractor portal 204).

Based on the data and/or information tracked and/or stored by the controller 120, the controller 120 may generate one or more reports viewable from the customer portal 202 and/or the contractor portal 204. The controller 120 may generate the reports on its own initiative (e.g., as initially programmed or in response to recognizing a threshold value) or in response to receiving a command from the remote computing device 110, the customer portal 202, and/or the contractor portal. The generated reports may include data and/or information over a set time period, data and/or information compared to another set of data and/or information (e.g., controlled area settings versus outdoor temperatures, etc.), and/or any other analysis of the data or information.

The user interface 122 (e.g., a display and/or keypad) of the controller 120 may display one or more messages and/or queries. The messages and/or queries displayed on the user interface 122 of the controller 120 may be the same or different messages and/or queries than messages and/or queries that may be displayed at a customer portal 202 or the contractor portal 204. The messages and/or queries may include, but are not limited to, alerts related to the HVAC system 130, queries from a contractor entered at the contractor's portal 204, HVAC system setup or operating questions or messages, etc. In one example, customers may be able to access the customer portal 202 at the controller 120 and/or the contractors may be able to access the contractor portal 204 at the controller 120.

In some instances, customers may sign up with a contractor for remote monitoring of their HVAC systems 130 through system 100, where customers may be considered to be owners and/or operators of their respective HVAC systems 130. As a result of signing up for remote monitoring with a contractor, the customer may have remote access (e.g., access through customer portal 202) to the monitoring of its HVAC system 130 through system 100. An illustrative sign up process is discussed in greater detail below.

As used herein, the term "contractor" denotes an HVAC maintenance or installer contractor or HVAC maintenance or installer contractor company that may perform maintenance on and/or install the HVAC system 130 located in customers home or building. The term "contractor" may also refer to other entities such as HVAC manufacturers, OEMs and/or others, as desired.

Figure 3:
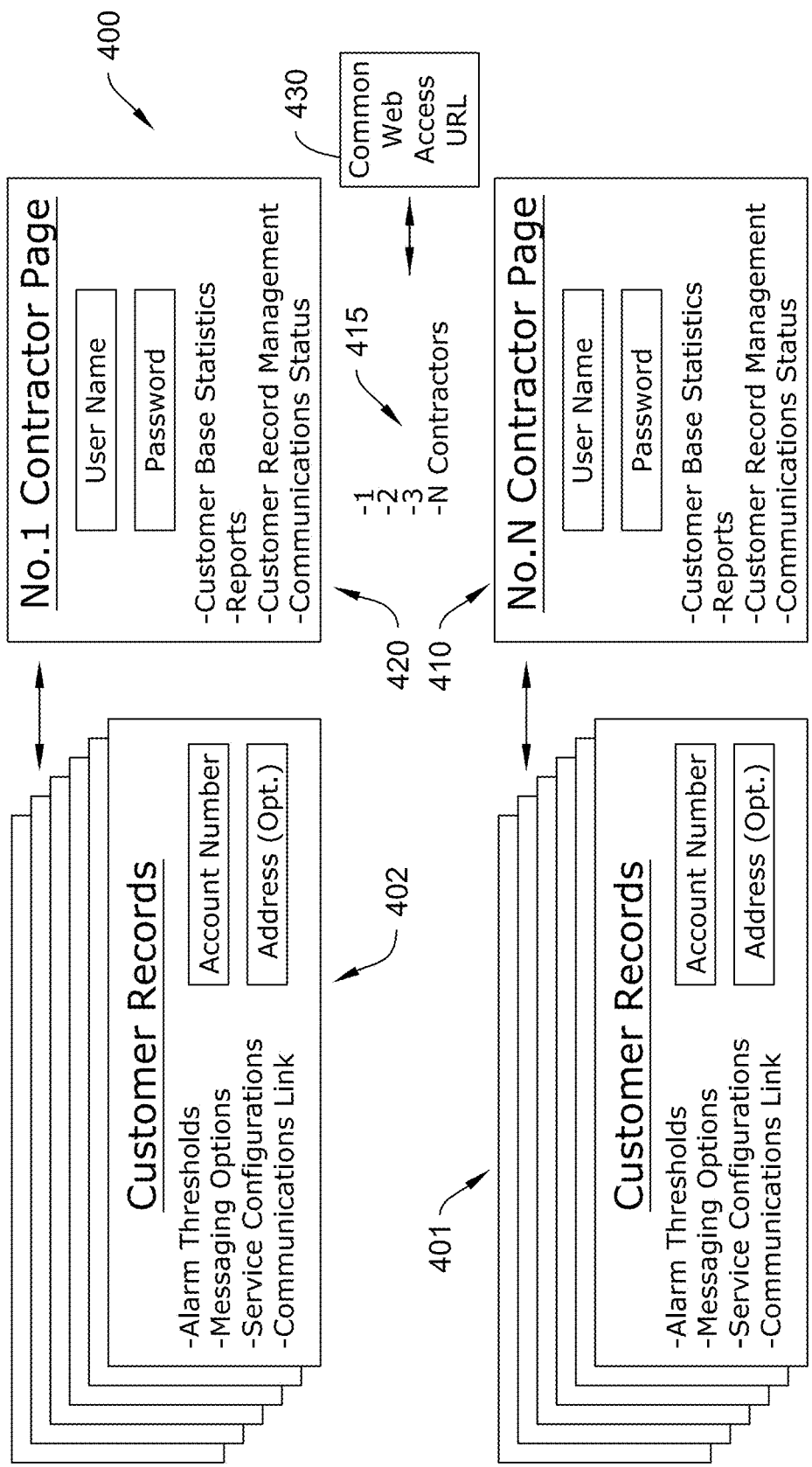
FIG. 3 is a schematic diagram of an illustrative contractor web access architecture.

FIG. 3 is a schematic diagram of an illustrative embodiment of a contractor web access page 400. The contractor web access page 400 may correspond to the contractor portal 204. In some instances, the contractor web access page 400 may be operated by software useful for managing a customer database and utilizing the data storage and routing information described above. While "web pages" are used as an example in FIG. 3, it should be recognized that the user (e.g. contractor or customer) may interact with the information via an "app" that is running on a portable or other electronic device, or in any other suitable manner.

In an illustrative embodiment, one or more contractors 415 may each have a set of web pages associated with their contractor accounts such as, for example, a set of web pages associated with a No. 1 Contractor account 420 and a set of web pages associated with a No. "N" Contractor account 410. Each contractor 415 may access its set of web pages via a common web access URL 430 by entering a user name and password unique to the contractor. Each set of contractor web pages 410, 420 may display information regarding its HVAC maintenance customer base such as, for example, customer base statistics, HVAC unit or component reports, customer record management, communications status, and the like.

Each set of contractor web pages 410, 420 may be linked to a customer database 401, 402. Each customer database 401, 402 may include information for each HVAC customer such as, for example, customer account number(s), HVAC system/customer addresses, alarm thresholds, messaging options, service configurations, communication link information, alarm history, alarm solution history, and the like. The information provided in the customer records 401, 402 may be supplied for each customer with an HVAC system 130. The customer database 401, 402 may be located within controller 120, the remote computing device 110, or the customer base database 401, 402 may be stored in any other location and may be in communication with the controller 120 and/or the remote computing device 110. In one example, each contractor 415 may use the data provided through its set of web pages associated with its account to determine which customer HVAC systems 130 may require maintenance, and then perform the required maintenance either remotely or onsite. Other uses of the data provided through the set of contractor web pages are contemplated and at least some of those other uses are disclosed herein.

In some instances, the contractor portal 204 may allow the contractors to create customized alerts, reports, tests, set protocols to fix identified issues, and other customizations to the interactions between the contractor and the customer or customer's HVAC system 130. In one example, a contractor may develop customer reports on any data and/or information within its contractor portal 204 pertaining to HVAC system data, customer management, customer inputs, partners (e.g., application programming interface partners), local or networked partners (e.g., partners providing non-HVAC systems services and/or products), etc. These customized alerts, reports, tests, fix protocols, and other customizations may be formatted for specific audiences. For example, a technician job history report may be developed that is customized to include information that is deemed relevant to a technician, and a customer job history report may be developed that is customized to include information that is deemed relevant to a customer. The alerts, reports, tests, fix protocols, and other customizations may be configured in electronic form (e.g., saved in memory or applied electronically) or may be configured in hard copy form (e.g., printed out or manually performed).

The customer portal 202 may include a set of customer web access pages that may be operated by software useful for managing data obtained from a customer's HVAC system 130. The customer portal 202 may be accessible from a common or different web access URL or application for each customer. Each customer may access their customer specific set of web pages by entering specific login credentials (e.g., a particular username and password) at the associated URL or mobile application. Each set of customer pages may be linked to the customer's building automation system, such that information about the HVAC system(s) 130 may be accessed via the customer database (e.g., customer databases 401, 402). The information stored in the customer database may include, but is not limited to, account number(s), address(es) of the HVAC system 130, associated contractor (s), alarm history, messaging options, service configurations, a calendar that may be synced with a personal calendar and/or a contractor's calendar, and the like. Further, the set of webpages of the customer portal 202 may include an option to search for contractors within a particular geographical area, by specialty, by rating and/or via one or more other filters. In at least one instance, the ability to search for contractors may be accessible by customers and potential customers alike (e.g., without requiring login credentials).

Figure 4:
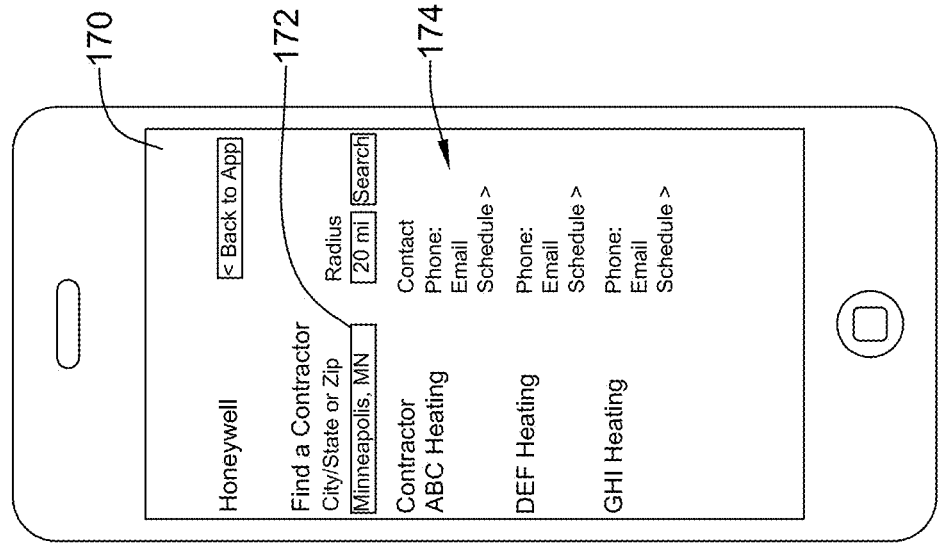
FIG. 4 is a schematic screen shot showing an illustrative contractor search page displayed on a mobile device.

FIG. 4 is an illustrative depiction of a contractor search page 170. The contractor search page 170 may include a search box 172 and a search results section 174. The results section 174 may display results of a contractor search query, which may include names of one or more contractors and the contractors' contact information, along with other information as desired (e.g., customer feedback, ratings, contractor location via maps, etc.).

When setting up its contractor profile (see FIG. 8), a contractor may use a graphical map, a listing of zip codes, or any other suitable mechanism to set its area of service. The set area of service may be utilized when a customer or potential customer is searching for a contractor. The area of service may be associated with one or more zip codes within the contractor specified area of service and the system 100 may display the contractor's contact information when a search is executed for a contractor to service a location (e.g. customer's home) that is located in the contractor's service area.

Figure 5:
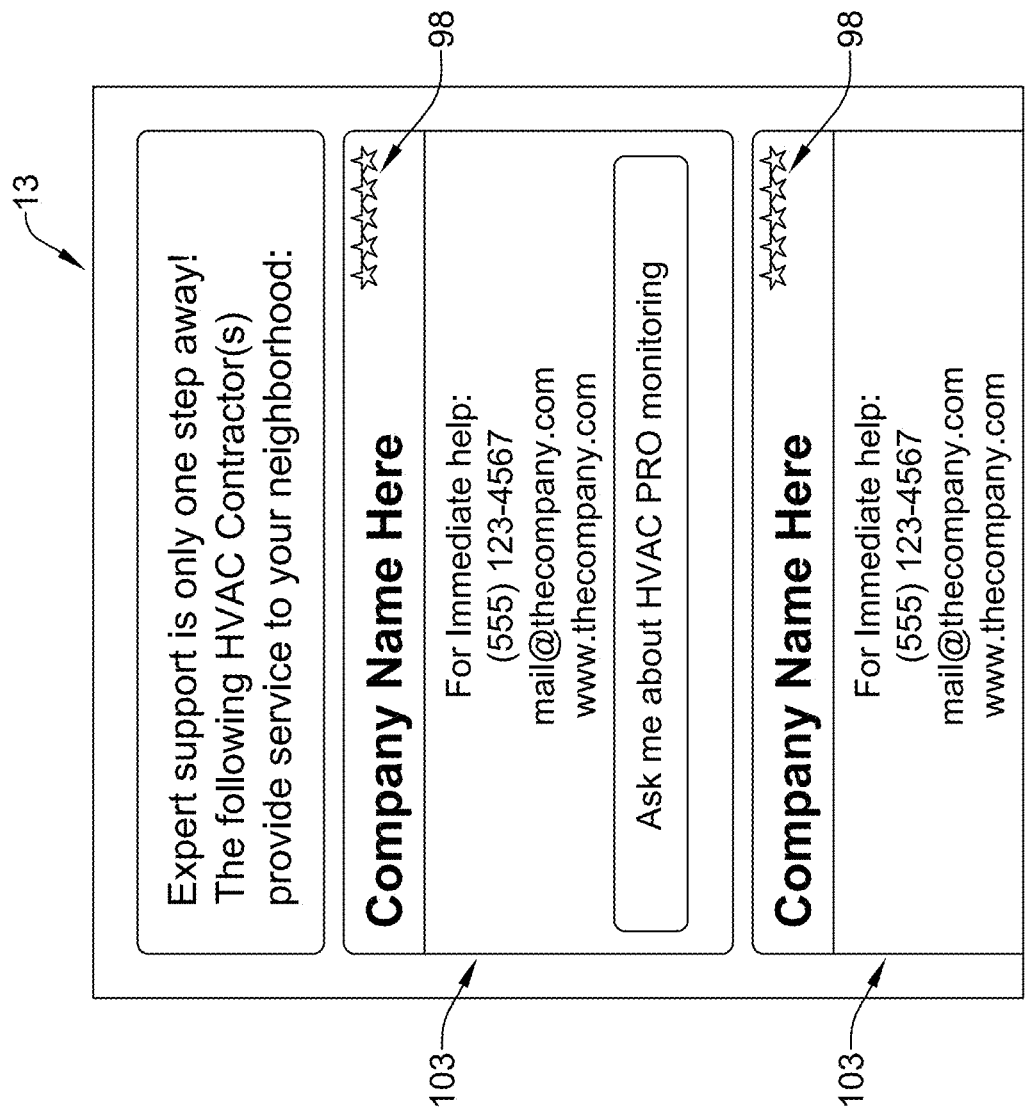
FIG. 5 is a schematic screen shot of an illustrative electronic business card that may be displayed in response to a contractor search via the contractor search page of FIG. 4.

One tool of the system 100 that customers and/or potential customers may view when searching for contractors, is a contractor electronic business card 103, as shown in FIG. 5, viewable by customers and potential customers in a contractor's established service area. The electronic business card 103, which may be labeled "Find A Dealer" or may have any other name associated therewith, may list one or more contractors that have a service area overlapping with the location of the customer or potential customer, and provide contact information for each such contractor.

Optionally, customer ratings 98 for each contractor (e.g., averaged customer ratings or other customer ratings), as shown in FIG. 5 as a set of stars, may be displayed on the electronic business cards 103. The electronic business card 103 may allow the customers or potential customers to contact the contractor directly via phone, email, website visit, etc., or indirectly by requesting a follow up regarding services the contractor may be able to provide. In some instances, contact may be initiated by clicking on a phone number, email address, or other selectable feature on the electronic business card 103.

The listing of one or more contractors may be communicated from the controller 111 of the remote computing device 110 to a display for viewing by a customer. In some instances, the listing of one or more contractors may be displayed on a display of a building automation controller (e.g., HVAC controller 120) that corresponds to the building automation system for which an alert has been indicated and/or on a display of a device (e.g., a smart phone, a tablet, a laptop, a person computer, and/or other device) that may be associated with the building automation system for which an alert has been indicated. In some instances, the controller 111 of the remote computing device 110 may be configured to display the listing of one or more contractors in a pop-up window or other window or page on a display of a user or customer's device.

The listing of one or more building automation system contractors may be provided in any suitable order. For example, the listing of one or more building automation system contractors may be ordered based, at least in part, on the listed contractors ability to address an alert (e.g., an ability as determined by a listing of specialties, education, or other objective analysis of abilities), on customer based ratings, on geographic proximity to the geographic location of the customer's HVAC system, alphabetically, and/or on one or more other parameter.

From the listing of building automation system contractors, a customer may be able to select a contractor. Once a customer has selected a contractor, the controller may be configured to output a notification to the selected contractor.

A list of local contractors may be developed and/or a contractor may be contacted when an abnormality is detected and/or an alarm created. In one example, the controller 111 of a remote system 100 may be configured to determine if a building automation system (e.g. HVAC system 130) for which an alert has been generated is already associated with a contractor. If the building automation system (e.g. HVAC system 130) for which an alert has been generated is not already associated or linked with a contractor, the controller 111 may be configured to output via the communications port 113 information of local contractors (e.g., building automation system contractors) along with the active alert. In one example, when a customer is using the system 100 to monitor its HVAC system(s) 130 (or other building automation systems), and the customer is not directly associated with a particular contractor, a list of one of one or more local contractors (e.g., electronic business cards 103) may be populated on the customer's set of web access pages when an alert occurs (e.g., the web access page may read "A compressor has failed. Here is a contractor that can help . . . ").

In instances where the customer is already associated with a contractor in the system 100, the controller 111 may be configured to output via the communications port 113 an indication of the associated contractor (e.g., electronic business cards 103) and/or that the associated contractor has been notified of the alert. In one example, the indication displayed may read "A compressor has failed. Your contractor has been notified". The controller 111 may be configured to output one or more other indications indicating a contractor has been contacted about an alert.

In order for customers to receive full access to a set of personalized customer web access pages, the customer may need to receive an invitation from a contractor in the system 100. Receiving an invite from a contractor in the system 100 may allow the customer to sign up for an HVAC monitoring service provided by system 100, and/or directly enroll with the contractor that sent the invite. The customer may be enrolled for a short period of time (e.g. for 4 hours or other amount of time that may encompass a service call, enough time to run a diagnostic, etc.), or a longer term (e.g., to allow for monitoring system 100 over time), as desired.

Figure 6:
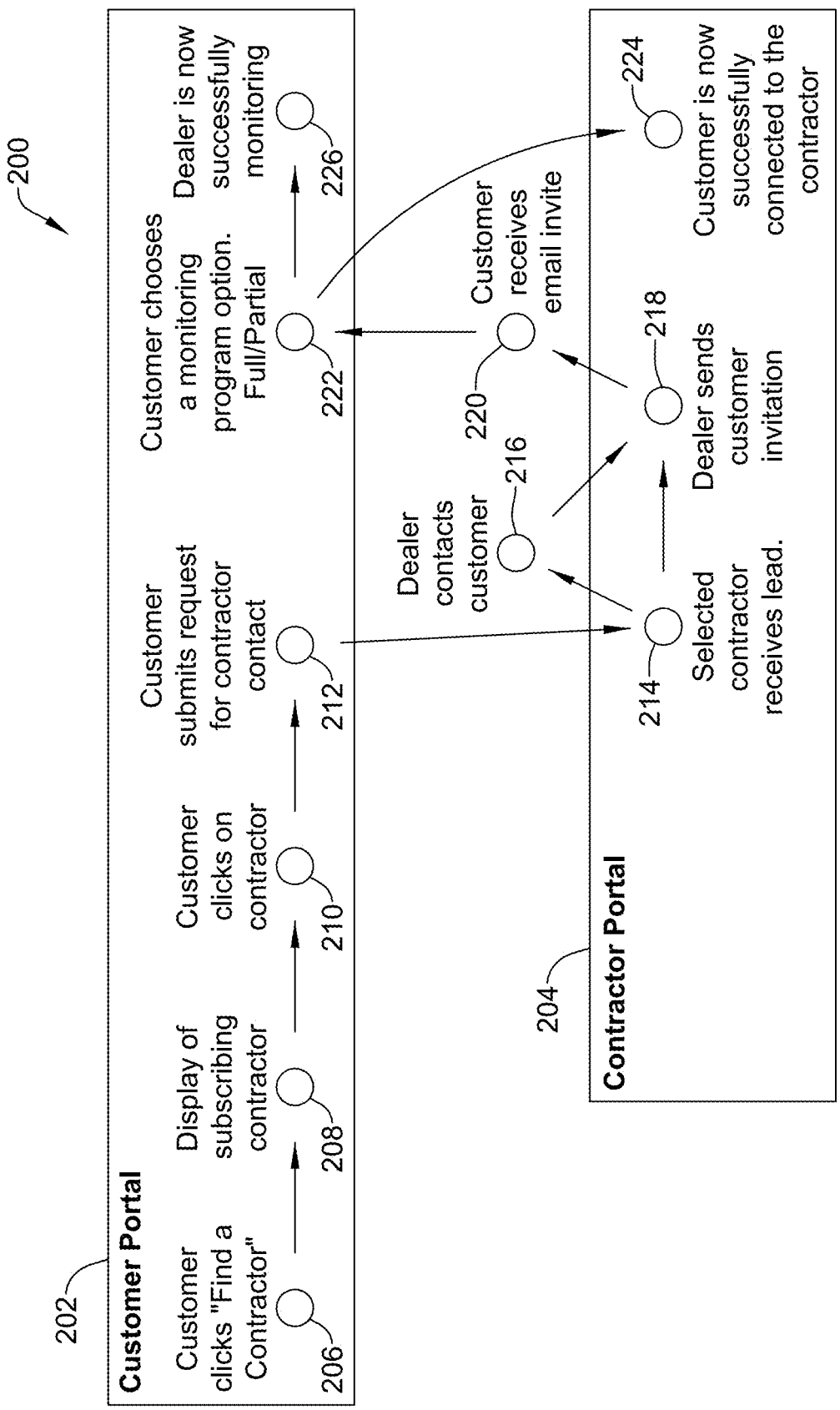
FIG. 6 is a schematic flow diagram of an illustrative method of engaging a contractor.

FIG. 6 shows an illustrative flow diagram 200 for signing up a customer for building automation system (e.g., HVAC system) monitoring services and/or for a contractor to gain access to a user's HVAC system or other building automation system via one or more networks. Initially, and in one example, through the customer portal 202 (e.g., web access through a web page or app), the customer may search 206 for a contractor in its geographical area by entering a keyword search, clicking "Find a Contractor" that uses the location services (e.g. GPS) of the computing device to determine a search area, and/or through any other desired search technique. The customer portal 202 may populate and/or display a list of contractors servicing the customer's area 208 in response to the search query by the customer. As the customer is reviewing the displayed list of contractors, the customer may select or click on one or more of the contractors 210 for further information related to the selected contractor. Once a customer identifies a potentially suitable contractor, the customer may submit a request 212 for that contractor to contact the customer. The contractor may then receive the request 214 from the customer through a contractor portal 204 and the selected contractor may contact the customer 216 and/or send the customer a customer invite 218 (e.g., after or before contacting the customer 216) to invite the customer to the monitoring service of system 100.

From the received invite 220 and through the customer portal 202 or other mechanism using a device of the customer, the customer may choose a monitoring program 222 (e.g., a full or partial monitoring program for a desired period of time) that best suits the customer's needs and also which may limit or grant a certain level of access to the selected contractor to its building automation system. Once a monitoring program has been selected by the customer, the customer's building automation system may be automatically set up for monitoring (assuming all necessary hardware has been installed, e.g. a thermostat in communication with the internet) by the contractor that sent the invite 226 and the customer and contractor may have linked accounts 224 to facilitate the monitoring, scheduling and/or performance of maintenance checks, etc. Even after the customer and contractor are linked through the system 100, the customer may have the ability to disconnect the contractor portal 204 from its building automation system (and corresponding data and/or information) and/or its customer portal 202, which may allow the customer to retain control of its HVAC system data and/or information.

In one example of a method for a contractor to gain access to a user's building automation system (e.g., a first client's HVAC system or other building automation system) via one or more networks, a controller 111 of the system 100 may be configured to send an electronic invitation to a device of the user via the communications port 113, wherein the electronic invitation may solicit the user to grant or deny access to the user's building automation system by the system 100. In some cases, a contractor may send an electronic invitation directly to a user's device. The invitation may be sent in response to the system 100 or the contractor receiving a request from a user of the system, or the invitation may be sent for other reasons.

In some instances, where a contractor is or has a potential to work with a customer that is not signed up for HVAC system monitoring, but otherwise has the equipment for such monitoring, the contractor may send that customer or potential customer an invite for partial or full access to monitoring through the system 100. To associate the customer's or potential customer's building automation system with the contractor, the contractor may ask the customer for an building automation system identifying code or other mechanism for allowing the contractor to locate the customer or potential customer's building automation system on the network. With this partial or full monitoring feature, once the customer accepts the limited invite, the contractor may be able to run tests, run diagnostics, and/or change settings on the customer's or potential customer's building automation system from a remote location (e.g. from contractor portal 204). Such ability saves the contractor time in traveling to the location of the building automation system. Further, the customer need not necessarily be present when the contractor is diagnosing/testing the customer's building automation system.

The controller 111 of the system 100 and/or the contractor may receive an electronic response to the electronic invitation from the user that either grants or denies the contractor access to the customer's building automation system (e.g., access to data related to the operation of the user's building automation, access to control the user's building automation system onsite and/or remotely, access for a set period of time, etc.). Data related to operation of a customer's building automation system may include, but is not limited to, one or more of historical operational data, current operational data, future operational data, two or more of historical, current, and future operational data, data of or related to a user interaction log that records user interactions with the customer's building automation system, and/or other data.

If the electronic response grants the contractor access to the customer's building automation system, the system 100 may obtain access to the operation of customer's building automation system and the contractor may obtain access to the customer's building automation system via the system 100. In one example, when access is granted to a customer's building automation system, gaining access may include the controller 111 downloading data from the customer's building automation system via a network and/or providing access to a database that stores data that has been downloaded from the customer's building automation system via the network. If the electronic response denies the contractor access to the customer's building automation system, the system 100, and thus the contractor, may not gain access to the customer's building automation system, including data and/or control thereof.

Electronic invitations sent to a user's device may include, but are not limited to, an invite email that is electronically sent to a customer's email account, an invite text message that is sent to a customer's text message account, and/or one or more other types of invites that are sent to one or more other types of accounts. Illustratively, the invites may include a link to a web page that may provide a solicitation for a customer to grant or deny access to a customer's building automation system. If a customer selects a grant option, a first electronic response (e.g., a grant electronic response) may be received by the system 100 granting access to the customer's building automation system. If a user selects a deny option, a second electronic response (e.g., a deny electronic response) may be received by the system 100 denying access to the customer's building automation system.

In some cases, the electronic invitations sent to a user may solicit a customer (e.g., via a webpage from a link in an invite or via one or more other mechanisms) to select a level of access (e.g., a level of access may be related to the detail of data provided with a level of access, the type of components to which access is granted, etc.) to grant to the system 100 (e.g., controller 111) and/or the contractor from one or more different levels of access related to the operation of the customer's building automation system. Additionally, or alternatively, the electronic invitation sent to a customer may solicit a customer (e.g., via a webpage from a link in an invite or via one or more other mechanisms) to select a period of time for which the system 100 and/or contractor may have access to the customer's building automation system and then, a response received at the system 100 and/or by the contractor may include a grant of access for a selected period of time.

In some instances, if a customer selects a new contractor, its historical HVAC system data and/or information provided to the first contractor (e.g., a former contractor) may or may not be delivered and/or made available to the second contractor (e.g., a new contractor). In instances where the data and/or information is not delivered and/or made available to the second contractor, customers may be incentivized to stay with the first contractor.

FIGS. 7-12 are a schematic flow diagram showing an illustrative contractor portal 204 for use by a contractor. After logging into the contractor portal 204 with a username and/or password, a homepage 20 may be displayed. The Homepage 20 (discussed further below) may provide contractor selected categories (or pre-set categories) of information regarding the contractor's customers and/or the contractor's customers building automation systems. Additionally, or alternatively, the Homepage 20 may provide other contractor selected information, such as, but not limited to, current weather 21, forecasted weather, driving conditions, customer reviews, supplied products and/or prices, calendars, schedules, and/or any other suitable information. In some instances, the current weather 21 for the general service area of the contractor may be displayed on each page, or at least one page, of the contractor portal 204. One or more of the features or information (e.g., in boxes) displayed on the Homepage 20 may include a link (hidden or otherwise), where in response to selecting the link, the controller 111 may be configured to provide more detailed information corresponding to the higher level information displayed on the Homepage 20.

Figure 8:
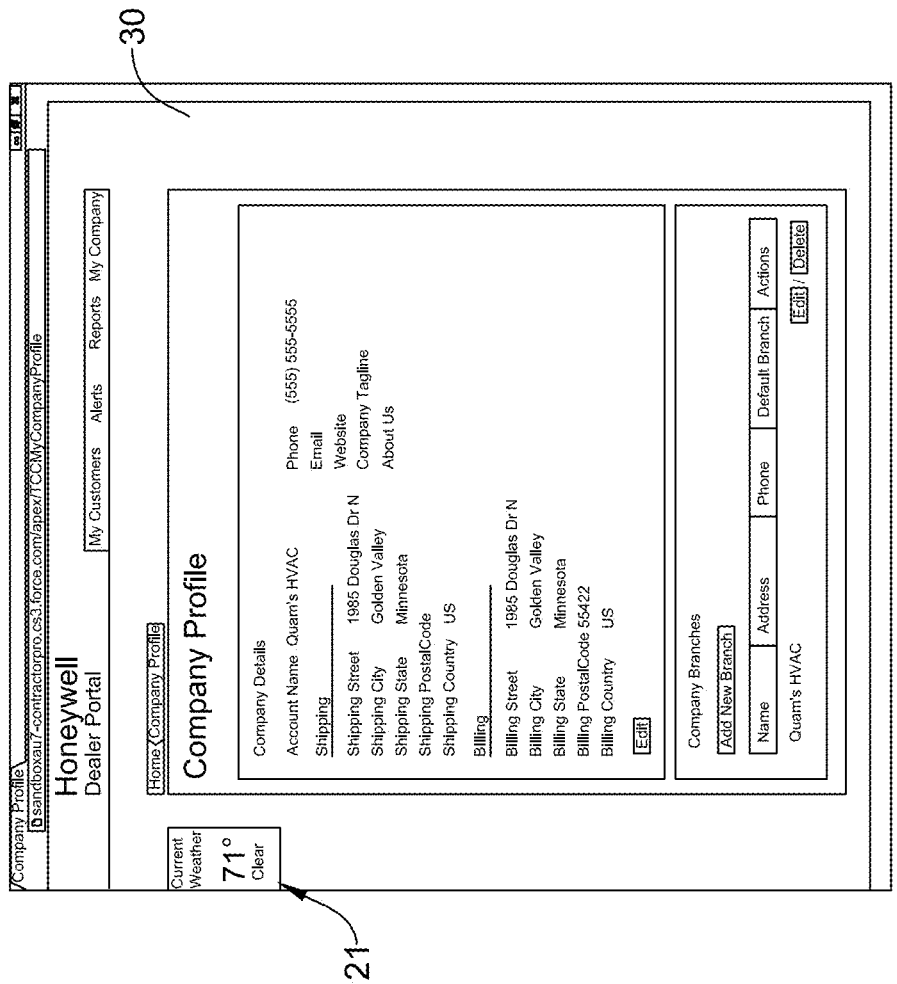

From the Homepage 20, a contractor may be able to navigate to a My Profile page 30, as shown in FIG. 8. The My Profile page 30 may provide personal account information for the contractor and/or other information tied to the username and/or password used to log in to the contractor portal 204, as better shown in FIG. 8. Personal account information may include, but is not limited to, company name, address, phone number, email address, web site address, service area, product expertise, manufacturer's certifications, and/or any other suitable information pertaining to the contractor. The My Profile page 30 may further include an edit button to edit the personal account information of the contractor.

Figure 9:
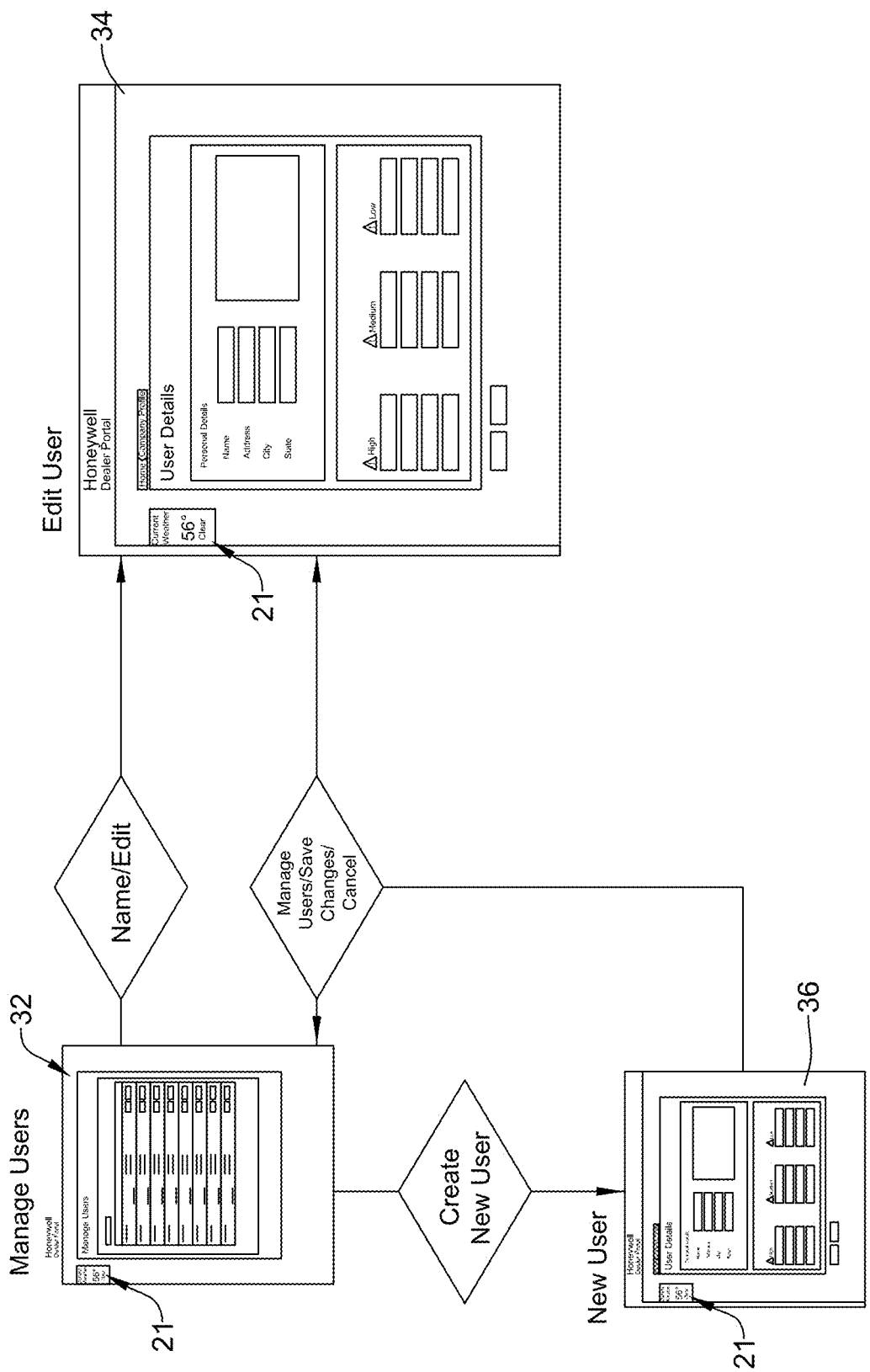

In one example, a contractor may be able to enter the my profile page 30 and navigate to a manage users page, where a list of selectable or unselectable users may be listed. As shown in FIG. 9, from the manage users page 32, the contractors may be able to edit or delete users through an edit users page 34 and/or navigate to a new users page 36 from which new users may be added to the contractor's profile. The other users may be other technicians, contractors, employees, networked partners associated with the log-in credentials for the contractor's account in system 100. In some cases, each of the user's may have selected access rights. Some users (e.g. general manager of the contractor) may have full access rights to all data, while other users (e.g. service technician) may have access to only a limited subset of the data. In some cases, such access rights can be assigned/managed via the manage users page 32.

Figure 7:
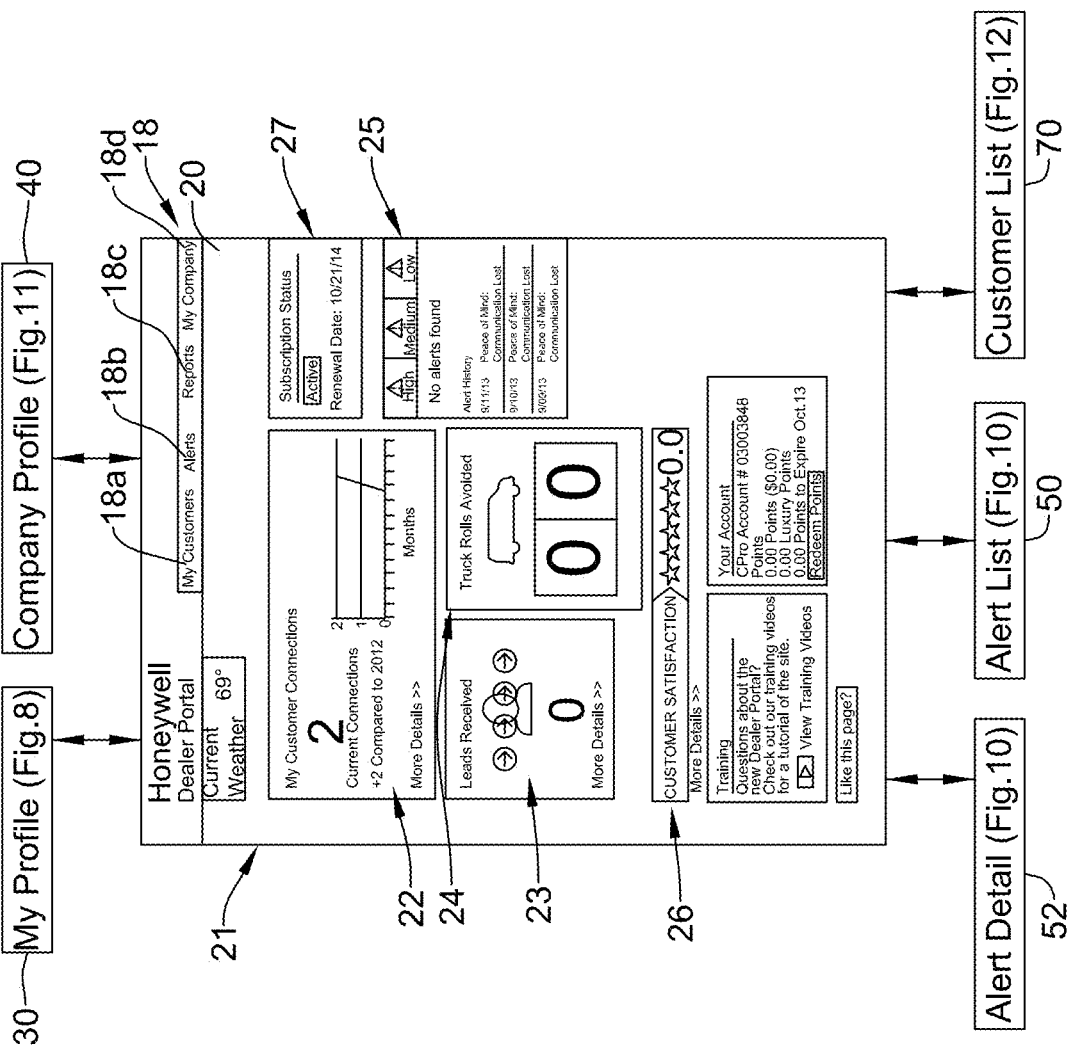
FIGS. 7-12 are a schematic flow diagram showing an illustrative contractor portal for use by a contractor.
Figure 10:
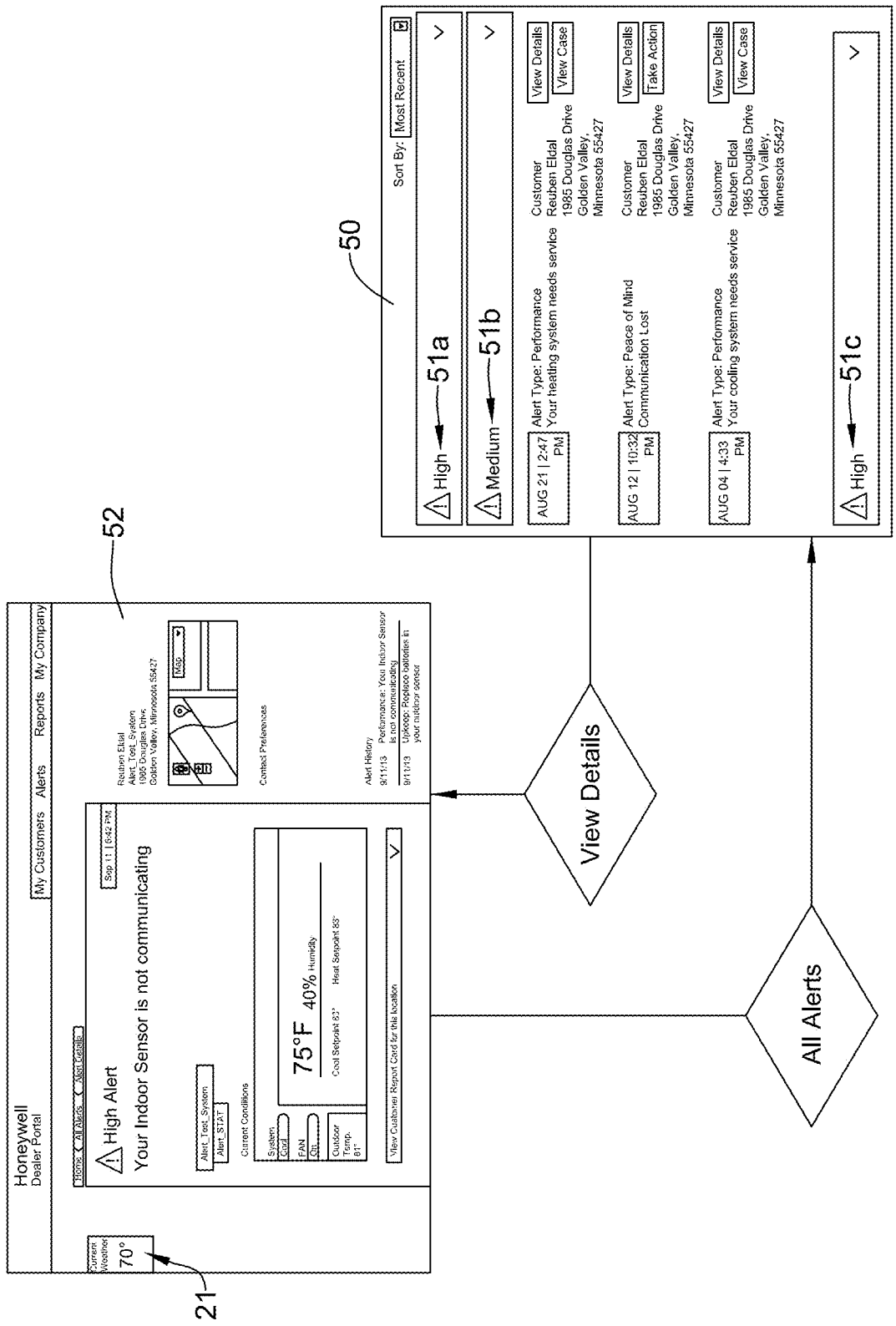

Further, as shown in FIG. 7, from the homepage 20 a contractor may navigate to an alert page 50. The alert page 50, as best shown in FIG. 10, may provide information related to alerts regarding the operation of one or more customer HVAC systems 130. The alerts, in some instances, may be classified into different groups. In one example, the alerts on the alert page 50 may be classified as being a High alert, a Medium alert, or a Low alert. Illustratively, the alerts on the alert page 50 may be in list format, or in any other format, and a contractor may access further information related to an alert by selecting the alert from the list of alerts, which may result in navigating to a more detailed alert page 52. In some cases, the more detailed alert page 52 may display a map of the location of the customer with the HVAC system 130 that triggered the alert, the particular issue or issues with the HVAC system 130, a suggested underlying cause of the alert, a suggested solution for fixing the cause of the alert, a suggested list of replacement parts and/or tools required to address the alert, and/or other information related to the alert. In some instances, a new alert may be shown on the Homepage 20, and if a contractor selects the new alert, the contractor may be taken directly to the more detailed alert page 52, rather than first navigating to the alert page 50.

In some instances alerts may be ignored by the contractor for a time period. Such ignored alerts may reappear on a contractor's homepage 20 after a period of time as a reminder that the alert has not been addressed. In one example, if an alert is a low level alert, a contractor may choose to or select to ignore the low level alert and wait until the alert repopulates on its homepage 20 to address the issue.

Figure 11:
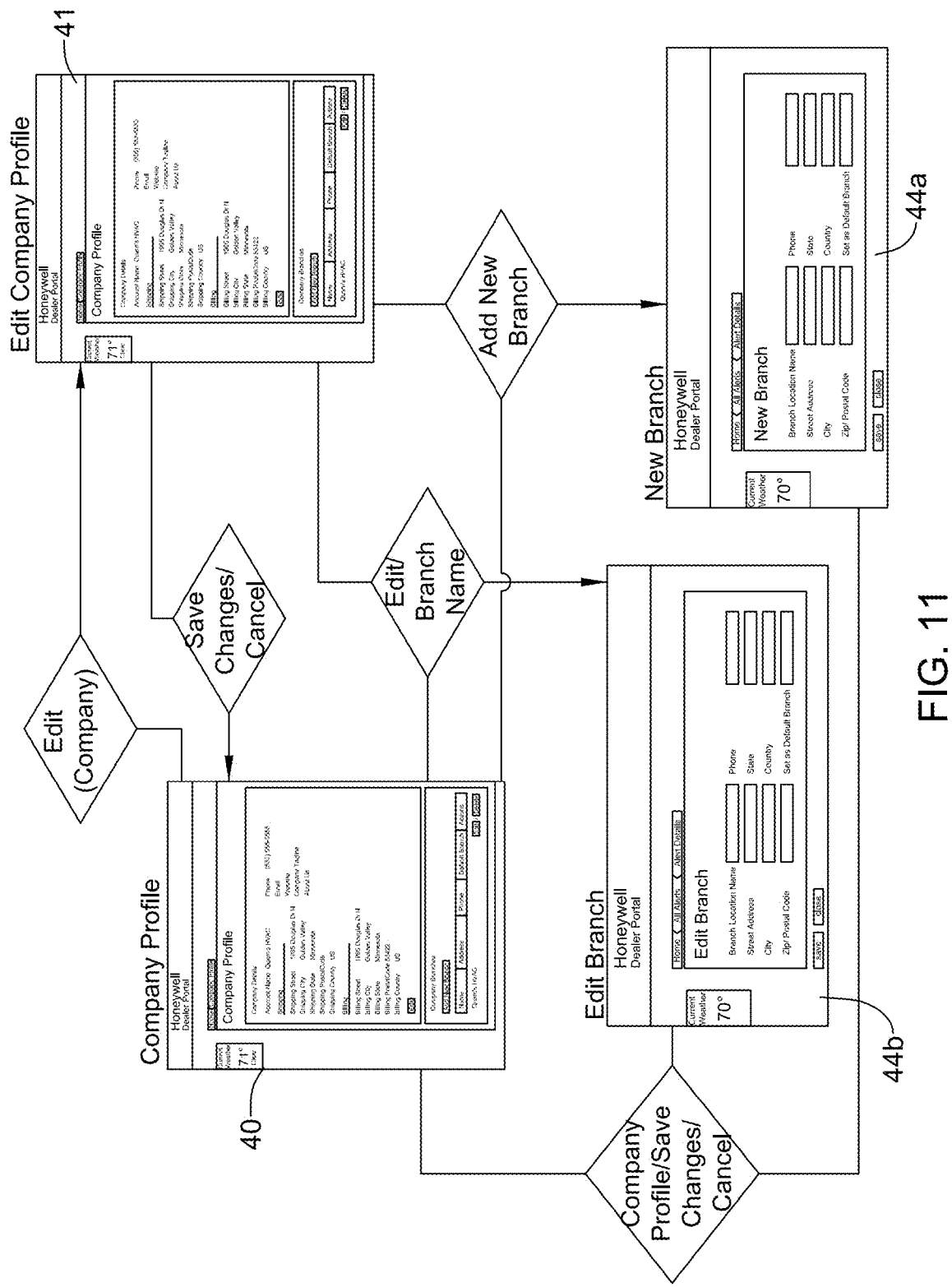

As shown in FIG. 7, from the homepage 20 or other page, a contractor may navigate to a My company or company profile page 40. The company profile page 40, as best shown in FIG. 11, may provide biographical information about the company for which the contractor may work and/or with which the contractor may be affiliated, along with a listing of local branches of the company. The company biographical information may include, but is not limited to, company history, HVAC products used and/or services provided by the company, branch information, technician information, corporate headquarters information, and/or other company information. From the company profile page 40, the contractor may navigate to an edit company profile page 41. In some instances, access to the edit company profile page 41 may be password protected and/or the information thereon may be controlled by the company itself. Alternatively, or in addition, the edit company profile page 41 may be controlled by the contractor, as desired. From the edit company profile page 41, the contractor and/or other users may be able to add new branches to the company from the new branch page 44a and/or edit branch information from the edit branch page 44b. In one example, a large Company A that has several branches may have a single company profile page 40, but list at the company profile page 40 one or more of their branches and information about each branch.

Figure 12:
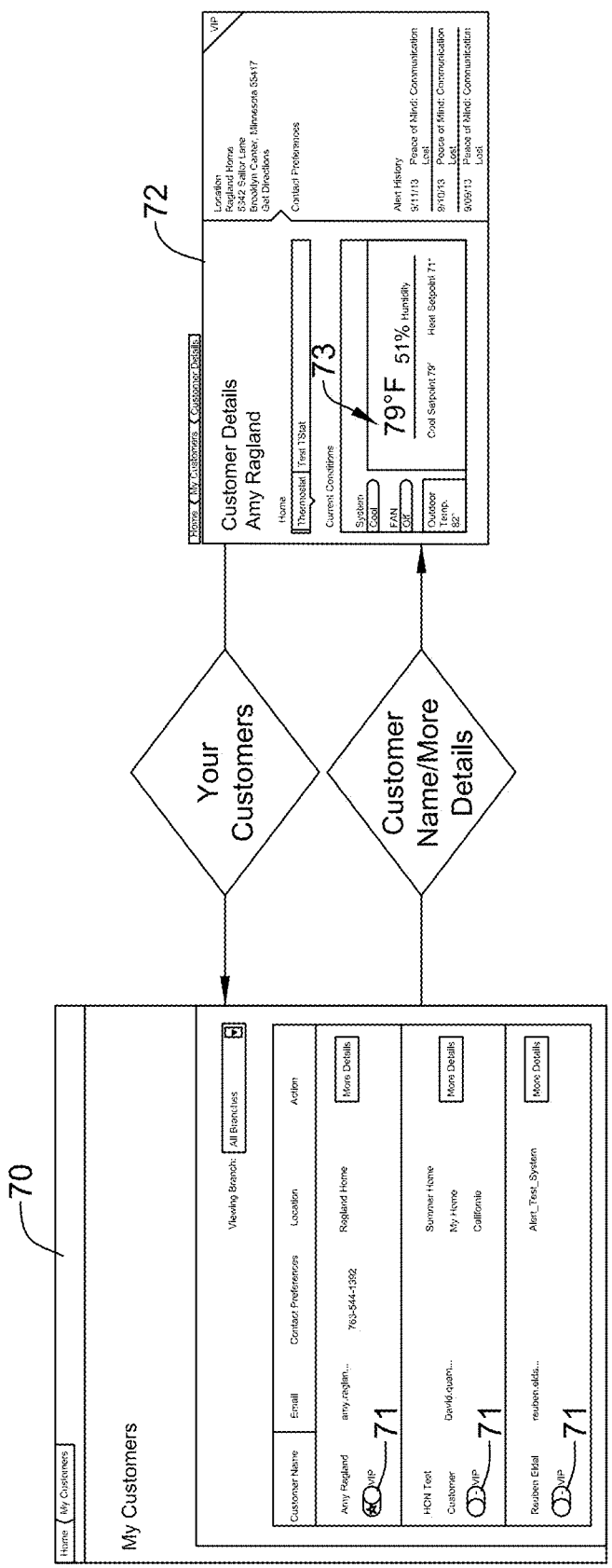

Further, shown in FIG. 7, from the homepage 20 a contractor may navigate to a customer list page 70. The customer list page 70, as best shown in FIG. 12, may provide a list of customers associated with the contractor. In some cases, the list of customers on the customer list page 70 may include a list of customers that have signed up for alert monitoring by the contractor and/or a list of any or all of a contractor's past and/or prospective customers. In some instances the customers listed on the customer list page 70 may be labeled as prospective, current, or past. In some instances, from the customer list page 70, the contractor may select a customer identified in the customer list page and view an associated customer details page 72. Alternatively, the customer details page 72 may be accessible through other pages (e.g., the alerts page 50 and/or the alerts details page 52).

The customer details page 72 may provide one or more details about the customer including, but not limited to, customer address(es), dynamic directions for the shortest travel time to the customer, current events in a customer's geographical area (e.g., traffic congestion, accidents, known constructions, large-scale events likely to cause heavy traffic, etc.), service history, current alerts, alert history, which HVAC units or components are utilized in the customer's HVAC system 130, which HVAC units or components of an HVAC system 130 have been serviced in the past, weather at and/or on the way to the customer's location, etc., and/or any other suitable customer information. In some instances, the data used to determine current events and/or the weather at and/or on the way to the customer's location may be utilized to create route time estimates for scheduled appointments.

In some instances, customers may be given the opportunity by the contractor to select their favorite and/or least favorite contractor technicians for the contractor company. The customers may have the ability to rate or select favorite technicians of a contractor or the contractor may limit the ability of customers to rate or select favorite technicians through the customer list page 70. In one example, if a customer is a long time customer, the contractor may be labeled as a VIP customer through a toggle switch 71, free form text, a check box, or any other labeling mechanism. Labeling a customer as a VIP customer may give that customer certain privileges including, but not limited to, being able to specify desired technicians. Such preferential treatment may increase the chance that service calls associated with the VIP customer may receive high customer satisfaction rating by providing desired technicians to perform the work.

In some instances, data attributes concerning the operation of a customer's building control system may be provided at the contractor portal 204, as best shown in FIG. 12, on a customer details page 72. Illustratively, certain HVAC system information may be provided to the customer details page 72 including, but not limited to, current thermostat and/or control data attributes for a customer's HVAC system (e.g., current temperature in a controlled area, current humidity in a controlled area, cool set point, heat set point, active system (e.g., cooling, in FIG. 16A), fan status, outdoor temperature, thermostat model, etc.), which may be displayed in an HVAC unit attribute area 73 of the customer details page 72. Additionally, confirmations of communications between the contractor and the customer or the customer's building control system (e.g., instructions to run tests, results from the tests, etc.) may be provided directly to the associated customer details page 72 or to any other relevant page of the web access (including the contractor portal 204 and/or the customer portal 202). Further information may be displayed on the customer details page 72 including, but not limited to, the name of the customer, the name of the customer's thermostat(s), a nickname for the location of the customer (e.g., "Home", "City Condo", "Vacation Home", etc.), physical location of the customer's HVAC system (e.g., address), contact preferences (e.g., email, telephone call, paper mail, text, etc.), alert history, and/or any other suitable information.

As discussed above, FIG. 7 depicts an illustrative homepage 20 (e.g., a contractor portal or contractor homepage) for the contractor set of web pages (e.g., set of web pages 410, 420), which in the example shown, is a summary page populated by the controller 111 via the communications port 113 on a user interface of a remote display device (e.g., e.g., a display of a mobile computing device, a personal computer, and/or a different device). The homepage 20, along with other pages as desired, may be organized in a way that graphically presents information in one or more blocks of related information (e.g., in widgets or applications). The information within each of the one or more blocks may facilitate providing meaningful information to contractors which may be recognized and/or absorbed without extensive reading and/or manual processing (e.g., manipulating of data and/or complex analysis of relationships). The one or more blocks of related information may distill and/or summarize customer HVAC data (e.g., HVAC performance data, etc.), business performance data (e.g., client HVAC controllers associated with the contractor, a number of leads or suggestions received by the remote monitoring system 100 for customers or clients associated with the contractor, a number of truck rolls avoided by remote monitoring/testing, etc.), a contractor's daily schedule, HVAC system alerts, performance data for customers associated with the contractor (e.g., an indication of customer satisfaction, customer reviews, etc.), weather, etc.

In the example homepage 20 shown in FIG. 7, the homepage 20 may display blocks of information concerning the weather 21, customer connections 22, sales leads 23 received, truck rolls avoided 24, listing of alerts 25 (e.g., a listing of alerts associated with a plurality of HVAC systems associated with the contractor), customer reviews 26, web access subscription information 27. As an alternative to the block formatting of the homepage 20 of FIG. 7, the homepage 20 and/or other pages of the set of contractor web pages may present information in one or more other formats and/or present other information in addition to or as an alternative to the information depicted in FIG. 7.

The homepage 20 may include a menu 18, for example, at or near the top of the page as shown in FIG. 7, or at any other location. The menu 18 may include one or more tabs that may bring a contractor to an associated page within the set of contractor web pages. In one example, and as shown in FIG. 7, the menu 18 may include a My Customers tab 18a, an Alerts tab 18b, a Reports tab 18c, and a My Company tab 18d, which when selected may bring a contractor to the associated page.

Figure 13:
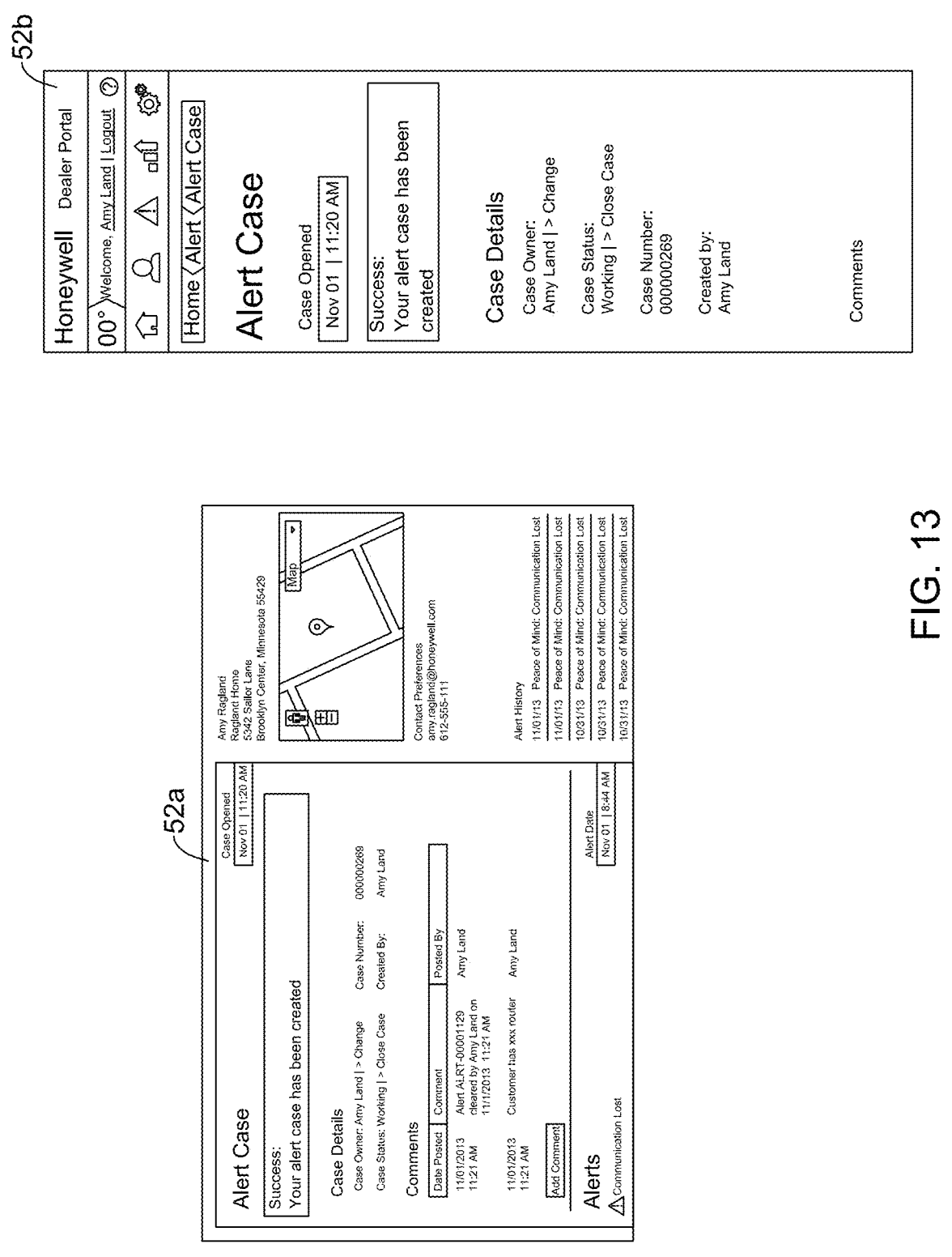

In some cases, the blocks (e.g., widgets) on the homepage 20 and/or other pages of the contractor portal 204 may be modifiable and configurable in content, size, and/or location to provide recognizable information at a glance and may be presented in different formats depending on the computing device being utilized to view the contractor portal 204 and/or the particular user's login credentials. For example, as shown in FIG. 13, the alert details page 52 may be depicted in different formats for a web browser view 52*a* and a mobile device application view 52*b*. Such different formatting may account for differences in screen size, pixel count of a screen, readability with respect to the particular computing device, etc. In some cases, it is contemplated that the homepage 20 of a first user having first login credentials may have different information displayed than a second user having second login credentials. For example, the general manager of a contractor company may be interested in having different information on his homepage than a service technician.

More generally, each set of pages within the set of contractor web pages may be specific to the log-in credentials (e.g., username and password) of the person or party logging in to the contractor portal 204. Illustratively, each person with log-in credentials may choose to have information that is most relevant to them displayed on their homepage 20 in blocks, widgets, or other features, and each person may choose to have that particular information displayed in a manner that is most efficient for that person. For example, a service technician having a first set of login credentials may receive or choose to have different data and/or information displayed on his homepage 20 than the data or information that a manager/owner with a second set of login credentials may receive or choose to have shown on his homepage 20. Illustratively, a service technician may receive or choose to have more detailed information about customer HVAC systems displayed on his home page, and perhaps only for those customers that are currently assigned to him. A manager/owner may receive or choose to have more high level business information on his home screen, such as the number of service calls, customer satisfaction, a summary of alerts across all customers, etc. Similarly, the blocks of information may be configured to have a first set of information when a first login credential is active and a second different set of information when a second login credential is active. In some instances, the first and second login credentials may be associated with the same or different contractor, manager, or other user.

In some cases, the blocks of information (or information presented in other formats) and/or data presented on the homepage 20 and/or other pages of the set of contractor web pages may be configured to expand or drill down into further pages (e.g., from a first level to a second level, third level, etc.) upon selection of a link, the further pages detailing the information provided in the blocks on the homepage 20 (e.g., where a second level or further may include historical HVAC performance information, historical interaction information, and/or other detailed information. These drill-down details may provide contractors relevant information without overburdening the contractors, but yet may allow the contractors to drill deeper into the information provided in the blocks on the homepage 20 at their discretion.

Figure 14:
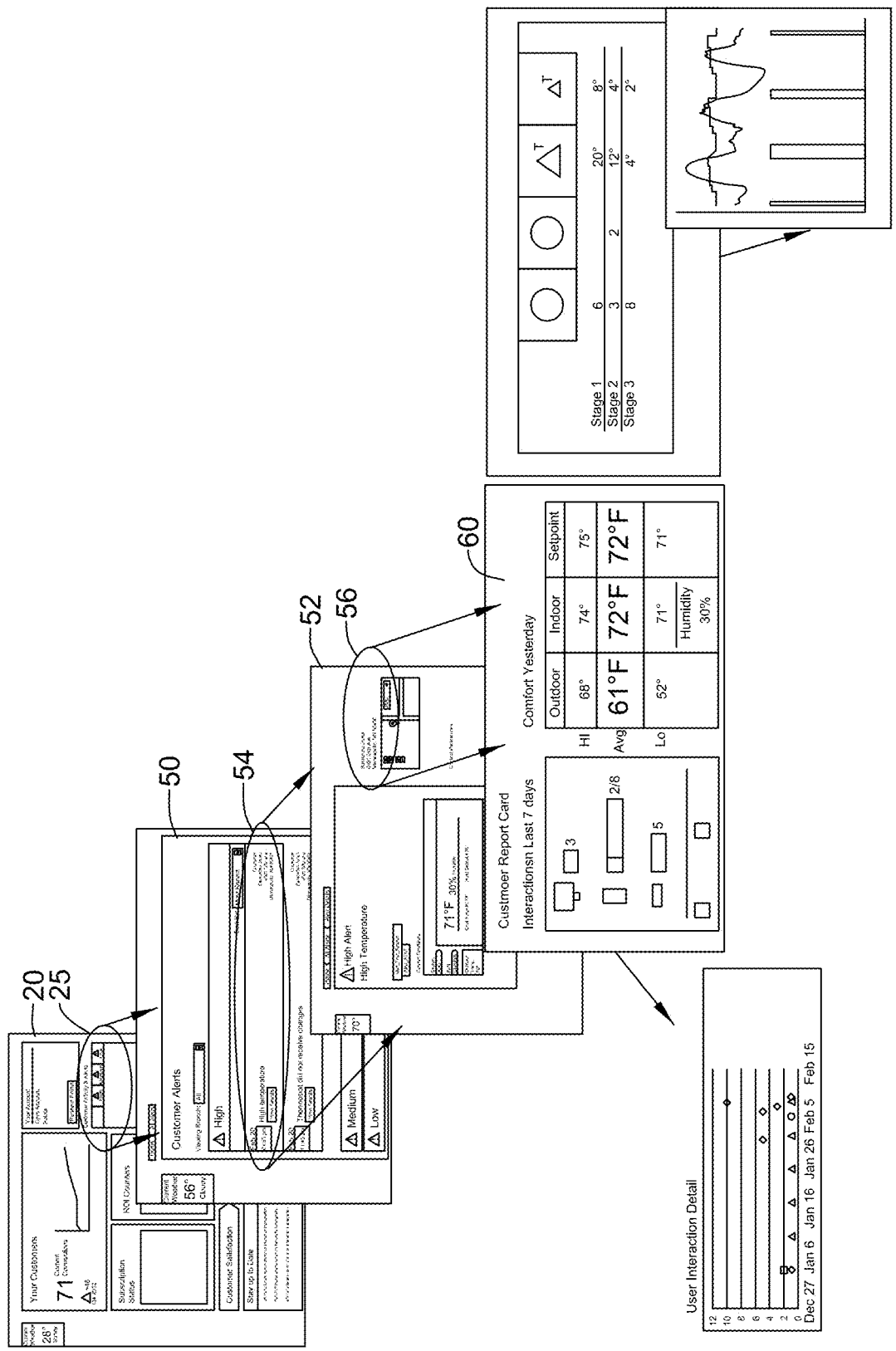
FIG. 14 is a schematic flow diagram of an illustrative method for accessing information via a contractor portal.

In an illustrative example, as shown in FIG. 14, contractors may select an alerts block 25 on homepage 20 (e.g., one or more of the alerts may include or may be a link), which may bring the contractor to an alerts page 50 which may provide further details concerning the alerts. The alerts listed on the homepage 20 and/or the alerts page 50 may be prioritized (e.g. high, medium and low) and/or categorized (e.g. by the primary impact the information and/or data may have on the operation of the HVAC system, such as comfort, peace of mind, and maintenance) according to one or more factors (e.g., severity of each alert, location of an HVAC system associated with an alert, an amount of time since the alert was first issued, etc.), where the prioritizing and/or categorizing may be performed manually or automatically based on one or more algorithms stored in the memory of the remote computing device 110 or controller 120.

From the alerts page 50, the contractors may select a specific alert (e.g., alert 54) and may be brought to an alert details page 52 that details the selected alert 54 and/or the customer or customer's HVAC system 130 from which the alert may be emanating. From the alert details page 52, the contractor may select a customer details block 56 and may be brought to a customer details page (e.g., a customer report card page 60) summarizing the contractor's selected customer, which may include historical data and/or other information for the selected customer. As discussed above, in some instances, the contractor may view the alert details page 52 directly from the homepage 20 without viewing the alerts list page 50 by selecting a specific alert.

Figure 15:
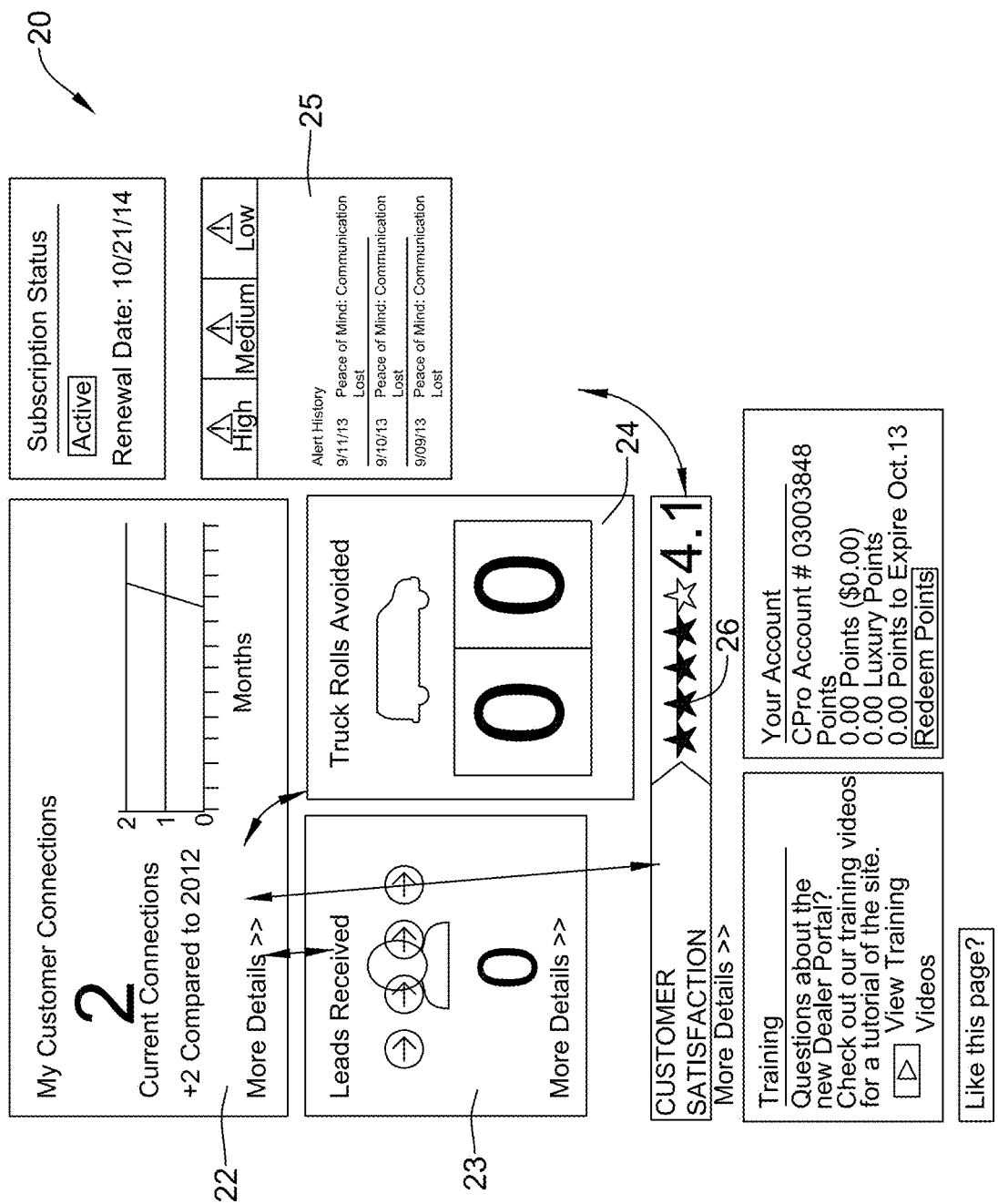
FIG. 15 is a schematic screen shot demonstrating the ability to customize and/or rearrange features that are displayed on the contractor pages of a contractor portal.

As referred to above, the contractors may be able to customize their homepage 20 along with the other pages by modifying what information is shown on any particular page and/or by organizing the blocks, tiles, or other features displaying information on that page. For example, as shown in FIG. 15, the position of the "truck rolls" block 24 may be moved (e.g., up, down, left, right) or may be switched with respect to the customer alerts block 25, the customer connections block 22 may be moved or may be switched with respect to the leads block 23, or the customer review block 26 may be moved or may be switched with respect to the customer connections block 22, and so on. In response to moving blocks or other layout features, the moved and unmoved blocks or layout features may be resized (e.g., automatically or manually) to ensure all blocks or layout features fit on the screen of the computing device being used by the contractor.

In some cases, widget applications may be provided, where the contractor may select from a number of widget applications in a library or other location to place on the homepage 20 or other page. In some instances, the contractor may drag and drop widget applications from the library or other location onto the homepage 20 or other page. Configurations of selected and/or placed widgets may be stored in the memory 112 to a set of login credentials and pulled from the library when the login credentials are entered into the system 100.

The controller 111 of the remote computing device 110 may be configured to, via the communications port 113, send and/or receive data related to the operation of one or more HVAC controllers each associated with an HVAC system 130 controlling an environment of a space of a building, and to store the data in the memory 112 or other memory. The received data may be collected with sensors existing in HVAC systems 130 of clients and/or from one or more sensors added to the HVAC systems 130. Illustratively, the received data may include, but is not limited to, ambient temperature gains and losses sensed by a temperature sensor of the HVAC system 130 (e.g., temperature gains and losses with numerical precision of 1.0 degree Fahrenheit (F) and greater, 0.5 degree F. and greater, 0.2 degree F. and greater, 0.1 degree F. and greater, or smaller temperature gains and losses), a change in ambient temperature sensed by a temperature sensor of the HVAC system 130 at various time intervals (e.g., time intervals of up 10 minutes or greater, 5 minutes or greater, 2 minutes or greater, 1 minute or greater, forty-five seconds or greater, thirty seconds or greater, twenty seconds or greater, or at time intervals faster than twenty seconds), indoor temperature, outdoor temperature, temperature set points (e.g., temperature set points relative to time and otherwise), relay status (e.g., relay open/closed status relative to time or otherwise), indoor humidity, outdoor humidity, heating activation (e.g., activation of a furnace), cooling activation (e.g., activation of an air conditioning cooling unit), of which some or all may be collected with existing sensors of existing HVAC systems 130.

In some cases, the controller 111 may be configured to analyze (e.g., through trend analysis and/or other analyses) at least some of the received data (e.g., a portion of the received data or all of the received data). Based on such analysis, the controller 111 may be configured to develop a thermal model of the space environmentally controlled by the HVAC system(s) from which the data was received. In some cases, received data may be analyzed and/or modeled by the controller 111 with one or more techniques disclosed in U.S. patent application Ser. No. 14/231,474 filed on Mar. 31, 2014 and entitled A SYSTEM FOR OBTAINING AND CLASSIFYING ENERGY CHARACTERISTICS, which is hereby incorporated by reference in its entirety for all purposes, and/or with one or more techniques disclosed in U.S. patent application Ser. No. 13/323,451 filed on Dec. 12, 2011 and entitled SYSTEM AND METHOD FOR OPTIMAL LOAD AND SOURCE SCHEDULING IN CONTEXT AWARE HOMES, which is hereby incorporated by reference in its entirety for all purposes. Illustratively, the thermal model may be configured to estimate HVAC runtime, at a daily level or over any other time interval, and may be formulated as a parameter estimation problem that may be solved through statistical methods such as multi-linear regression or dynamic system modeling, for example. Additionally, or alternatively, the thermal model may be developed and/or used for one or more other purposes and/or may be formulated in one or more other manners.

The developed thermal models may be dependent on one or more parameters sensed at or provided to the HVAC controller 120 and/or the remote system 100, and received at the remote system 100. In one example, the thermal model may be dependent at least partially on one or more time based events including, but not limited to one or more of time of day, a season of a calendar year, a specified date, a specified date range, and/or other time based events or parameters.

From the thermal models developed using data received from one or more HVAC systems 130, the controller 111 may be configured to provide an energy audit of a space environmentally controlled by an HVAC system 130 associated with a thermal model. Statistical analysis or other analysis may be used in performing the energy audit and/or to determine a normal or abnormal running HVAC system 130.

Such energy audits, or results thereof, and/or thermal models may be outputted from the controller 111 via the communications port 113 and/or viewable through the contractor portal 204 and/or the client or customer portal 202. In some cases, the results of an energy audit for a building having a space environmentally controlled by an HVAC system 130 may include an indication of thermal efficiency of a space, a heating degree days indication, a cooling degree days indication, an indication of efficiency of an HVAC system 130 controlling an environment of the space, an indication of efficiency of the HVAC system as trended over time, and/or other indications related to the operation of the HVAC system 130. In some cases, the results of an energy audit may compare operation of the HVAC system 130 environmentally controlling the space of the building to operation of one or more HVAC systems having similar or different characteristics when compared to the HVAC system 130 for which the energy audit may be provided.

Additionally, or alternatively, the results of an energy audit for a first HVAC system 130 may compare operation of the first HVAC system 130 controlling an environment in a first building to a second HVAC system 130 controlling an environment in a second building, where the first building and the second building may have similar or different building characteristics. Building characteristics may include, but are not limited to size of the building, age of the building, location of the building (e.g., zip code), location of the building relative to a geographic feature, altitude, etc. In some cases, the first building may be associated with a first customer and the second building may be associated with a second different customer. In some cases, an energy audit for a first HVAC system 130 may compare operation of the first HVAC system 130 controlling an environment in a first building to a plurality of other HVAC system 130 controlling the environment in a plurality of other buildings.

Additionally, or alternatively, the results of an energy audit for a first HVAC system 130 may compare operation of the first HVAC system 130 controlling an environment in a first building having occupants with a first set of lifestyle characteristics to a second HVAC system 130 controlling an environment in a second building having occupants with a second set of lifestyle characteristics, where the first set of lifestyle characteristics and the second set of lifestyle characteristics are deemed to be similar. Lifestyle characteristics may include, but are not limited to, income, environmental preferences, age, and/or one or more other sets of demographics. In some cases, an energy audit for a first HVAC system 130 may compare operation of the first HVAC system 130 controlling an environment in a first building having occupants with a first set of lifestyle characteristics to a plurality of other HVAC system 130 controlling the environment in a plurality of other buildings having occupants with the second set of lifestyle characteristics, where the first set of lifestyle characteristics and the second set of lifestyle characteristics are deemed to be similar.

In some instances, the controller 111 of the remote system 100 may access third party data and/or non-HVAC system data to assist in providing (e.g., to give context to) an energy audit of one or more HVAC systems 130 from the developed thermal model. In one example, the remote system 100 may have access to outdoor weather data based on one or more geographical areas (e.g., as organized by zip codes, cities, counties, states, countries, and/or other geographical area organizers), and the controller 111 may be configured to correlate a developed thermal model for a building or space of the building environmentally controlled by an HVAC system with outdoor weather data for a geographical area encompassing the building. In some instances, outdoor weather data obtained or accessed by the remote system 100 may include, but is not limited to, data related to outdoor temperature, outdoor humidity, cloudiness, solar radiation, precipitation, wind speed, wind direction, allergy alerts, etc.

Alternatively or in addition to utilizing weather data, the remote system 100 may have access to the received data from many different HVAC systems across multiple contractors. When so provided, the remote server may perform statistical and/or other analysis (e.g., trend analysis) over time on some or all of the received data to help further identify normal versus abnormal operational patterns. Additionally, or alternatively, other data and/or statistical analysis may be obtained and/or performed to determine if an HVAC system is running normally or abnormally.

Such data and/or statistical analysis, as discussed herein, may be performed a single time, repeatedly at a desired time interval, or performed continuously to determine whether an HVAC system 130 is running normally or abnormally. Determining whether an HVAC system 130 is operating "normal" or "abnormal" with respect to similar other or typical HVAC systems 130 may assist in determining the health and/or efficiency of the HVAC equipment.

Figure 16A:
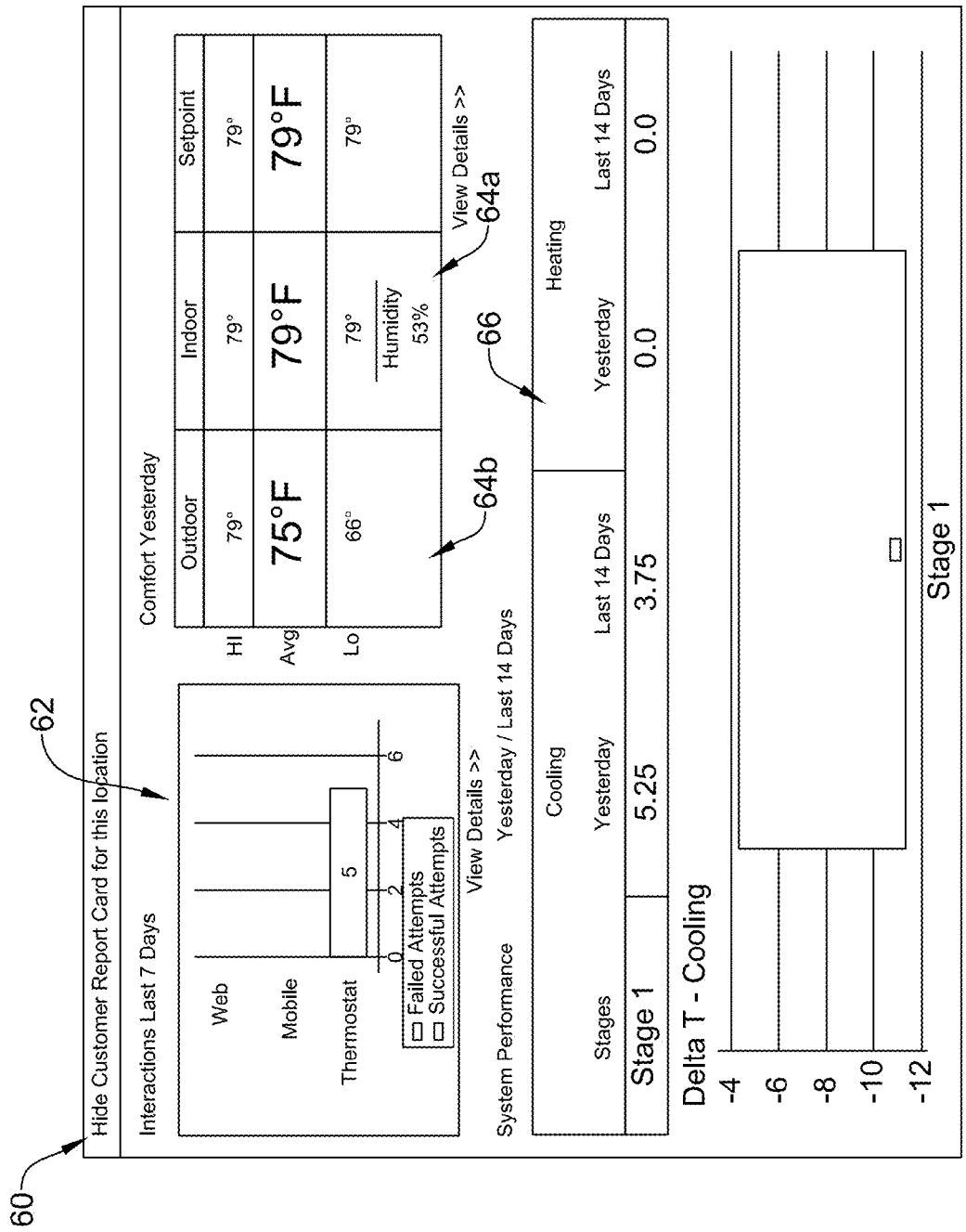

In some instances, data obtained from one or more HVAC systems 130 may be presented in a customer report card 60, such as shown in FIG. 16A, depicting a building report. The building report for an HVAC system 130 environmentally controlling a space in a building may be at least partially based on a thermal model configured or customized for the building and/or other data analysis performed over time, and/or may include some or all of the results of the energy audit.

In the example shown in FIG. 16A, the customer report card 60 may be viewable by selecting the HVAC unit attribute area 73 of a customer details page 72 (e.g., as shown in FIG. 12) or may be viewable in one or more other manners through the contractor portal 204. Illustratively, the report card 60 may include data related to present and/or past customer interactions 62 with an HVAC system through one or more access points (e.g., web, mobile, thermostat, etc.), present and past indoor conditions 64a, present and past outdoor conditions 64b, present and past HVAC system performance 66, an estimate of future performance of the HVAC system 130 (e.g., run time, heating days, cooling days, or other HVAC system operating metric based at least partially on the thermal model customized or configured for a particular building within inputs of one or more of outdoor temperature, an outdoor humidity, a set point temperature of an HVAC controller of the HVAC system, etc.), a comparison of a previously established estimate of future performance of the HVAC system to actual performance of the HVAC system, etc. This data in raw format may mean little, if anything, to customers and/or contractors. However, when this information is presented in the report card format as detailed herein, the information may be meaningful to a contractor as it may allow the contractor to be pro-active in the services and/or products offered to the customer. For example, the contractor or controller 111 may be able to identify a potential issue that is likely to arise down the road, but before it manifests or causes an outright failure. Then, the contractor may be able to make a rational case to a customer that due to the identified data, a particular service is needed which will result in saving the customer a particular amount of time, discomfort, and/or money if fixed now rather than waiting for the issue to manifest in a more noticeable manner. In another example, a customer that interacts with the HVAC controller may be more interested in saving energy than a customer that rarely interacts with the HVAC controller. The contractor may offer different or more energy saving products to the customer that is more likely to be interested in saving energy.

Figure 16B:
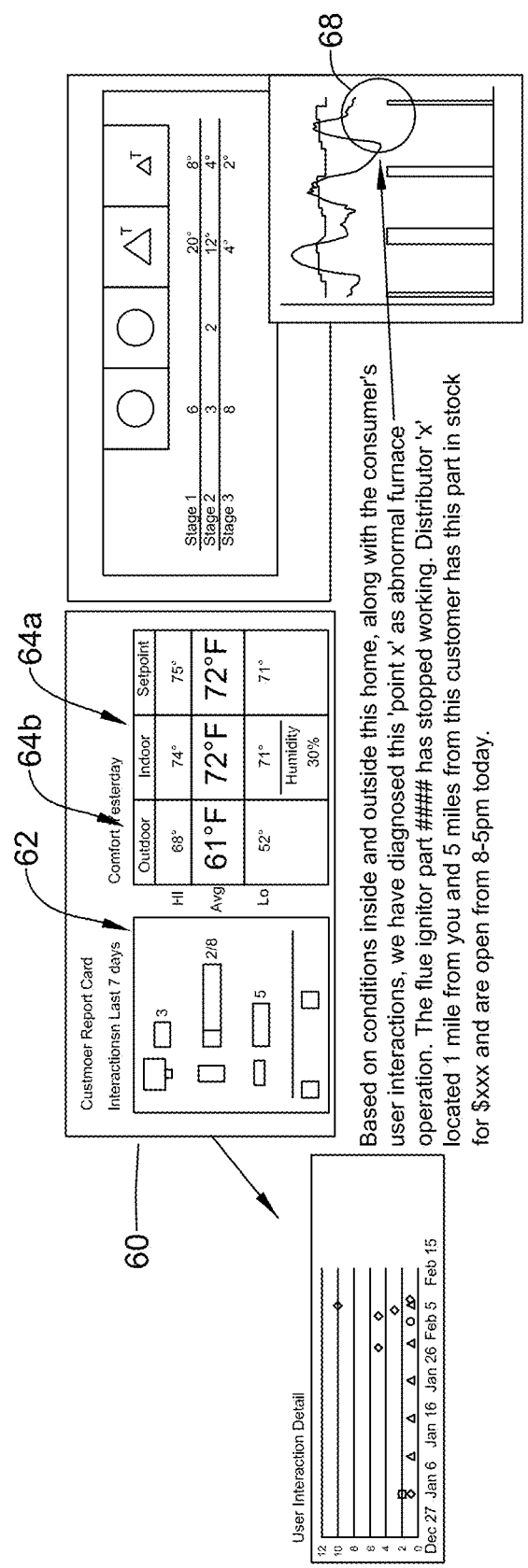

In some instances, the features of the customer report card 60 may be selected to show further details. For example, as shown in FIG. 16B, a contractor may select a customer interactions section 62 of the customer report card 60 (note, the customer interaction sections 62 in FIGS. 16A and 16B differ to illustrate different example ways of displaying such data) to receive further details (e.g., trend information through trend analysis) concerning customer interactions with their HVAC system 130, where the details may include graphs and/or various presentations of data.

In some examples, the customer report card 60 may provide or call out points of interest configured by the controller 111 and provided to the contractor that are particularly relevant to the customer and/or locations associated with the report card 60 being viewed. For example, the report card 60 may include a call out section 68, such as shown in FIG. 16B, that indicates data analysis has uncovered a potential issue/abnormality with an associated HVAC system 130, one or more potential remedies for the issue/abnormality, and locations of potential parts needed for the remedies (e.g., a potential solution). In some instances, the system 100 may search one or more databases to find solutions to problems identified through data analysis and presented in the call out section 68. In one example, the call out section 68 may read: "Based on conditions inside and outside this home, along with the customer's user interactions, we have diagnosed an abnormal furnace operation (click here for a graphical representation of the abnormality). The flue igniter, part no. #### has stopped working Distributor 'x', located 1 mile from you, and 5 miles from this customer has this part in stock for $XX.XX and open from 8 am-5 pm today."

The call outs or suggestions of points of interest to the contractor may draw the attention of the contractor to abnormalities or potential abnormalities in how the customer's HVAC system 130 is operating, while optionally also providing suggestions on what may or may not be the cause of the abnormality and/or suggestions of how to fix or correct the indicated abnormality. An example suggested cause of an abnormality may be, among other causes, a failure of one or more HVAC components of an HVAC system 130 (e.g., a failure of the air filter of an HVAC system 130, or the failure of any other HVAC component of the HVAC system 130 other than the air filter) and/or a failure related to the structure serviced by the HVAC system 130. An example of a suggested solution to the suggested cause of the abnormality may include a suggestion to replace one or more identified HVAC components of a particular client HVAC system, a suggestion to reprogram a client or customer HVAC controller in a way that may fix or correct the indicated abnormality, a suggestion to modify a building configuration of a client or customer building, a previously successful solution for a similar HVAC system or an HVAC system environmentally controlling a building similar to a building environmentally controlled by a subject HVAC system, and/or one or more other suggestions. Examples of modifying a building configuration may include, but are not limited to, closing windows, opening windows, closing shades, opening shades, adding equipment like a cooling unit, heat exchanger or humidifier, replacing aged or inappropriately sized equipment, adding insulation, sealing windows, etc.

In some instances, the call outs or suggestions of points of interest may relate to non-HVAC related issues. In one example of non-HVAC related call outs or suggestions of points of interest might be that the home is warming much more rapidly in the summer than what may be considered normal from hour to hour, but that the data shows the HVAC system is running optimally and has no issues. To support this call out or suggestion, the data and/or information for the particular location of the HVAC system 130 may be cross-referenced with other data sources (e.g., utility partners for energy audits, real estate partners for age and/or construction of home, weather partners for weather data, etc.) to find potential non-HVAC related solutions to the identified issue. As a result, in one example, the call out section 68 may read: "Based on conditions inside and outside this home, this home's HVAC system is running normally. However, this home was built in 1995 and based on construction standards it should not take this many hours of A/C operation to maintain 72 degrees in this size of home. Records indicate the house has low-efficiency, single pane windows. If the house had higher efficiency windows installed, the house's utility provider approximates it would save $35/month on energy costs. A local search has found there is a sale on triple-pane glass windows. Select [here] to schedule an appointment with this customer." As such, the system 100 may be capable of identifying issues and solutions for the issues that may be either HVAC related or non-HVAC related and then, notifying the contractor and/or customer of such issues, along with potential solutions.

FIG. 16C depicts an illustrative client facing customer report card 61 depicting year-over-year performance for the client or customer's HVAC system. Additionally, or alternatively, such client facing customer report cards 61 may depict other HVAC system performance comparisons including, but not limited to, month-over-month, day-over-day, hour-over-hour, and so on.

In the example of FIG. 16C, the client facing customer report card 61 has an HVAC system summary section 63, HVAC component report section 65, and an HVAC system current usage comparison section 67. Additionally or alternatively, the client facing customer report card 61 may include one or more other sections related to the client or customer's HVAC system 130. Illustratively, the HVAC system summary section 63 may provide one or more of an overall condition of the HVAC system 130 as determined by the controller 111 and relative to one or more parameters, an HVAC system cost as compared to past costs, tips for lowering energy usage and/or costs, and/or other whole system comments and/or analyses. The HVAC component report section 65 may provide one or more of an overall condition of one or more subject HVAC components (e.g., an air conditioner and a furnace, as shown in FIG. 16C), a comparison of HVAC component over time to expected performance, and/or other HVAC component comments and/or analyses. The HVAC system current usage comparison section 67 may provide one or more of current weather conditions, an overall usage indication relative to past usage for similar days, an indication of current usage, and/or other HVAC system current usage comments and/or analyses. Other information that may be provided in one or more sections on the client facing customer report card 61 may include, but are not limited to, overall usage of the HVAC system 130 or HVAC component in a time period, an amount of time users are away from a building over a time period, trends in usage of the HVAC components of the HVAC system over one or more time periods, and/or other information.

As referred to above, the data and/or information concerning the HVAC systems 130 may be presented for viewing by the contractor and/or controller 111 in different ways based on the audience that has been granted access to it (e.g., a first audience, a second audience, etc.). In one example, when the contractor has been granted access to the data and/or information concerning an HVAC system 130, the contractor may receive a chart on stages of heat and cool run times. With the same data and/or information concerning the HVAC system 130 and when a customer has been granted access to the data and/or information, the customer may see a graph of energy usage over time. The view of the data and/or information seen by the contractor may provide insight into the efficiencies of the HVAC systems 130 that a contractor may be more interested in than a customer, whereas the view of the data and/or information seen by the customer (e.g., energy usage) directly affects the customer and may be more meaningful than data on efficiency. Further, the data and/or information concerning HVAC systems 130 may be organized and/or presented for audiences other than contractors and customers such as, but not limited to, utility managers, utility operators, commercial HVAC system companies, HVAC security operators, and so on.

Figure 16D:
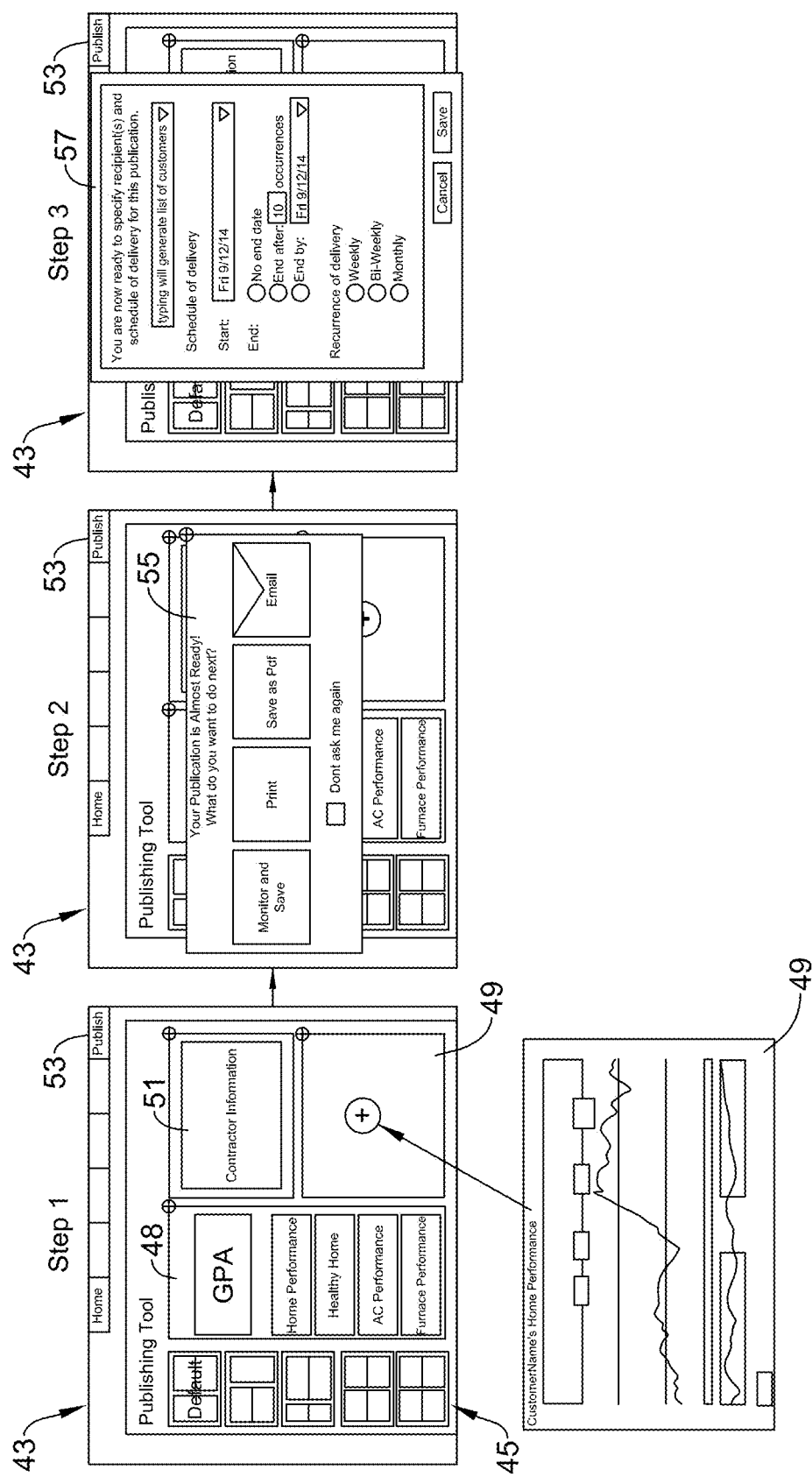

In some cases, the controller 111 may be configured to allow a contractor or other user to configure customer report cards 60, client facing customer report cards 61, and/or other reports through the contractor portal 204 or client portal 202 so as to output a plurality of reports over time that may present analysis results in a consistent format. As shown in FIG. 16D, a publishing tool 43 configured by the controller 111 may be utilized to present data and/or information concerning the HVAC systems 130 (e.g., results from an energy audit, thermal modeling, etc.) in various manners based on an audience. In STEP 1 of using the publishing tool 43, a layout may be selected from various layout options 45. To the right of the layout options 45, the selected layout may be shown. As shown in FIG. 16D, the left hand box of the layout may be a data insights box 48 listing selectable data insights, where the available data insights may automatically or manually populated and include, but are not limited to, an HVAC system scoring indicator (e.g., GPA), a home performance indicator, a healthy home indicator, an air conditioning performance indicator, a furnace performance indicator, and/or one or more other indicators. When an indicator from the data insights box 48 is selected, a graphical representation of that indicator (e.g., when a Home Performance indicator is selected from the data insights box 48, a graphical indicator depicting a graph or other analyses) may be displayed in graphical indicator box 49. As shown in FIG. 16D, the selected layout may have a further box, which may be a contractor information box 51 that may be automatically or manually populated.

In addition to, or as an alternative to, the boxes and/or information discussed in the selected layout, other boxes and/or information may be utilized, as desired, and/or other data or analyses may be displayed as desired. Additionally, one or more other techniques may be utilized when configuring report cards 60, 61, and other analyses, such as depicting graphical indicators in the data insights box 48, having a scroll function, a drop down function, etc., may be used. In some cases, the boxes of a selected layout may be deleted (e.g., by clicking the "x" in the upper right corner or through one or more other techniques) and/or added to, as desired.

Once a report card 60, 61 has been configured, a PUBLISH button 53 may be selected and the publishing tool 43 may bring a user to a publishing box 55 of STEP 2. From the publishing box 55, a user may be able to select how to publish the layout of the report card 60, 61. For example, a user may be able to select between "Monitor and Save", "Print", "Save as Pdf", "Email", and/or one or more other options. In FIG. 16D, an Email option is selected and a user is brought to a finalizing box 57 of STEP 3. In an example of a finalizing box 57 that may result from selecting an Email option, a user may be able to specify one or more recipients for the report card 60, 61, a start day for sending the report card 60, 61, an end for sending the report card 60, 61, a recurrence of delivery for the report card 60, 61, and/or specify one or more other selectable option. The steps and screens shown in FIG. 16D are illustrative only, and one or more other steps or screens may be inserted before, in between, and/or after the steps and screens depicted.

Figure 17:
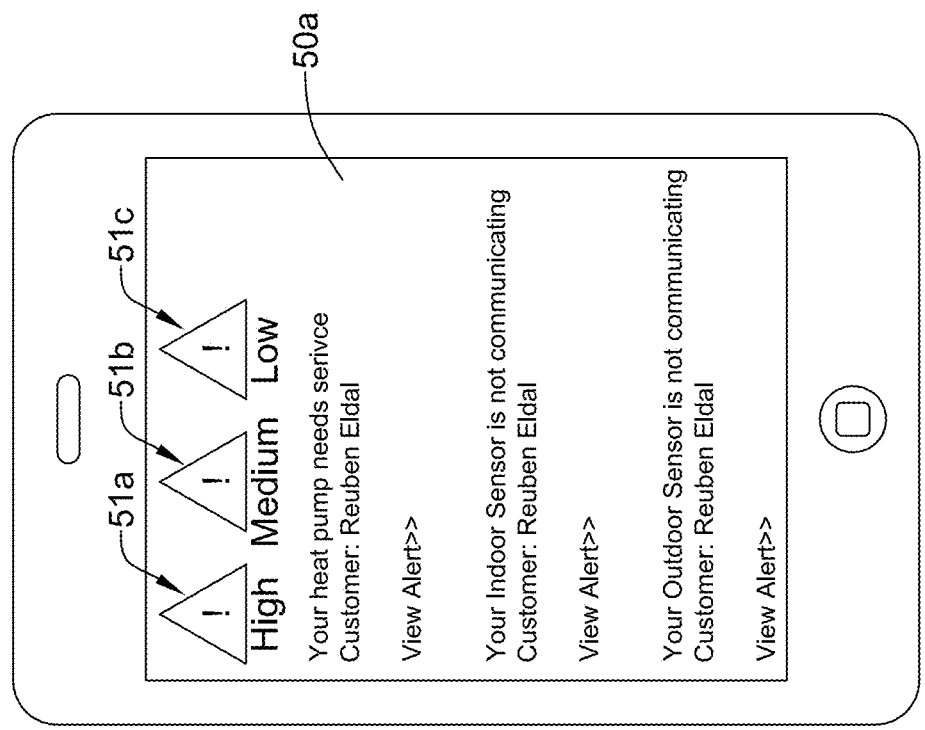
FIG. 17 is a schematic screen shot of an illustrative alert listing page that may be delivered and displayed on a mobile device.

FIG. 17 depicts an alternate alert list page 50a to the alert list page 50 shown in FIG. 10. As the alert list page 50 of FIG. 10 depicts, alerts may be listed by priority level, such as high 51a, medium 51b, and low 51c. Generally, high level 51a alerts may be the alerts that need attention first, medium level 51b alerts may require attention, but are not likely to lead to imminent damage of the HVAC system 130, and a low level 51c alerts may be the type of alerts that do not need attention until the other alerts are addressed. In some cases, each alert level 51a, 51b, 51c may have a tab and when the tab is selected the alerts associated with the alert level of the selected tab may be displayed while hiding all of the other alerts. For example, in FIG. 10, the medium alert level was selected and thus, the alerts categorized with a medium level 51b of importance are displayed while the alerts having a high level or low level are hidden. In the alternative alert list page 50a of FIG. 17, the categories of the high 51a, medium 51b, and low 51c alerts are spaced horizontally across the screen as opposed to the vertical spacing of the high, medium, and low categories of FIG. 10. The alert list page 50a of FIG. 17 may be an alert list page 50a displayed on a mobile phone computing device, whereas the alert list page 50 of FIG. 10 may be one viewed from a personal computer or tablet. Alternatively, the alert list pages 50, 50a may be displayed on any computing device.

Figure 18A:
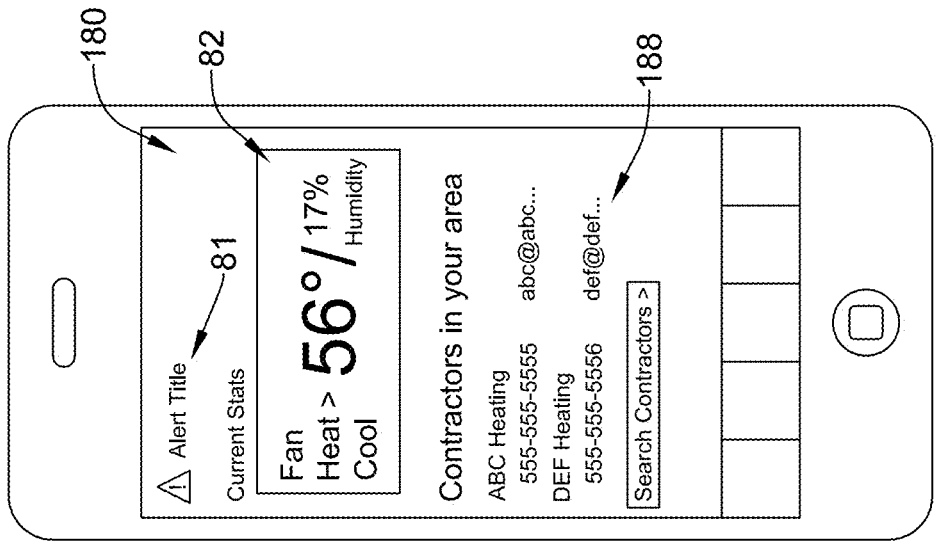
FIGS. 18A-18B are schematic screen shots of illustrative alert screens displayed on a mobile device.
Figure 18B:
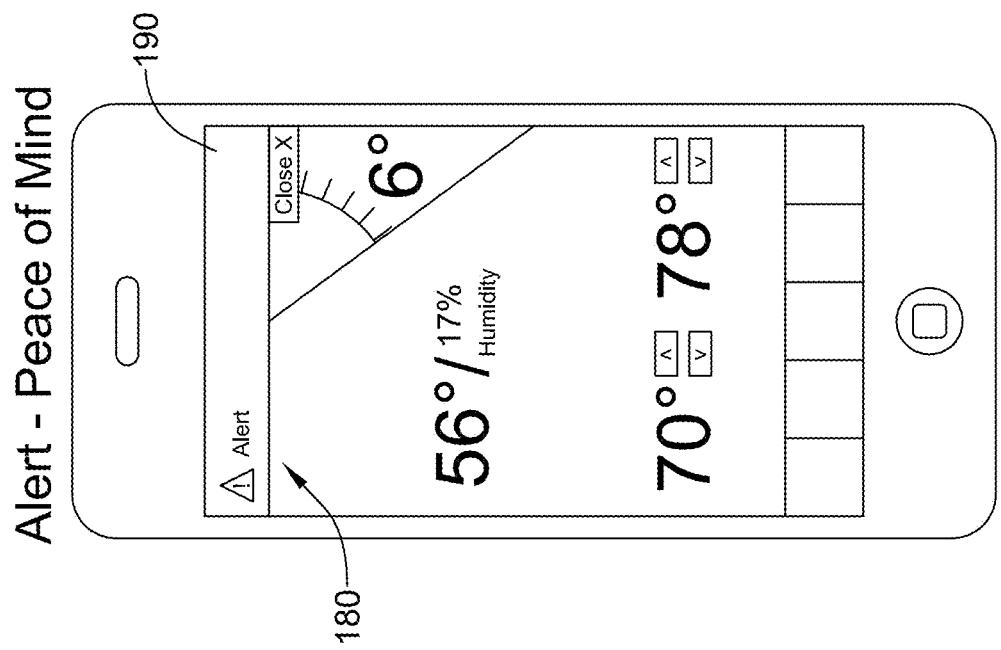

FIGS. 18A and 18B shows schematic screen shots of illustrative alert pages 180 received at a customer's mobile computing device 203 through the customer portal 202. Similar alert pages may be displayed on other customer computing devices (e.g., a personal computer 201, etc.) connected to the customer portal 202, which may have a similar or dissimilar layout than the alert page 180 on the customer's mobile computing device 203. The alert page 180 may include the title of an alert 81 triggering the alert page 180, a current statistics and/or parameter level of the HVAC system area 82, and an assurance area 186 (see FIG. 21), and/or a suggested contractors area 188 (FIG. 18A) to assist with the alert. Additionally, or alternatively, the alert page 180 may display any other HVAC system 130 related or unrelated information.

In some instances, the assurance area 186 may indicate a contractor (e.g., ABC Heating with particular contact information) has been contacted or alerted (e.g., automatically contacted or alerted) concerning the alert. The assurance area 186 may include information about actions taken and/or actions to be taken by the contractor in response to the alert, which may be entered through the contractor portal 204 and/or may be automatically populated in response to the alert.

Further, once a contractor has taken an action (e.g., schedule an appointment, performed a test on the HVAC system 130, fixed a part of the HVAC system 130, etc.), the controller 111 may be configured to cause the customer portal 202 may display a message (e.g., a banner message 190 in FIG. 18B) with respect to an alert, where the message may indicate the alert is being addressed or has been addressed to give the customer peace of mind. The displayed message may be displayed on which ever screen of the customer portal 202 is being displayed and/or the displayed message may be delivered as a text message and/or email message, or the message may be delivered in one or more optionally selectively manners.

The data obtained from one or more of the customer HVAC systems 130 may be categorized by the primary impact the information and/or data may have on the operation of the HVAC systems 130. The categories of data and/or information may include comfort (e.g., the data and/or information may affect how a customer physically feels), peace of mind (e.g., the data and/or information relates to assuring a customer its HVAC systems 130 are not imminently going to break down), and upkeep (e.g., the data and/or information may trigger certain types of maintenance or alerts based on comparisons to normal operating HVAC systems 130). Additionally, or alternatively, the data and/or information may be categorized as being of high, medium, and low importance and/or may be otherwise categorized. In one example, the categorized data and/or information may be provided via one or more categorized alerts.

In some instances, the received data and/or information for the HVAC systems 130 associated with a contractor's log-in credentials, may be categorized and/or prioritized with a nomenclature created by a company for which a contractor works (or by the contractor itself or any other entity). Illustratively, the created or developed nomenclature may be configured to facilitate sales, service, operations, and technical support teams of the company. For companies and/or individual contractors with service hotlines used for trouble shooting HVAC system 130 issues, managers or other personnel may develop scripted if-then question and answer guides for operators on the hotline that follow the developed nomenclature for uniformity in resolving the HVAC system 130 issues. For example, a company or contractor may format HVAC data and/or information alerts into a nomenclature and/or hierarchy that facilitates looking up scripts for resolving standardized HVAC system 130 issues.

In some instances, the system 100 may allow a contractor (e.g., a contractor or other user via the controller 111) to organize data and/or information received from customer HVAC systems 130 in one or more cases 74 (see FIG. 19) through the set of contractor web pages. In one example, a contractor may be able to open a case 74 in the system 100 and associate the opened case 74 with one or more HVAC systems (e.g., client or customer HVAC systems) and/or one or more alerts identified by the controller 111. Illustratively, through the contractor portal 204, a contractor may link one or more resolved and/or unresolved alerts associated with a particular HVAC system to the opened case 74.

Figure 19:
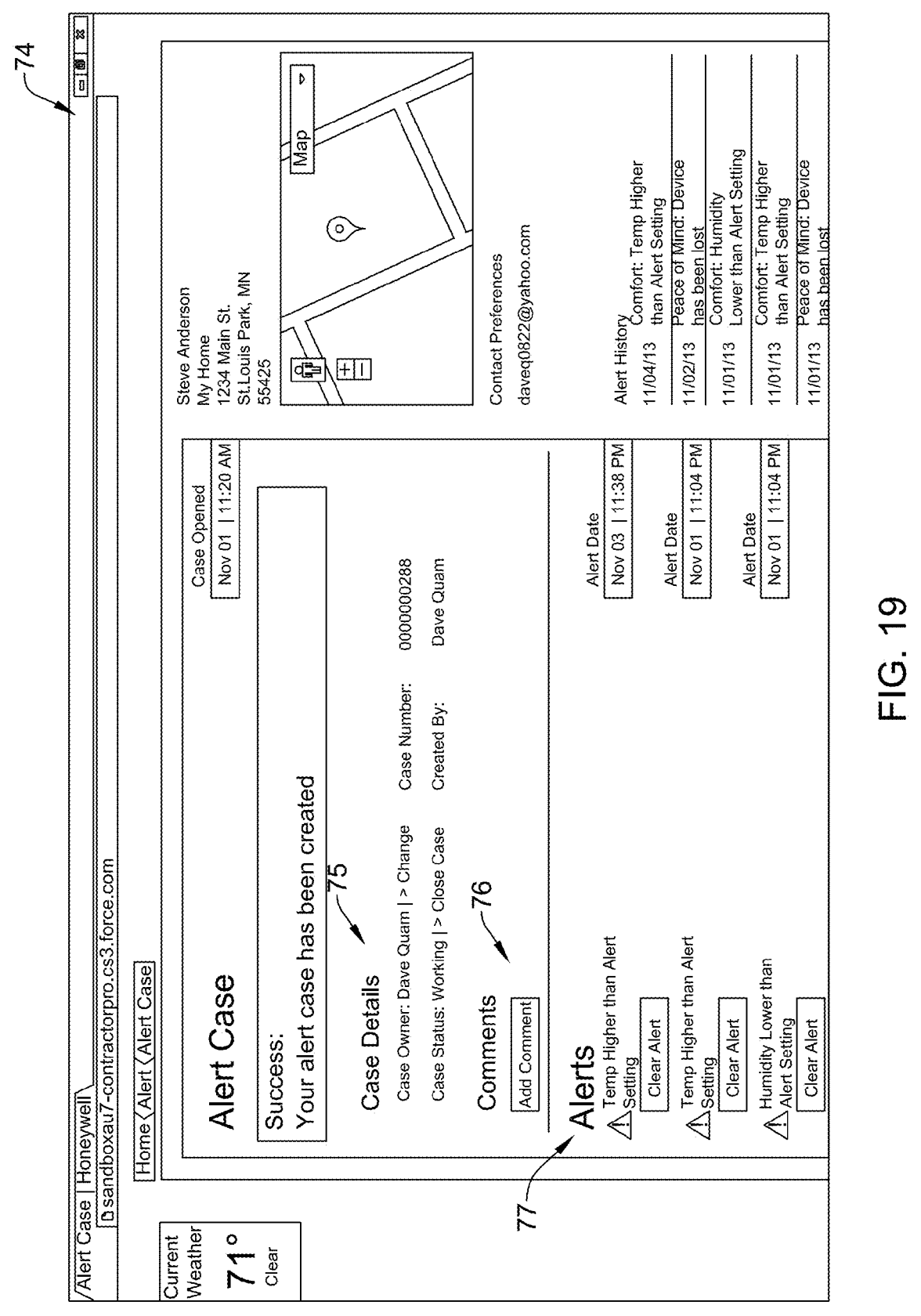

FIG. 19 is an illustrative depiction of an opened case 74 on a case details display screen within the contractor portal 204. The case 74 may include a case details section 75, which may include the case owner, the case number, case stats (e.g., working or closed), a case creator, an alert associated with a particular client HVAC system, etc. The case 74 may also or alternatively include a comments section 76, where one or more contractors or contractors' employees may leave comments concerning the case (e.g., what actions have been taken to address an alert, why one action was taken over another action, and so on). Further, the case 74 may include an alerts section 77, where one or more alerts associated with the case 74 may be listed. Additionally, or alternatively, the display of the case 74 may include customer information of a customer associated with the case 74, a map of a geographic location of the customer and/or HVAC system associated with the case 74, customer contact preferences for the customer and/or the case owner, an alert history section, and/or other similar or different sets or areas of information.

The cases 74 may be manually created in the system 100 or automatically generated by the controller 111 of the system 100 and optionally stored in memory 112 of the remote server 110 or on memory of one or more other computing devices in communication with the remote server 110. The cases 74 may be configured to be manually modified, automatically modified by the controller 111, or secure and not capable of being modified. In an example, the controller 111 may maintain a label of a case 74 (e.g., an open label) until the case 74 is closed by a user (e.g., a contractor) at which point the label may be automatically or manually changed to a different label (e.g., a closed label).

The details of a case 74 may be manually or automatically populated upon creation and/or manually or automatically modified or updated after creation and displayed on a case log display screen viewable through the contractor portal 204. In one example, the controller 111 may be configured to automatically or to allow a user (e.g., a contractor) to assign a case 74 to a particular technician for resolution, to enter notes and/or associate notes to one or more cases 74, to associate the case 74 with a particular client or customer HVAC system, and/or to populate the case 74 in one or more other manners.

The cases 74 may be labeled based on their status. For example, cases 74 that are open may be labeled as open, cases 74 that have reached a resolution may be labeled as closed or dismissed altogether, cases 74 that resolve themselves may be labeled as closed or dismissed altogether, and cases 74 that may not require immediate attention, but may require attention at a later time may be labeled snoozed or delayed. Alternative or additional labels may be used as desired.

Cases 74 may facilitate grouping data attributes that are generated at different times, but for a specific location or other data group, together for a better understanding of what might be occurring at a location of an HVAC system 130. Alternatively, or in addition, records (e.g., alerts and other notes) from multiple locations of HVAC systems 130 may be batched together under a specific consumer/business account and/or by one or more label or category associated with the cases. In some instances, the alerts and/or information grouped together in cases 74 may be time stamped and/or analyzed for trends over time to develop pattern recognition of issues arising at a particular location of an HVAC system 130, with a particular customer, in a particular geographic location, or in any other grouping of data and/or information from HVAC systems 130. Such pattern recognition may help identify, among other features, a normal versus abnormal HVAC operation, normal versus abnormal user interactions with one or more HVAC controllers (e.g., thermostats, web controllers, app controllers, etc.), or normal versus abnormal atmospheric indoor and/or outdoor temperature, humidity, etc. conditions.

Figure 20:
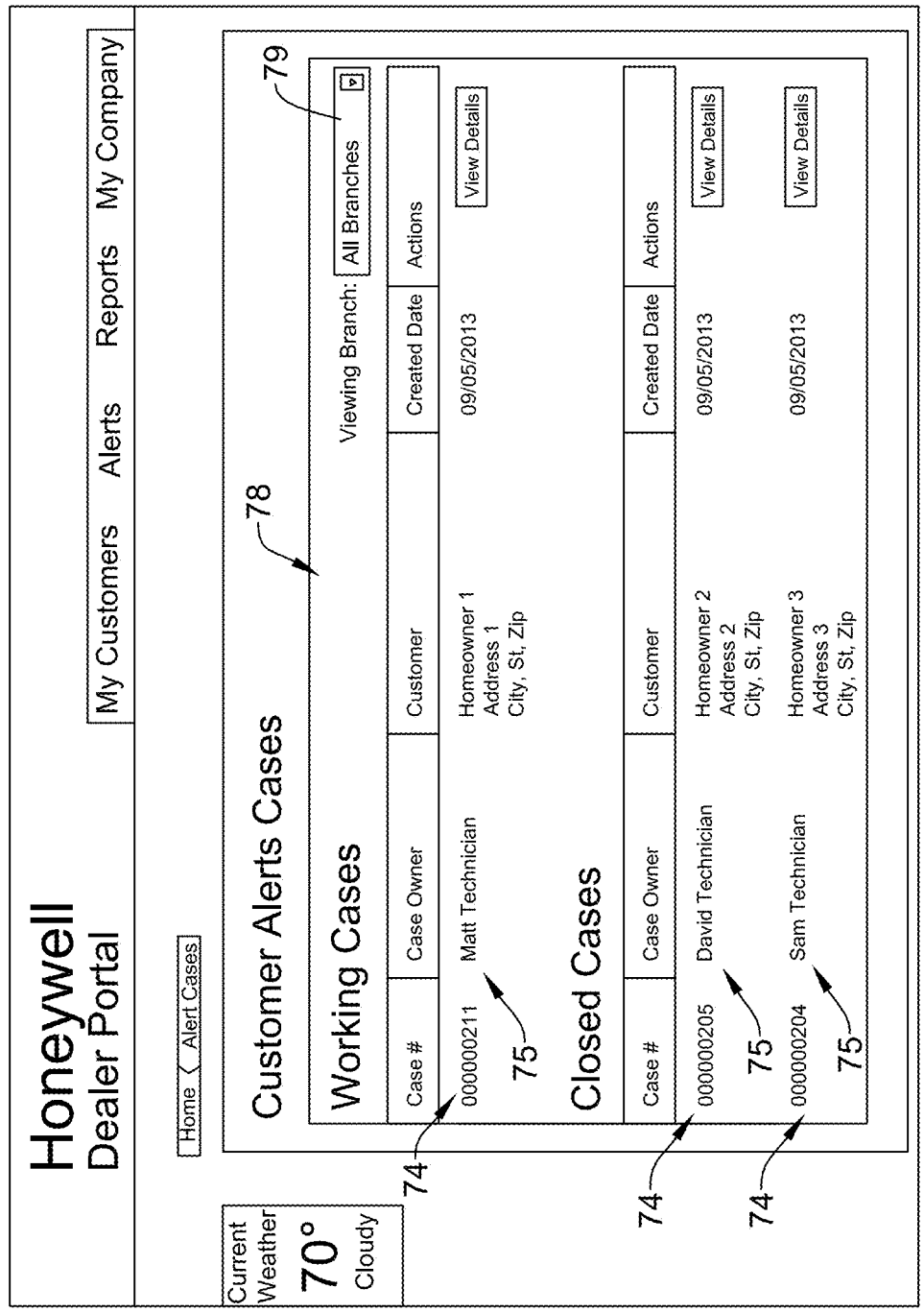
FIG. 20 is a schematic screen shot of an illustrative case log listing page of a contractor portal.

FIG. 20 is an illustrative depiction of a case log 78, wherein the controller 111 through the communications port 113 may be configured to populate a case log 78 on a display. On the case log 78, one or more cases 74 (e.g., including, but not limited to, two or more cases 74, three or more cases 74, etc.) may be displayed in a listing of cases. In some instances, the case log 78 may have a case details section 75 (e.g., which may be similar to or dissimilar to the case details section of the cases 74), which may list the case number for the case 74, the case owner, the associated customer, the date the case 74 was created, the case label, a date the case label was last changed, and/or any other information related to the case 74.

Any feature of the case details section 75 may be selected and the controller 111 may be configured to populate a display with detailed case information regarding the selected case 74. For example, the controller 111 may be configured such that selecting the case number or a "VIEW DETAILS" button may bring the contractor to the case details page displaying further case information regarding the selected case on the display (e.g., one or more alerts associated with the particular HVAC system, case owner, case status, etc.), selecting a case owner may bring a contractor to a list of other cases 74 created by that case owner, selecting a customer may bring a contractor to a list of other cases 74 associated with the selected customer, and selecting a date created may bring a contractor to a list of other cases 74 that were created on the same day. Further, the cases 74 displayed on the case log 78 may display cases 74 associated with a particular branch of a company or cases 74 associated with any other category through a drop down menu option 79 (see FIG. 20) or other selection mechanism.

On the case log 78, only the working or active cases, only the closed or inactive cases, or both the working (active) cases and the closed (inactive) cases (as shown in FIG. 20) may be displayed. In some instances, a working cases or closed cases header may be selected to hide the associated cases 74 from view. Other labels and/or categories may be displayed, as desired, on the case log 78. The cases 74 displayed in the case log 78 may be sorted based on a label or category assigned to the case 74. For example, the cases 74 may be sorted by open cases and closed cases (where each set of cases 74 may be sorted by a date the case 74 was labeled open or closed), an assigned technician, a geographic area (e.g., a geographic area associated with a location of an HVAC system of the customer or some other geographic area), a customer account, or other label or category associated with one or more cases 74.

Contractors, at their discretion, may set, through the my profile page 30 or other page, one or more customized triggers that automatically send notifications to the contractor and/or a customer based on data and/or information received from the HVAC systems 130. For example, the contractor may set a trigger such that if a customer were to rate the contractor with a single star (e.g., out of five stars on a performance review presented on a thermostat or in an otherwise received survey), the contractor would receive a notification at its email, mobile phone via text, or in any other manner that it received a single star, along with a notification indicating the contractor should follow up with the customer due to the poor customer rating/review. In another example, the contractor may set a trigger such that if the customer's indoor temperature is eighty seven (87) degrees Fahrenheit (e.g., it is warm inside), the outdoor temperature is one hundred ten (110) degrees Fahrenheit (e.g., it is hot outside), and the indoor temperature is rising at speed greater than one (1) degree Fahrenheit per hour, a notification is sent to the customer through a text message, through the customer's email, through the customer's thermostat and/or via any other mechanism suggesting the customer do " . . . ". The capability allowing contractors to set triggers for sending notifications to customers and/or to the contractors themselves, and may extend to promotional, sales, service, operational, and/or other notifications in response to received HVAC and/or customer data and/or information.

In addition to setting triggers that automatically send or push notifications to customers, contractors may be able to use the set of contractor web pages to automatically send or push messages to consumers at or before the time of a service call, appointment, or other contact between the contractor and customer. In some instances a sent or pushed message to a customer at the time of a service call or appointment may include the contractor's employee's biographical information (e.g., name, picture, qualifications (e.g., employee and/or contractor qualifications)), contractor's contact information, customer ratings for the contractor and/or the contractor's employee, current statistics or settings for the customer's HVAC system 130, the current issue with the customer's HVAC system 130 that is the reason for the service call or appointment, the estimated arrival time of the contractor or contractor's employee, and/or any other information related to the service call. Such an automatically sent or pushed message may allow a customer to prepare for the contractor or contractor's employee by providing the customer with an image of whom to look for at their door and a general understanding the contractor or contractor's employee's experience, skill, and/or likeability.

Figure 21:
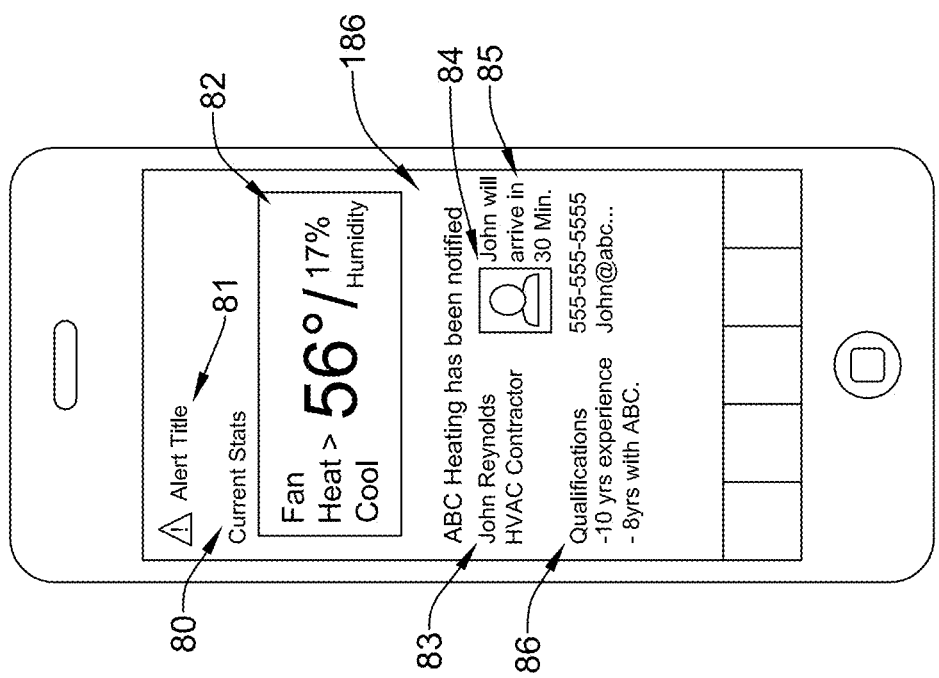
FIG. 21 is a schematic screen shot of an illustrative arrival notification displayed on a mobile device.

FIG. 21 shows an illustrative arrival notification 80 that may be automatically sent or pushed from the controller 111 to a customer's email, mobile device (e.g., phone), calendar, etc. prior to arrival of a contractor or contractor's employee for a service call or appointment. The arrival notification 80 may include an alert title 81 if an alert triggered the service call or appointment. In some instances, the alert title 81 may include the category of the alert and/or the priority of the alert. Further, the arrival notification may include HVAC statistics and/or settings 82 for the customer's HVAC system 130. The contractor's and/or contractor's employee's biographical information may be provided in the arrival notification and may include, but is not limited to, the contractor's and/or contractor's employee's name 83, picture 84, and/or qualifications 86. Further, the arrival notification 80 may include an estimated arrival time (e.g., estimation of an actual arrival time or an estimated time until arrival) and/or estimated cost associated with the service call. Additionally, or alternatively, the arrival notification 80 may include other similar or dissimilar information concerning the customer, the customer's HVAC system 130, and/or the contractor or the contractor's employee.

Figure 22:
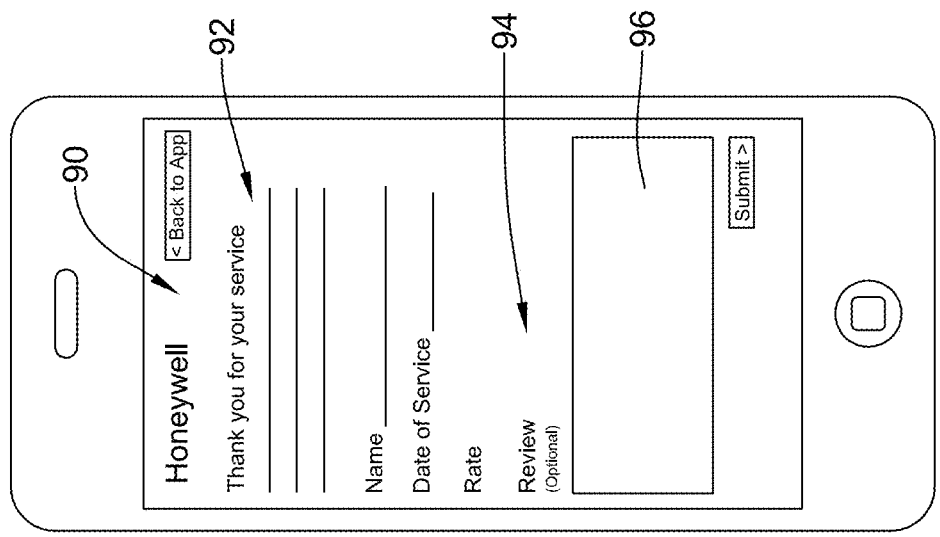
FIG. 22 is a schematic screen shot of an illustrative rating request notification displayed on a mobile device.

Another type of notification that may be transmitted to a customer may be a rating request notification 90 from the controller 111. The rating request notification 90 may be sent to a customer as an email, as a text message, a message on a customer's HVAC controller 120, and/or as a voice call. As shown in FIG. 22, the rating request notification may indicate why the customer is being asked to submit a contractor rating (e.g., because the contractor performed a service call on the customer's HVAC system 130) in a service area 92, an option to rate the contractor based on a set scale (e.g., a five star scale or other rating scale) in a rating area 94, and an option to provide freeform feedback in a freeform feedback box 96.

In some instances, a rating request notification 90 may be automatically sent or prompted to be sent to a customer once a case 74 has been closed The rating request notification 90 may note the case log number and other case details (e.g., the associated alert(s), the location of the HVAC system/service call, etc.) in the service area 92 of the notification 90 to remind the customer why a rating request notification 90 was delivered. The automatically sent rating request notifications 90, may request the customer to rate on a rating scale (e.g., 1-5 stars or other rating scale) the contractor business, the contractor employee, the contractor's product/service offerings, and/or the contractor's consultative skills, depending on what services and goods were provided to the customer and whom provided those services and goods. As the rating request notifications 90 and subsequent ratings may be tied to particular cases 74, alerts, and/or service calls, all ratings are directly associated with a known interaction between the contractor and a customer.

Figure 23:
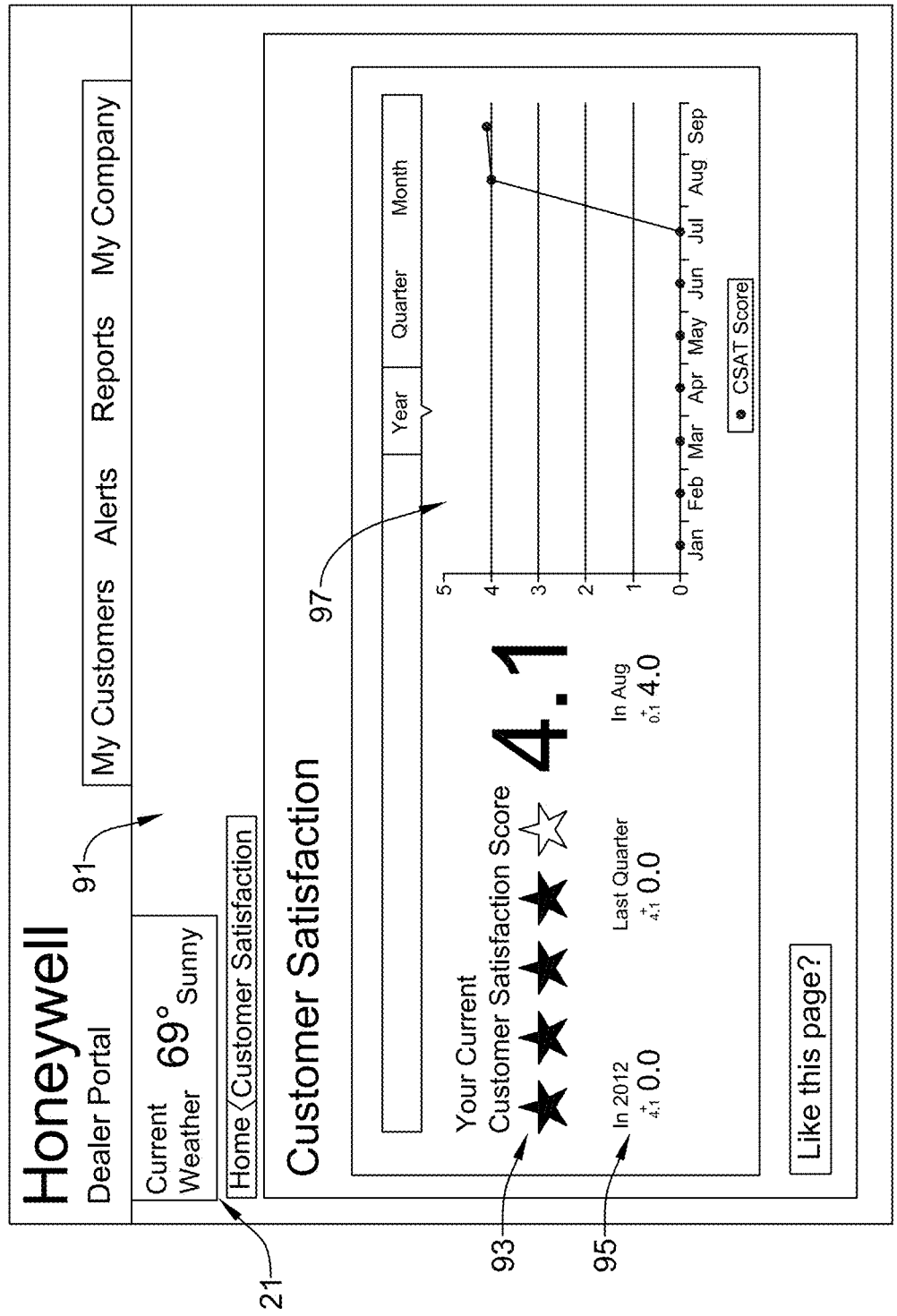
FIG. 23 is a schematic screen shot of an illustrative customer satisfaction page of a contractor portal.

The data received from customer ratings may be available to contractors through a customer satisfaction page 91, as shown in FIG. 23. Additionally, or alternatively, the pooled and weighted or non-weighted average of the data on the customer satisfaction page 91 may be displayed to customers and potential future customers. Illustratively, potential future customers within a contractor's service area may be able to review customer rankings of specific contractors, the products used by specific contractors, and specific employees of specific contractors, and, in some cases, use these rankings when selecting a contractor. In one example, the customer satisfaction page 91 may provide a contractor's average rating in an averaged rating area 93, a contractor's historical averaged ratings 95, and a graphical representation of a contractor's averaged rating 97, which may be viewed on a yearly, quarterly, and/or monthly basis.

Figure 24:
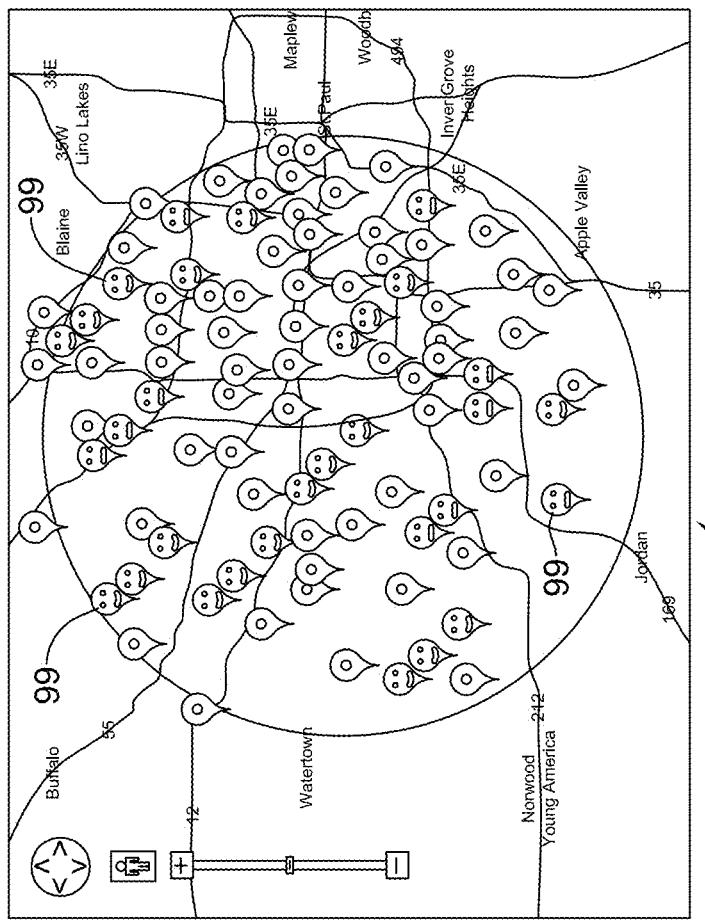
FIG. 24 is a schematic screen shot of an illustrative customer identification map of a contractor portal.

As discussed herein, a contractor may have geographical location information for each customer associated with the contractor. The software of the system 100 may combine the geographical location data with the averaged ratings data provided through rating request notifications 90. With the combined geographical location and rating data, the contractor may be able to view a map of associated customers along graphical indications of customer satisfaction (e.g., emoticons 99 indicating showing a smiley face—high customer satisfaction, straight face—average customer satisfaction, or frown face—low customer satisfaction), as shown in FIG. 24. In some instances, a map 102, where markers thereon for geographical locations of customers may be selectable to produce an emoticon 99 associated with a customer satisfaction level or any other indicator associated with a customer satisfaction level. Further, the emoticons 99 or other indicator may be colored to indicate to a contractor the current status of any alerts associated with the customer and/or the customer's HVAC system 130 at that geographical location. Such graphical representation of combined data may provide a contractor an overview of its associated customers, may facilitate planning a day around customers that need immediate assistance and/or customers that have previously given poor reviews, and/or may allow a contractor to provide an example of existing customer satisfaction levels to potential new customers.

Figure 25A:
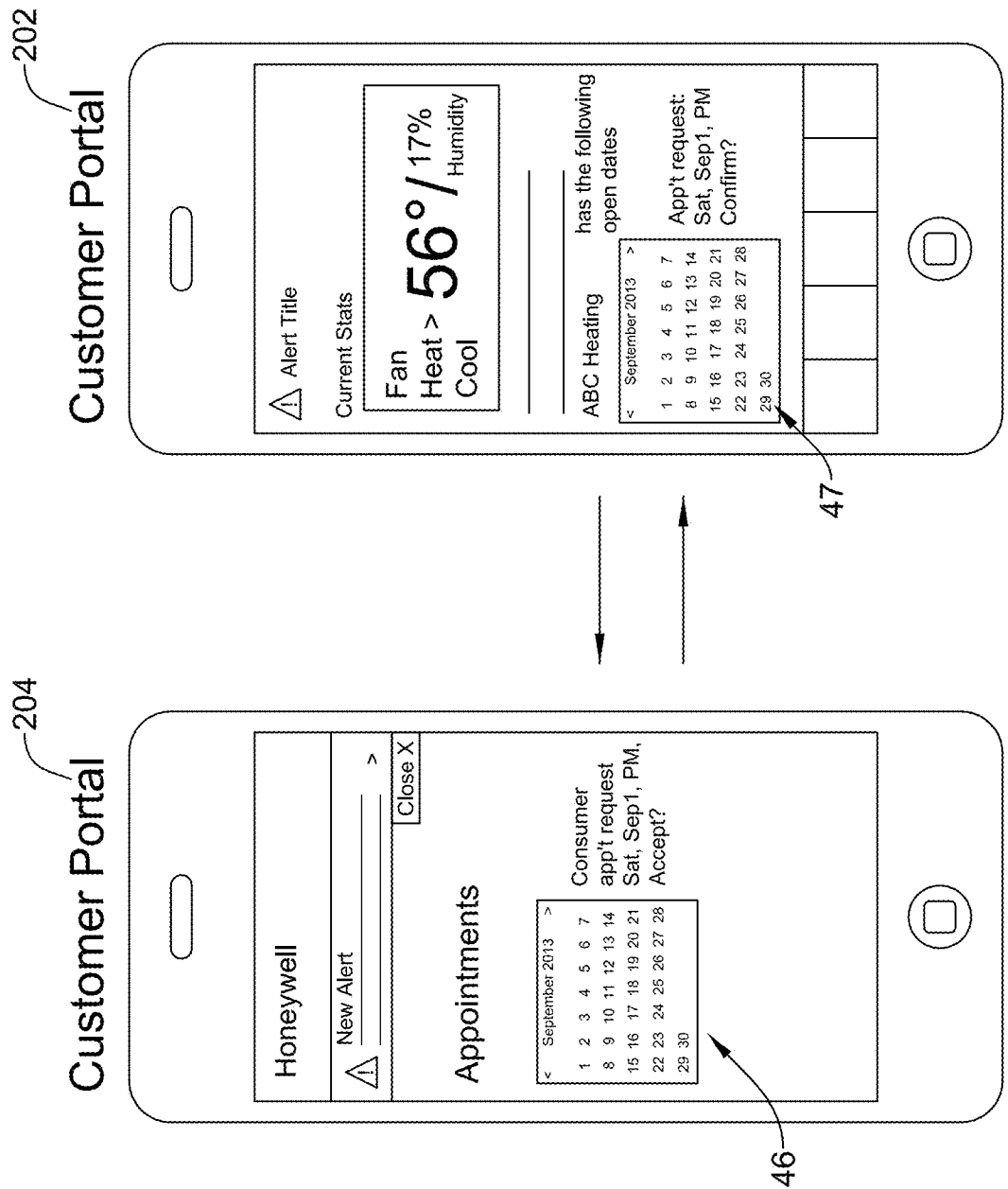
FIGS. 25A and 25B are schematic screen shots of illustrative contractor and customer service call scheduling screens.
Figure 25B:
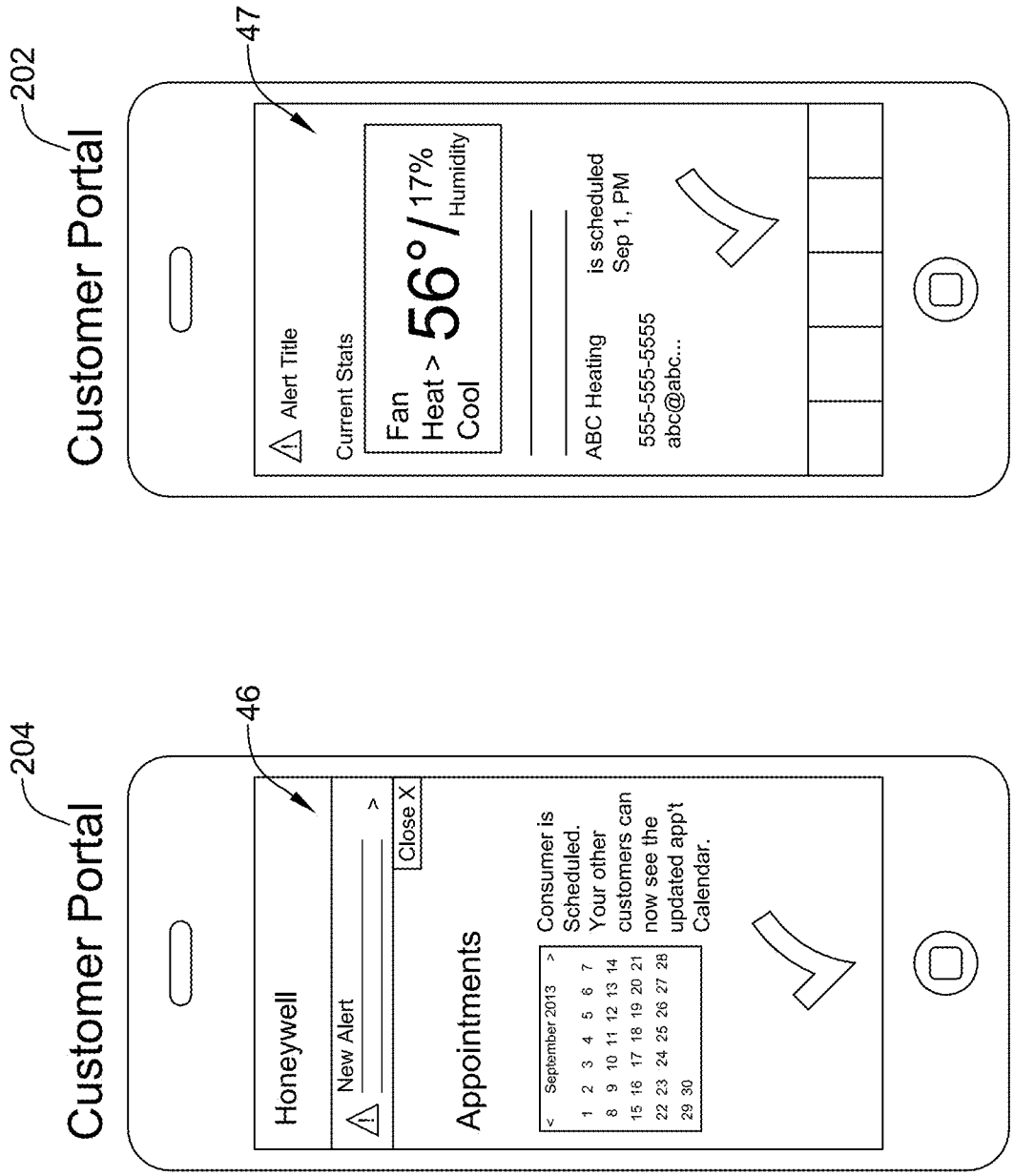

A customer may have access (e.g., electronic access) to their account through a personal computer, an HVAC controller user interface, an application on a mobile phone, and/or through a website accessible with a computing device. In instances where a customer is utilizing an account for their HVAC system 130 through an application, website, or other software, an appointment calendar page 46 for the contractor may be synched with an appointment calendar page 47 for the customer that is viewable and/or editable through an account on a mobile application (as shown in FIG. 25A), an account on a website, and/or an account via other software. With the synched calendar, the contractor may have the ability to set start times, end times, and overtime for service calls that are viewable by the customer. In some examples, the contractor's time may initially appear in two (2) hour increments, for example, on the calendar of the contractor and the calendar of the customer. Customers may then view a contractor's availability and schedule a service call and specify their reasons for the scheduled service call (e.g., a sales consultation, a services consultation, troubleshooting, a request for references). In response to a customer scheduling a service call, the contractor may be given an opportunity to confirm the scheduled service call. Once the contractor has confirmed the service call (assuming the contractor does not reject the service call), the calendar segment representing the selected time slot for the service call may be grayed out on the contractor's appointment calendar page 46 and may be made unavailable for further scheduling, as shown in FIG. 25B. Additionally, once the service call appointment is confirmed, a confirmation may be sent to the customer's appointment calendar page 47 indicating the scheduling of the service call.

In some cases, the contractor and the customer may be able to go back and forth to schedule an appointment. For example, when a customer may select a time for a service call at which the contractor has indicated his time will be charged as overtime, instead of confirming the service call, the contractor may go back to the customer and indicate a less expensive time for a service call, particularly if a service call may not be imminently required. As such, the contractor and the customer may be able to work together through electronic communication to set a service time that works for each party.

Figure 26:
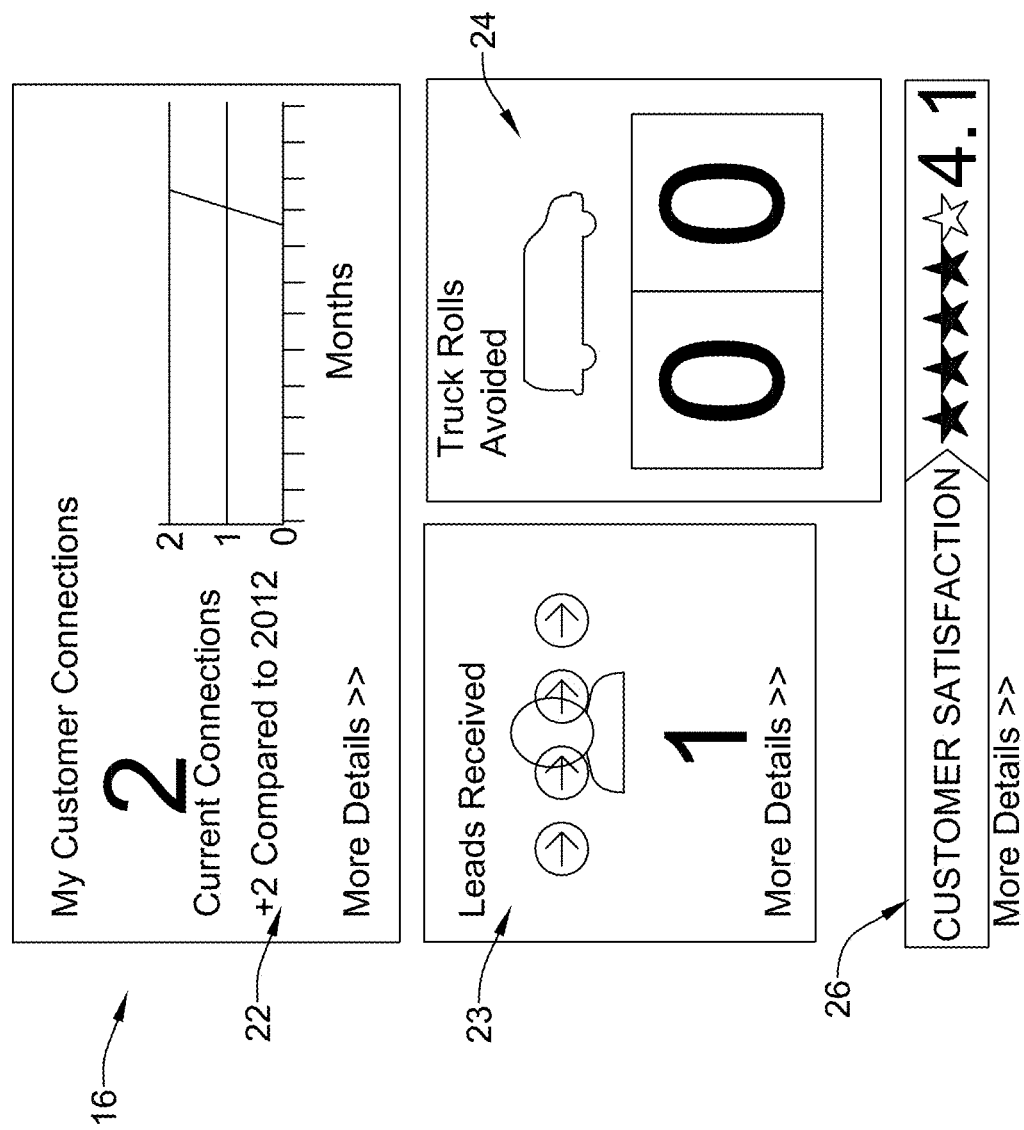
FIG. 26 is a schematic screen shot of an illustrative return on investment counter page of a contractor portal.

In some cases, the set of contractor web pages may include a return on investment counter page 16, as shown in FIG. 26. Among other features, the return on investment counter page 16 may include a leads generated block 23 (e.g., showing leads generated by the contractor portal 204), a customer connections block 22 (e.g., which may list new customers generated by the contractor web access), customer reviews 26 (e.g., customer satisfaction ratings), an existing alerts and resolution time averages for connected devices, and truck rolls avoided. Such data may be filtered as desired, for example, by year-to-date, year over year, quarter-to-date, quarter over quarter, month-to-date, month over month, and so on.

From the return on investment counter page 16, the contractor may scroll over one or more block for further information. With this further information, the contractor may be able to calculate the financial benefit of utilizing the system 100.

Figure 27:
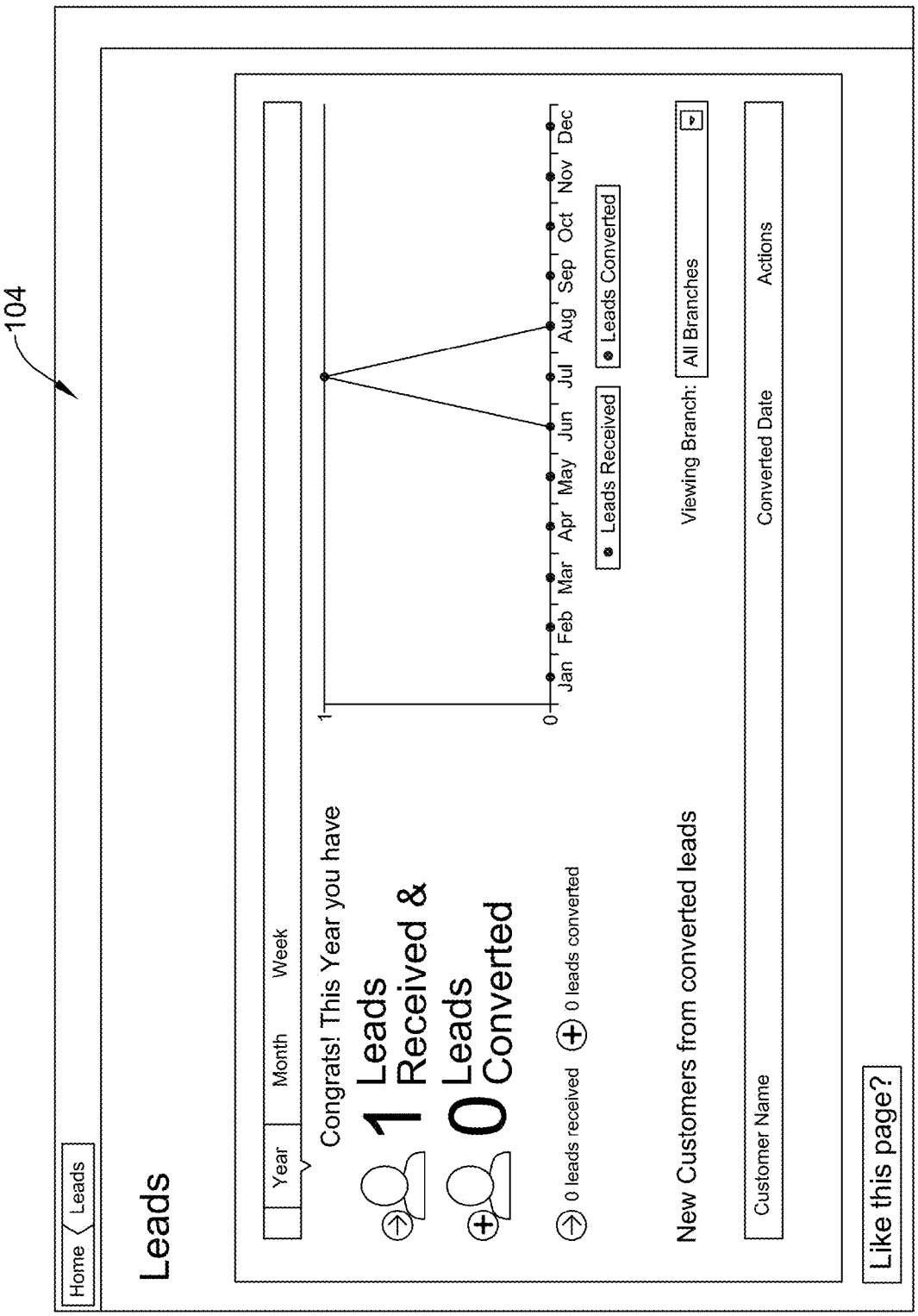
FIG. 27 is a schematic screen shot of an illustrative sales leads page of a contractor portal.

When a contractor scrolls over the leads generated block 23 or selects any other designated area of the return on investment counter page 16, a leads page 104 may be generated, as shown in FIG. 27. The leads page 104 may display an indication of leads generated through the system 100 and leads converted over a selectable time period (e.g., a year, month, week, etc.), along with a graphical representation of the data. Further, the leads page 104 may list the leads and/or the converted leads, if any. The data may be further filtered by any other restriction, such as, but not limited to, by a branch of a company.

Figure 28:
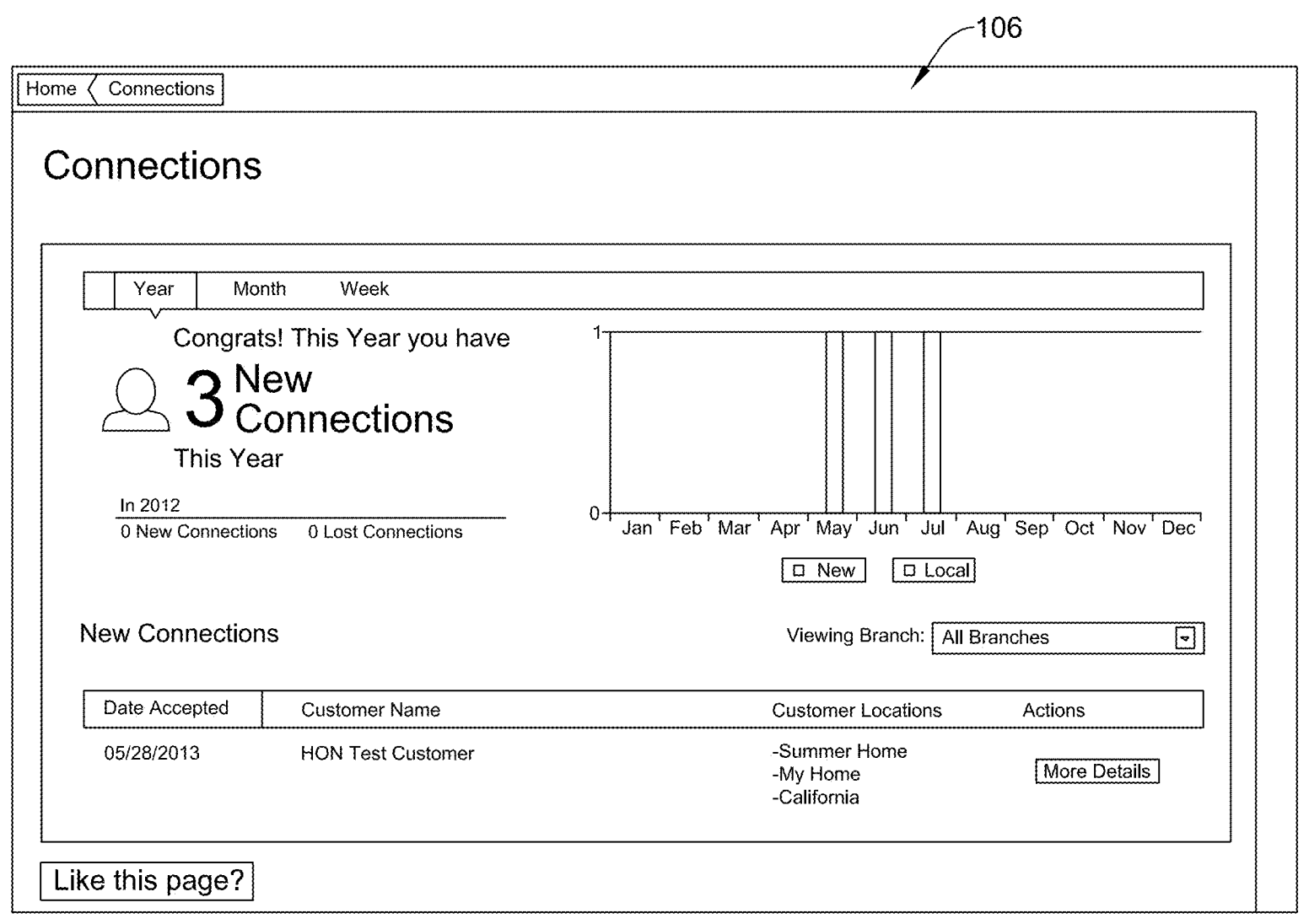

When a contractor scrolls over a customer connections block 22 or selects any other designated area of the return on investment counter page 16, a connections page 106 may be generated as shown in FIG. 28. The connections page 106 may display an indication of new customer connections generated through the system 100 and connections lost over a selectable time period (e.g., a year, month, week, etc.), along with a graphical representation of the data. Further, the connections page may list the connected customers and/or lost customers, if any. The data may be further filtered by any other restriction, such as, but not limited to, by a branch of a company.

Figure 29:
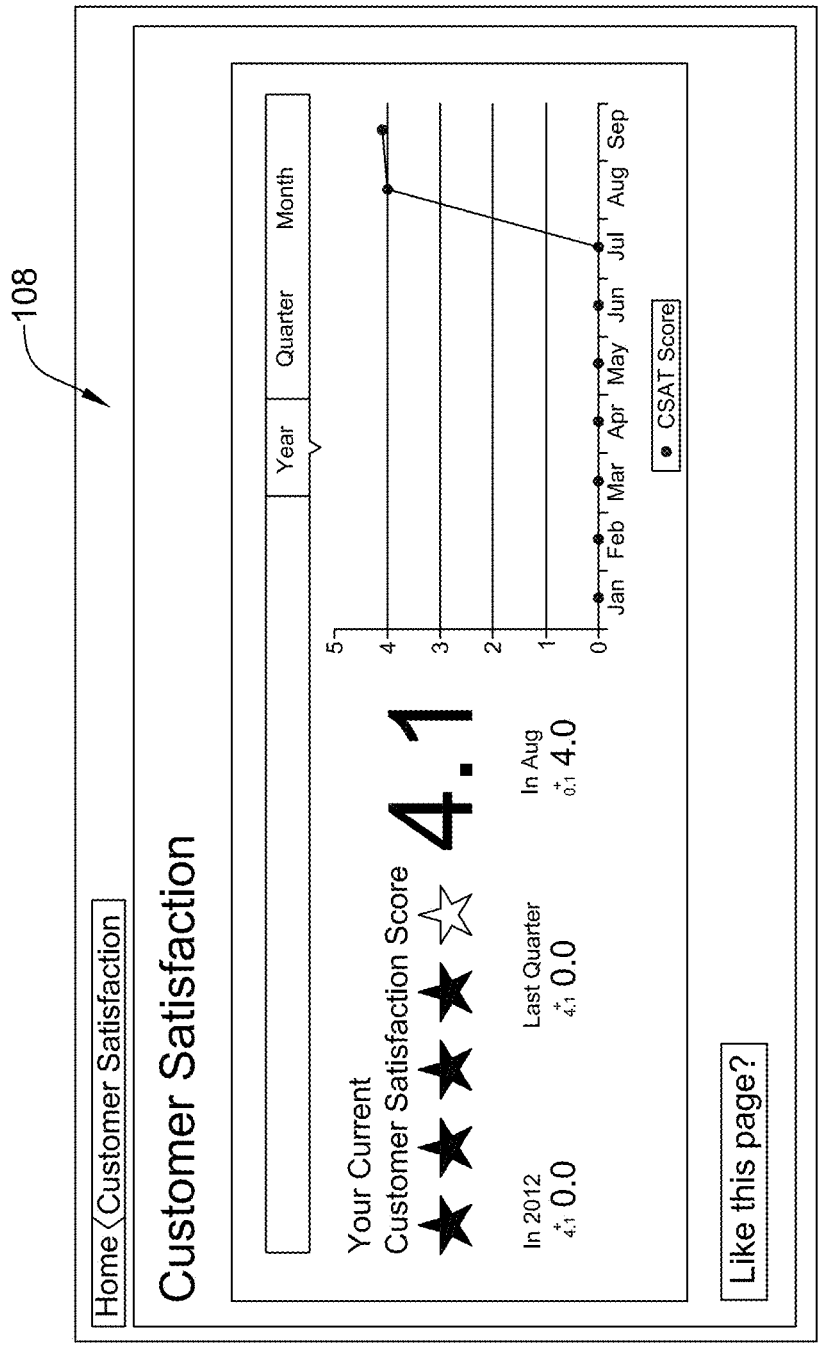
FIG. 29 is a schematic screen shot of an illustrative overall customer satisfaction page of a contractor portal.

When a contractor scrolls over a customer review block 26 or selects any other designated area of the return on investment counter page 16, a customer review page 108 may be generated as shown in FIG. 29. The customer review page 108 may display an indication of averaged customer connections received directly as a result of contractor-customer interactions over a selectable time period (e.g., a year, month, week, etc.), along with a graphical representation of the data.

Figure 30:
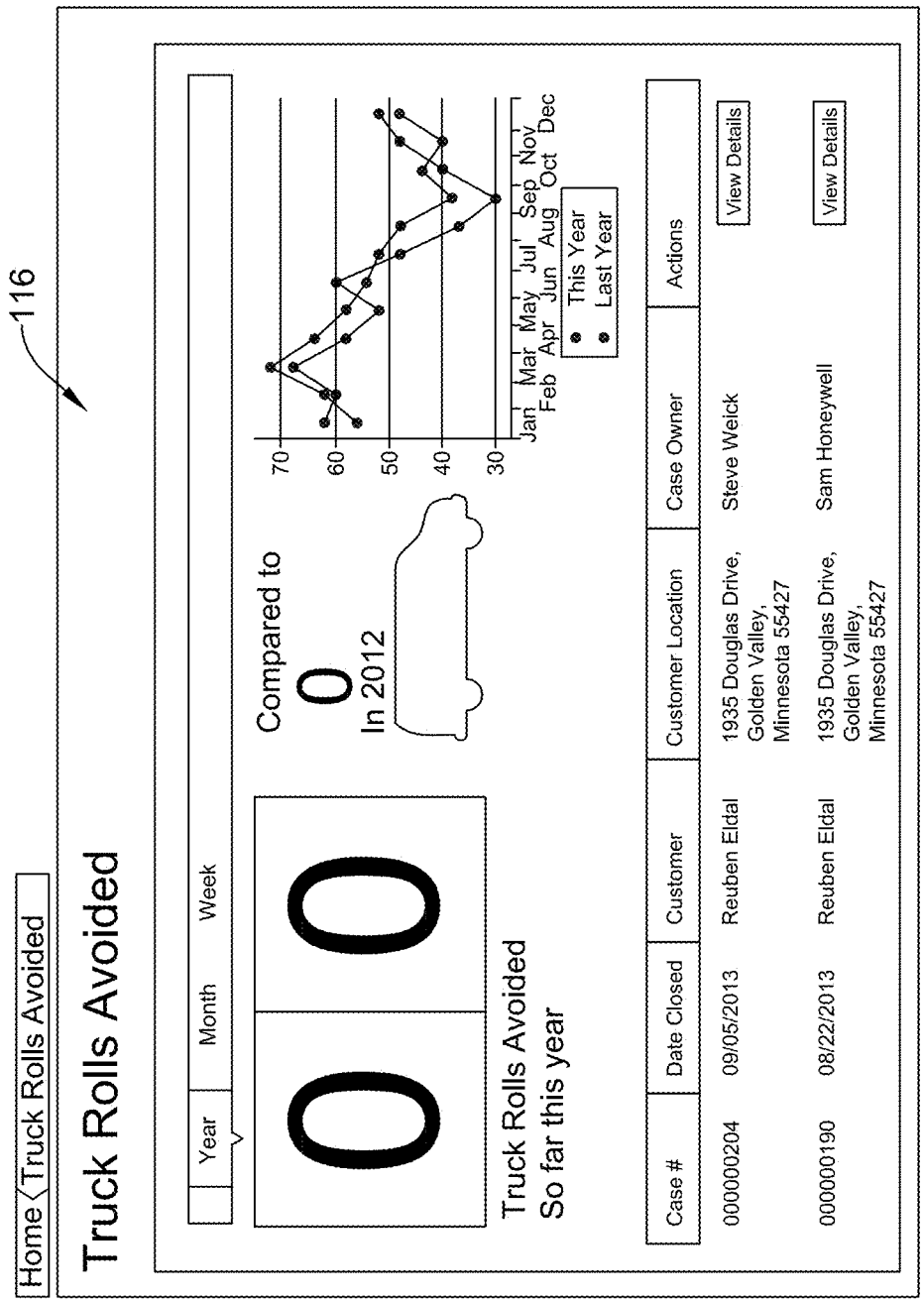
FIG. 30 is a schematic screen shot of an illustrative truck rolls avoided page of a contractor portal.

When a contractor scrolls over a truck rolls block 24 (e.g., a truck rolls avoided block) or selects any other designated area of the return on investment counter page 16, a truck rolls avoided page 116 may be generated as shown in FIG. 30. Truck rolls avoided are recorded when a contractor closes a case 74 and indicates in a generated survey that the contractor portal 204 assisted in avoiding an unplanned truck roll (e.g., an unplanned transportation to an HVAC system 130 location) and the number of truck rolls avoided and/or made may be recorded and stored in a memory of a computing device. The truck rolls avoided page 116 may display an indication of the number of truck rolls avoided over a selectable time period (e.g., a year, month, week, etc.), along with a graphical representation of the data. Further, the truck rolls avoided page 116 may list the locations to which truck rolls were initiated, if any. The data may be further filtered by any other restriction, such as, but not limited to, by a branch of a company.

Figure 31A:
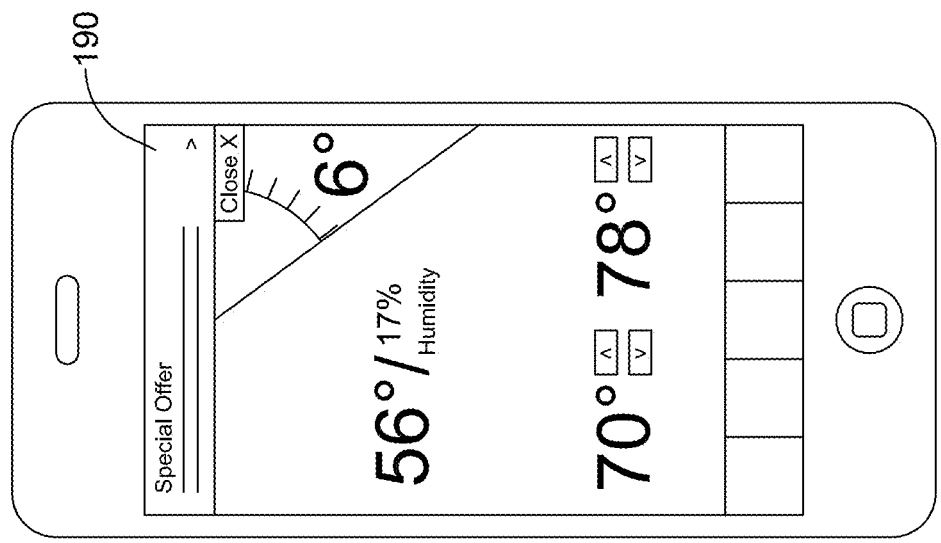
FIGS. 31A and 31B are schematic screen shots of illustrative promotional screens displayed on a mobile device.
Figure 31B:
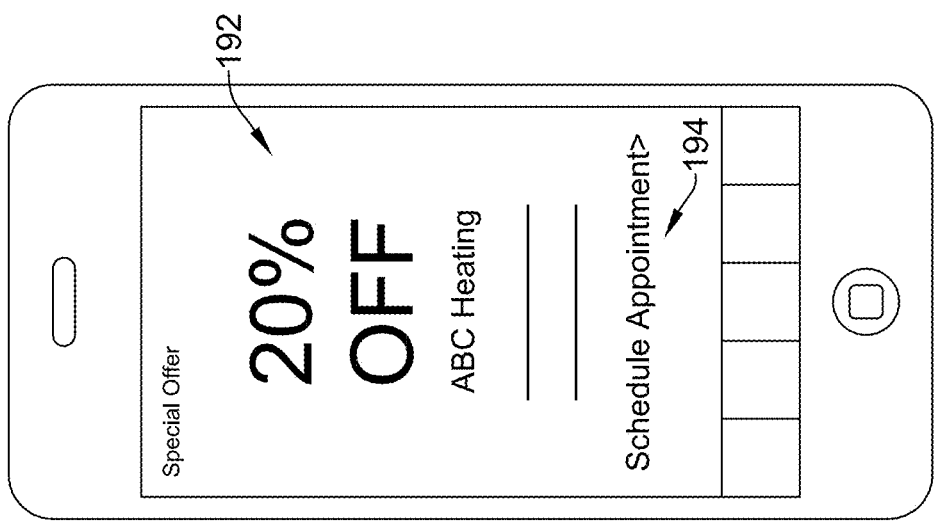

As contractors may insert their service area when setting up their profiles within the system 100 (e.g., via a graphical map and/or by selecting area codes, cities, counties, etc.), zip codes of customers and/or potential customers in the system 100 may be referenced against the contractor established service area and the contractors may be able to identify potential customers (as discussed above) and/or existing customer to which marketing messages and/or materials may be sent based on geographic locations of customers. In one example, contractors may be able to push or send general (e.g., canned) or custom promotions to customers or potential customers within their services areas (e.g., to customers with zip codes in the contractor selected service area). The marketing messages and/or materials may be electronic messages in the form of emails, text messages, banner advertising (see FIG. 31A showing a banner advertisement 190 in customer portal 202), full page advertising (see FIG. 31B showing a full page advertisement 192 in customer portal 202), etc.

In some cases, the contractor advertisements may include short term deals (e.g., deals that expire in one hour, two hours, three hours and so on, or deals that last longer). The deals in advertisements may have a schedule appointment button (e.g., schedule appointment button 194 in FIG. 31B) from which a customer may be able to schedule an appointment from an advertisement to take advantage of a deal or special offering. Illustratively, when the marketing messages and/or materials are accepted by customers or potential customers, new leads, customers, and ecommerce sales may be generated, tracked, and/or stored by the system 100 (e.g., remote computing device 110). In some instances, the operator of the remote computing device 110 may monitor the marketing and/or messages sent to customers and/or potential customers to avoid spam messaging and/or undesirable messages (e.g., messages not related to the system 100 or other undesirable messages).

Figure 32:
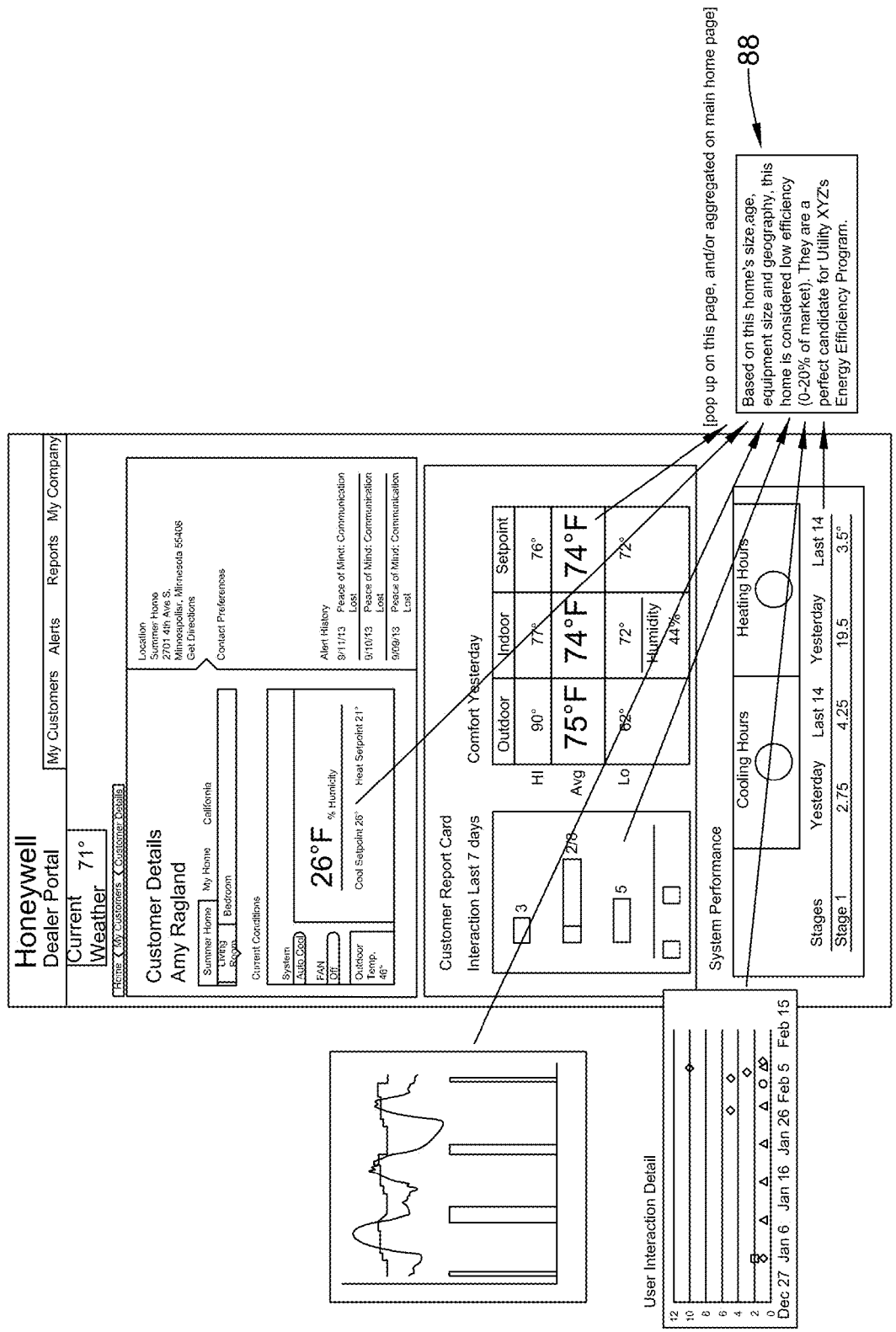
FIG. 32 is a schematic screen shot of an illustrative suggestive selling tip of a contractor portal.
Figure 33:
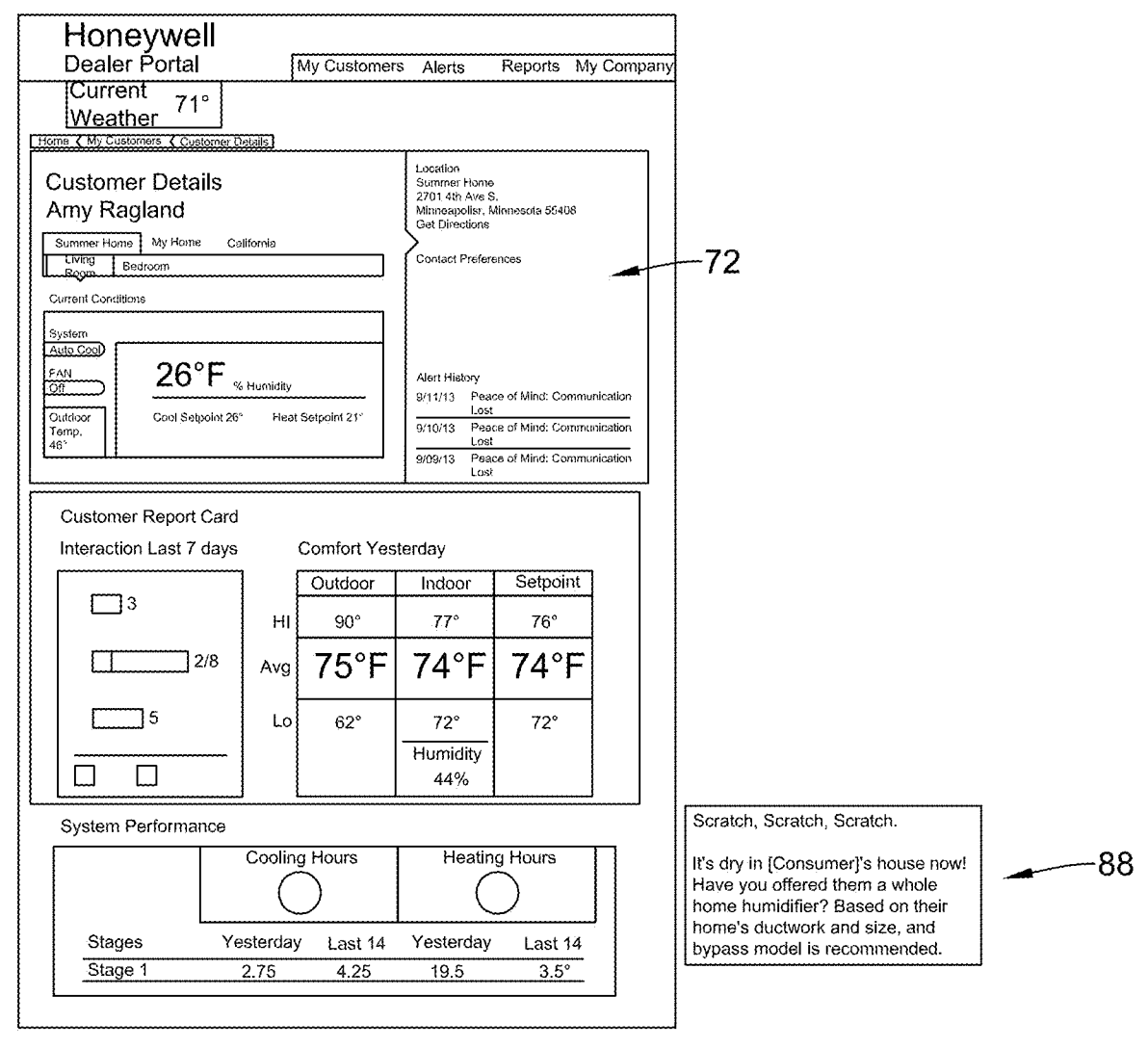

In some instances, the system 100 may present one or more indications (e.g., a notification, a suggestion, a suggestive selling tip, a lead, etc.) to a contractor or other user that identify which, if any, of one or more client HVAC systems 130 would benefit from a particular product or service. Illustratively, the indications may be directed to a specific customer or several specific customers based on received data associated with that customer and/or an HVAC system 130 of that customer, as shown in FIGS. 32 and 33, where the indication may encourage a user or contractor of the system 100 to contact the client or contractor.

Illustratively, a controller 111 of the system 100 may be configured to determine or identify one or more of a plurality of client or customer HVAC systems 130 that may benefit from a particular product or service. In one example, the controller 111 may be configured to search for a pattern in data received from client or customer HVAC systems 130. If the controller identifies a pattern in the data received from the client or customer HVAC systems 130, the controller 111 may provide an indication including a suggestion and/or a promotion for a product or services that addresses an identified pattern in the received data for a particular client or customer associated with the HVAC system 130 providing data for which a pattern was identified. In some cases, the controller 111 may be configured to search for one or more patterns of humidity level over a period of time, a pattern of temperature level over a period of time, a pattern of fan activation over a period of time, a pattern of particle count over a period of time, and/or one or more other patterns.

In some instances, the controller 111 may be configured to determine if the client or customer HVAC systems 130 would benefit from the identified product or service based on one or more parameters. For example, the controller 111 may be configured to determine if a product or service related to an HVAC system 130 would benefit the HVAC system 130 by determining the particular product or service would improve one or more of the comfort provided by the client or customer HVAC system, the efficiency of the client or customer HVAC system, the maintenances costs (monetary and time) for the client or customer HVAC system, the performance of the client or customer HVAC system, and/or one or more other benefits of the client or customer HVAC system.

The controller 111 may be configured to output via the communications port 113 the one or more indications that identify which, if any, of the plurality of client HVAC systems 130 that may benefit from the particular product or service based on analyzed data and provide data supporting implementation of the particular product or service in the indication. Once a particular product or service has been identified, the controller 111 may communicate or output, via the communications port 113, the product or services and supporting data for display on a display. For example, the particular product or services and supporting data may be output to a display of a smart phone, a tablet, a laptop, a personal computer, an HVAC controller (e.g., a client or customer HVAC controller or other controller), any display accessible by a user of the remote contractor system and/or the remote client system for viewing thereon.

In one example of providing the indications, data comprising average indoor and/or outdoor temperatures may be received at the remote system via the communications port 113 for specific buildings (e.g., specific houses) and this data may be analyzed by the controller 111 to determined personalized heating degree days and cooling degree days for the HVAC system 130 of the building. When the determined personalized heating degree days and cooling degrees days are trended over time, a user or the controller 111 may determine or quantify the efficiency of the house and potential areas in which the contractor may be able to suggest improvements to the customer based on determined or quantified efficiency of the house. As such, because an indication identifying a particular product or services may be based on the determined or quantified data and/or information concerning a client or customer's HVAC system, a client or customer may be more willing to implement the particular product or service at the suggestion of the contractor or other user.

In instances when the controller 111 provides an indication with a promotion for a product or service that addresses an identified pattern in the received data, the controller 111 may be configured to output to a client or customer the indicated promotion via the communications port 113 automatically or after receiving the approval from the contractor. The controller 111 may then receive an acceptance of and/or a proposed or scheduled service time for the indicated promotion sent to the client or customer.

Illustratively, a method of identifying clients or customers with building automation or HVAC system needs for contractors and/or other users of the system 100 which service the HVAC systems 130 of the clients or customers may include receiving and storing data related to the operation of a plurality of client or customer HVAC systems 130 and analyzing that data using the controller 111 (e.g., a processor). Based at least in part on the analysis of data, the controller 111 may be configured to determine if a client or customer HVAC system 130 would benefit from a particular product or service. The method may further include generating one or more indications that identify which, if any, of the client or customer HVAC systems 130 may benefit from the particular product or service and outputting the generated indications to a display for viewing by one or more of a contractor and a customer or client associated with an HVAC system for which an indication was generated. Additionally, or alternatively, one or more other steps may be included in the method of identifying clients or customers with building automation or HVAC system needs.

Displayed indications may include pop-up messages 88 or other messages on a customer details page 72 or customer report card 60, as shown in FIGS. 32 and 33. Examples of specific suggesting selling tips may include, but are not limited to, "Scratch, scratch, scratch. It's dry in Customer A's house right now! Have you offered them a whole home humidifier? Based on their home's ductwork and size, a bypass model is recommended", "Based on this home's size, age, equipment size, and geography, this home is considered to have low efficiency. This customer is a perfect candidate for the utility company's Energy Efficiency Program", and/or "Over the last three (3) years, this home has lost 50% of its efficiency in terms of furnace and A/C run time. That equates to $900/year in unnecessary costs, according the local utility's current rates. A new HVAC system would save them money and improve comfort". Such suggestions may arrive at the contractor's web access (e.g., set of web pages 410, 420) via a prompt through a pop-up message, email, text message, banner message, or other notification technique.

In some instances, and in response to generating a suggestive selling tip, the system 100 may be able to manually or automatically send deals or promotional information to customers, where the deals and/or information may be customer specific, timely, and relevant (e.g., based on the customer's HVAC system 130 data or information). Such deals and/or promotional information may be accepted by the customer or ignored, as desired. When accepted by the customer, the manually or automatically sent deals and/or promotional information may generate ecommerce sales and/or service calls.

Further, contractors utilizing the system 100 may provide and/or promote network contacts for non-HVAC businesses via suggestions, promotions, and/or deals sent to customer web access pages. As discussed above, the system 100 may provide contractors with suggested non-HVAC system solutions to HVAC related issues (e.g., new windows may be needed to address uncharacteristically high temperature loss). When presenting such a non-HVAC system solution to a customer, the contractor may be able to electronically suggest to the customer a dealer that may be able to assist in the non-HVAC system solution. Alternatively, or in addition, a contractor may be able to list contacts for non-HVAC system businesses and associate such business with its set of contractor web pages or with its account, where the lists of contacts may be searchable by customers. In some cases, a block on a contractor's home page may list the number of referrals a networked non-HVAC system business receives because of its connection to the contractor. In some cases, a referral fee may be charged for sales made as a result of the referral.

Figure 34:
FIG. 34 is a schematic screen shot of an illustrative suggestion to view technical information in a contractor portal.

As shown in FIG. 34, there may be a real-time repository of promotional and technical information between the operator of the remote computing device 110 (e.g. a system 100 provider) and the contractors through pop-up messages 89 and/or other messages on a homepage 20 or other page of a contractor's set of web pages. Such pop-up messages 89 or other messages may include "FYI from [equipment manufacturer]. A new troubleshooting video regarding [Problems X, Y, Z] is now available. Fifty [50] of your customers have this model. WATCH NOW", where selecting "WATCH NOW" may bring the contractor to the troubleshooting video referenced in the message. The system 100 may track which employees watched the video.

Contractors with two or more employees utilizing the system 100 through a set of contractor web pages may set and/or manage sales, service, operations contests or goals for their employees. The contests and/or goals may be focused on improving sales, services, and operations based on the HVAC data and customer data inputs. In one example, a manager with the contractor company may set a contest or goal for its employees with the contractor company.

Figure 35:
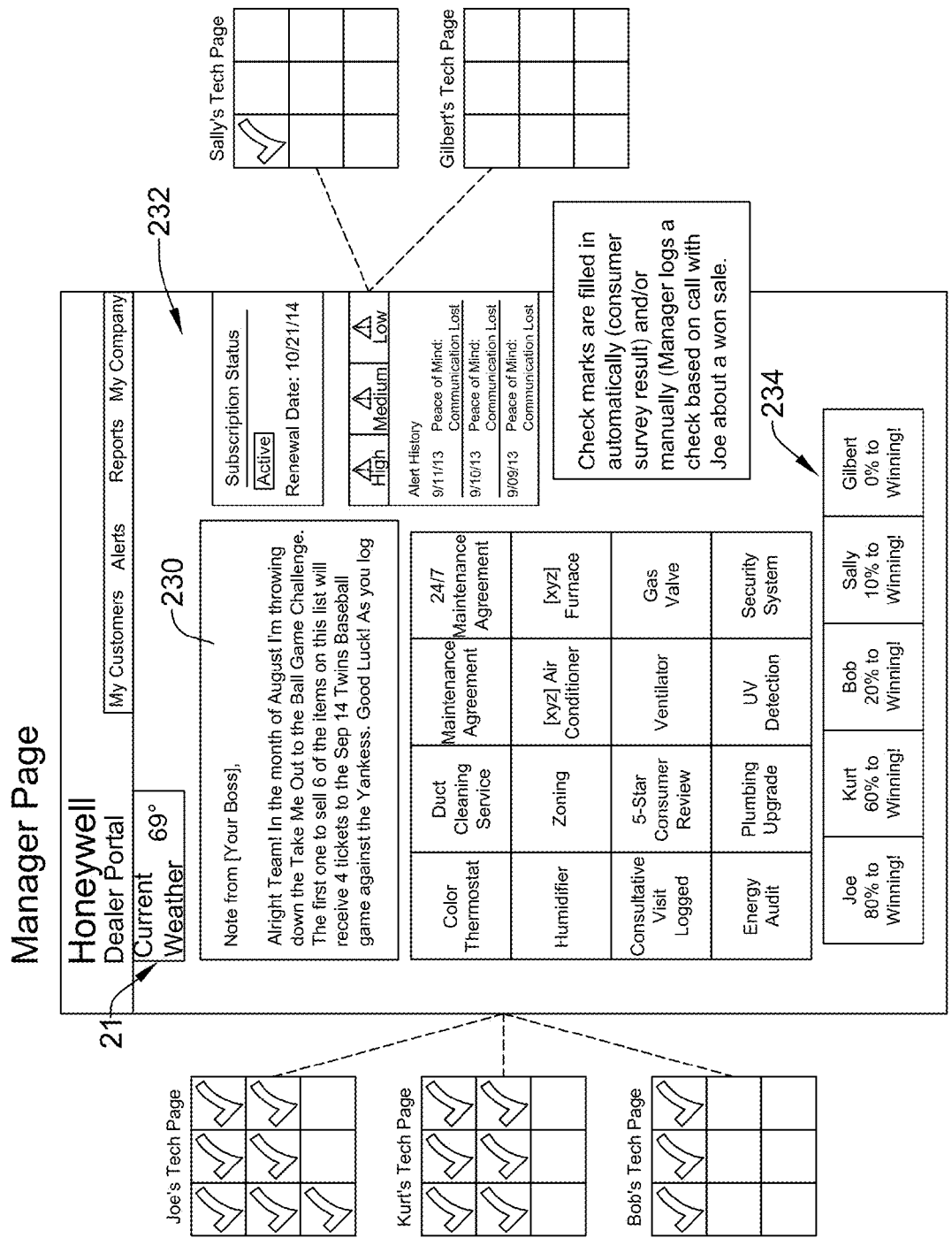
FIG. 35 is a schematic screen shot of an illustrative contest page displayed in a contractor portal.

As shown in FIG. 35, the manager, from a manager page 232 may create a message 230 setting a contest to be the first employee to sell six (6) items on a list of items in order to win tickets to a baseball game. Another example contest or goal may include a manager setting a goal of reducing an alert resolution time by thirty (30) minutes or some other amount of time. A further example of a contest or goal may be that if an employee installs a particular number of thermostats of brand A in the next quarter, that employee will receive a badge of honor and recognition. Any other contest, game, or goal may be set as desired.

Once a contest or goal has been established, the message 230 containing the contest or goal may be delivered to each employee that is participating in the contest or goal. Further, the manager's page 232 may provide the manager with updates 234 on how well the employees are performing with respect to the contests and/or goals. In some instances, contractor employees other than managers may be able to view through their individual contractor web access pages how other employees and/or business units are performing with respect to set goals and/or contests.

Figure 36:
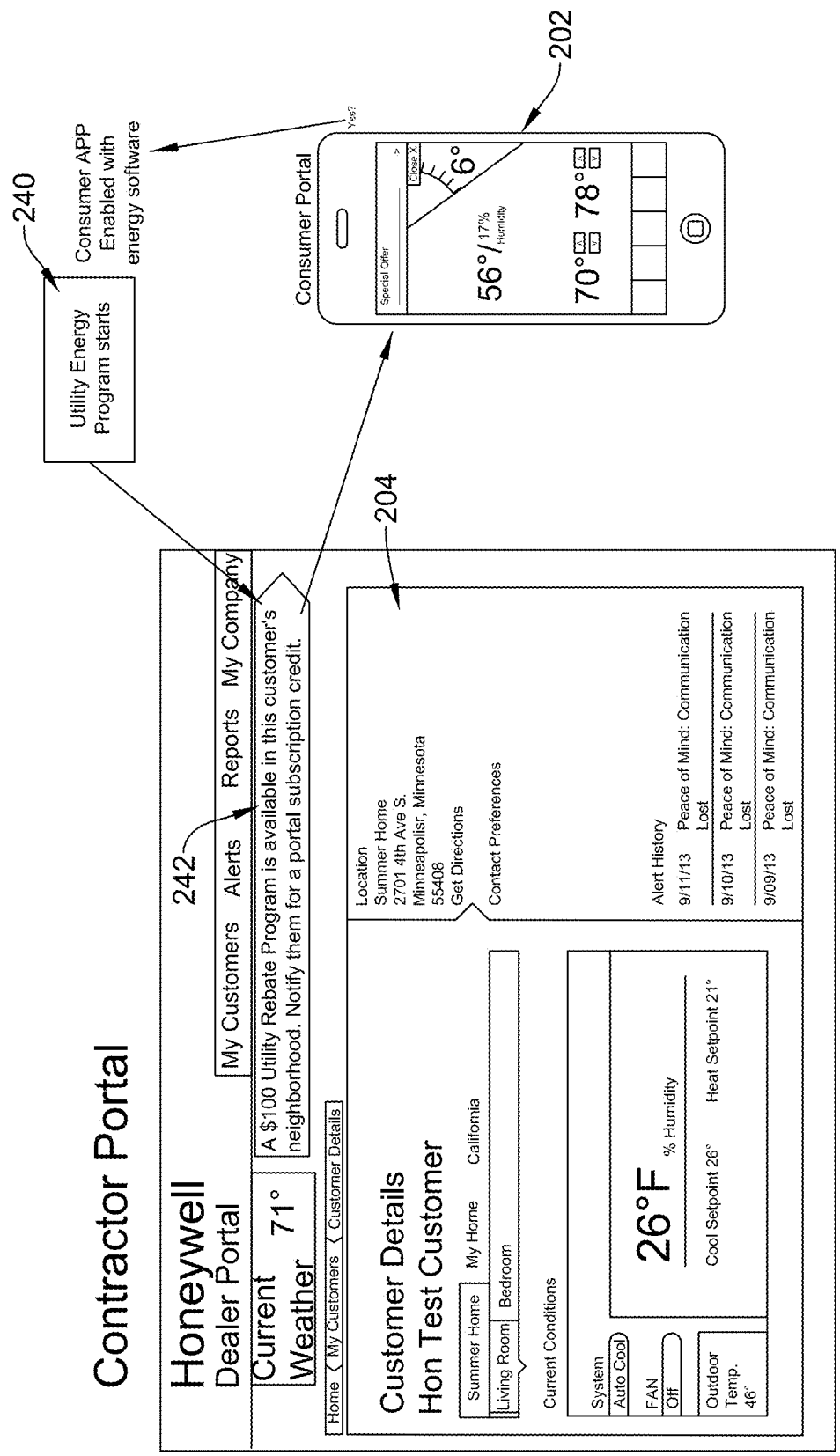
FIG. 36 is a schematic flow diagram showing use of an application programming interface (API) on a mobile device for user interaction.

An application programming interface (API) may be developed for allowing third party applications to interact with the system 100 (e.g., the remote computing device 110 or other feature of system 100) to siphon or use data from connected HVAC systems 130. In some cases, an application may be developed that utilizes the set of customer web access pages and the set of contractor web access pages. For example, a utility company may have an energy program for which it programs a software application 240 (e.g., a mobile device software application) and the operator of the remote computing device 110 may grant general access to the system 100 for the software application through a developed API for the software of the system 100. Once the utility energy program has been initialized, a utility program pop-up 242 or other message associated with a customer may populate that suggests to the contractor that the customer should be enrolled in the utility energy program, as shown in FIG. 36. The contractor may then suggest to the customer via a message or notification that the customer participate in the program. If the customer accepts the invite (e.g., through the customer portal 202), the utility energy program application may receive access to the data and/or information of the customer's HVAC system 130 through the API. Further, the customer may access their enrollment and status in the utility energy program through the application 240 and/or through the customer portal 202. Additionally, or alternatively, the API for the system 100 may be used for other applications to facilitate access to the system 100 and/or analysis of the data in the system 100.

The prioritization of data and/or information, as discussed herein, may allow a contractor to organize and/or plan their day. Additionally, or alternatively, such prioritization may provide directionally correct next steps for addressing and/or resolving abnormal operations of HVAC systems 130 that impact customers' comfort and/or peace of mind, while optimizing HVAC operation through pro-active upkeep.

The disclosure should not be considered limited to the particular examples described above, but rather should be understood to cover all aspects of the disclosure as set out in the attached claims. Various modifications, equivalent processes, as well as numerous structures to which the disclosure can be applicable will be readily apparent to those of skill in the art upon review of the instant specification.

What is claimed is:

1. A remote contractor system communicates with a plurality of client heating, ventilation, and air conditioning (HVAC) controllers over a network, wherein each of two or more of the client HVAC controllers is part of a corresponding client HVAC system that services a corresponding client building, the remote contractor system comprising:
    a communications port operatively communicating with the two or more of the client HVAC controllers, and receiving data related to the operation of the two or more of the client HVAC systems;
    a memory for storing the received data related to the operation of the two or more of the client HVAC systems;
    a controller operatively coupled to the communications port and the memory, wherein the controller includes a processor for processing the data related to the operation of the two or more of the client HVAC systems in order to determine which if any of the two or more of the client HVAC systems are projected to benefit from the addition of a particular product or service;
    wherein the controller searches for a pattern in the received data that is related to the operation of the two or more of the client HVAC systems to help determine which, if any of the two or more of the client HVAC systems are projected to benefit from the particular product or service; and
    the controller outputs via the communications port one or more indications that identify which, if any, of the two or more of the client HVAC systems are projected to benefit from the addition of the particular product or service.

2. The remote contractor system of claim 1, wherein the controller determines that the particular product or service is projected to benefit a particular client HVAC system when the particular product or service is projected to improve one or more of comfort provided by, efficiency of, maintenance of, and performance of the particular client HVAC system.

3. The remote contractor system of claim 1, wherein each of the one or more indications is tailored to a particular client HVAC system.

4. The remote contractor system of claim 1, wherein each of the one or more indications identifies the particular product or service and provides data that supports the determination that the particular product or service is projected to benefit the corresponding client HVAC system.

5. The remote contractor system of claim 1, wherein the one or more indications are communicated to and displayed on a display accessible by a user of the remote contractor system.

6. The remote contractor system of claim 1, wherein at least one of the one or more indications is communicated to and displayed on a display of a client HVAC controller.

7. The remote contractor system of claim 1, wherein the controller outputs the one or more indications for display on a display.

8. The remote contractor system of claim 7, wherein the display is a display of a smart phone, a tablet, a laptop, or a personal computer.

9. A remote contractor system communicating with a plurality of client building automation controllers over a network, wherein each of the plurality of client building automation controllers is part of a corresponding client building automation system that services a corresponding client building, the remote contractor system comprising:
 a communications port operatively communicating with the plurality of client building automation controllers, and to receive data related to the operation of the corresponding plurality of client building automation systems;
 a memory for storing the received data related to the operation of the plurality of client building automation systems;
 a controller operatively coupled to the communications port and the memory, wherein the controller processes the data related to the operation of the plurality of client building automation systems in order to determine which, if any of the plurality of client building automation systems are projected to benefit from a particular product or service;
 wherein the controller searches for a pattern in the received data that is related to the operation of the plurality of client building automation systems to help determine which, if any of the plurality of client building automation systems are projected to benefit from the particular product or service; and
 the controller outputs via the communications port one or more notifications that encourage a contractor to contact a consumer that is associated with a client building automation system that is projected to benefit from the particular product or service, wherein the notifications include a recommendation to provide a suggestion to the consumer, where the suggestion is for a product and/or service that addresses an identified pattern in the received data from the particular client building automation system that is associated with the consumer.

10. The remote contractor system of claim 9, wherein the controller searches for one or more of a pattern in humidity level over a period of time, a pattern in temperature level over a period of time, a pattern in fan activation over a period of time, and a pattern in particle count over a period of time.

11. The remote contractor system of claim 9, wherein at least one of the notifications identifies a promotion for a product and/or service that addresses an identified pattern in the received data from the particular client building automation system that is associated with the consumer.

12. The remote contractor system of claim 11, wherein the controller outputs the identified promotion to the consumer via the communications port after receiving approval from the contractor.

13. The remote contractor system of claim 12, wherein the controller receives an acceptance of the identified promotion by the consumer via the communications port.

14. The remote contractor system of claim 12, wherein the controller receives a scheduled service time of the identified promotion by the consumer via the communications port.

15. A method for identifying clients with building automation needs for contractors that service one or more building automation systems, the method comprising:
 receiving and storing data related to the operation of a plurality of client building automation systems via a network;
 processing the received data related to the operation of the plurality of client building automation systems using a processor to determine which if any of the plurality of client building automation systems are projected to benefit from a particular product or service, wherein the processor searches for a pattern in the received data that is related to the operation of the plurality of client building automation systems to help determine which, if any of the plurality of client building automation systems are projected to benefit from the particular product or service;
 generating one or more notifications that encourage a contractor to contact a consumer that is associated with a client building automation system that is projected to benefit from the particular product or service, wherein the notifications include a recommendation to provide a suggestion to the consumer, where the suggestion is for a product and/or service that addresses an identified pattern in the received data from the particular client building automation system that is associated with the consumer; and
 outputting the generated one or more notifications to a display for viewing by a contractor.

16. The method of claim 15, wherein searching for a pattern comprises searching for one or more of a pattern in humidity level over a period of time, a pattern in temperature level over a period of time, a pattern in fan activation over a period of time, and a pattern in particle count over a period of time.

* * * * *